(12) United States Patent
Bodnar et al.

(10) Patent No.: US 6,295,541 B1
(45) Date of Patent: Sep. 25, 2001

(54) SYSTEM AND METHODS FOR SYNCHRONIZING TWO OR MORE DATASETS

(75) Inventors: Eric O. Bodnar, Capitola; Chris LaRue; Bryan Dube, both of Santa Cruz; Shekhar Kirani, San Jose; Sethuraman Suresh, Santa Cruz, all of CA (US)

(73) Assignee: Starfish Software, Inc., Scotts Valley, CA (US)

( * ) Notice: Subject to any disclaimer, the term of this patent is extended or adjusted under 35 U.S.C. 154(b) by 0 days.

(21) Appl. No.: 09/136,215

(22) Filed: Aug. 18, 1998

Related U.S. Application Data

(60) Provisional application No. 60/094,972, filed on Jul. 31, 1998, provisional application No. 60/094,824, filed on Jul. 31, 1998, and provisional application No. 60/069,731, filed on Dec. 16, 1997.

(51) Int. Cl.[7] .................................................. G06F 12/00
(52) U.S. Cl. .................................. 707/203; 707/3; 707/4; 707/8; 707/10; 707/201; 709/248; 714/12; 714/15; 714/20
(58) Field of Search ................................. 707/3, 4, 8, 10, 707/201, 101; 709/238, 500, 248; 714/12, 15, 20

(56) References Cited

U.S. PATENT DOCUMENTS

| | | | |
|---|---|---|---|
| 4,769,796 | 9/1988 | Levine | 368/29 |
| 4,866,611 | 9/1989 | Cree et al. | 364/300 |
| 4,881,179 | 11/1989 | Vincent | 364/518 |
| 4,977,520 | 12/1990 | McGaughey, III et al. | 364/521 |
| 5,113,380 | 5/1992 | Levine | 368/10 |
| 5,224,212 | 6/1993 | Rosenthal et al. | 395/500 |
| 5,390,320 | * 2/1995 | Smithline | 395/500 |
| 5,392,390 | 2/1995 | Crozier | 395/161 |
| 5,442,783 | 8/1995 | Oswald et al. | 395/600 |
| 5,519,606 | 5/1996 | Frid-Nielsen et al. | 364/401 |
| 5,666,530 | 9/1997 | Clark et al. | 395/617 |
| 5,666,553 | 9/1997 | Crozier | 395/803 |
| 5,684,990 | 11/1997 | Boothby | 395/619 |
| 5,701,423 | 12/1997 | Crozier | 395/335 |
| 5,706,509 | * 1/1998 | Man-Hak Tso | 707/201 |
| 5,710,922 | 1/1998 | Alley et al. | 395/617 |
| 5,727,202 | 3/1998 | Kucala | 395/610 |
| 5,729,735 | 3/1998 | Meyering | 395/610 |

(List continued on next page.)

*Primary Examiner*—Kim Vu
*Assistant Examiner*—Anh Ly
(74) *Attorney, Agent, or Firm*—John A. Smart

(57) ABSTRACT

Synchronization system and associated methods provide synchronization of an arbitrary number of datasets, including more than two datasets. To achieve this, a reference dataset is used to store a super-set of the latest or most-recent data from all user datasets to provide a repository of information that is available at all times. Therefore, if the user later wishes to synchronize a new user dataset, such as one in a server computer that stores user information, the system already has all the information necessary for synchronizing the new dataset, regardless of whether any of the other datasets are then available. Further, to simplify use, a unified user interface is provided that allows the user to easily determine which of his or her datasets are currently set to be synchronized and allows the user to conveniently alter the current settings to select one, two, or even more than two clients for synchronization. Various "conflict" or "duplicate" resolution strategies are described for intelligently handling complexities resulting from allowing synchronization for an arbitrary number of datasets and allowing synchronization using even data from datasets that are not available. Architectural support for "plug-in" client accessors and type modules is also provided. This allows support to be added for new datasets or new types of data merely by developing and plugging in new, compact client accessors or type modules, without updating or replacing the core synchronization engine.

30 Claims, 25 Drawing Sheets

U.S. PATENT DOCUMENTS

| | | | |
|---|---|---|---|
| 5,758,150 | 5/1998 | Bell et al. | 395/610 |
| 5,758,355 | 5/1998 | Buchanan | 707/201 |
| 5,761,667 * | 6/1998 | Koeppen | 707/101 |
| 5,778,346 | 7/1998 | Frid-Nielsen et al. | 705/9 |
| 5,778,389 | 7/1998 | Pruett et al. | 707/204 |
| 5,813,009 * | 9/1998 | Johnson et al. | 707/100 |
| 5,832,487 | 11/1998 | Olds et al. | 707/10 |
| 5,845,293 | 12/1998 | Veghte et al. | 707/202 |
| 5,913,214 * | 6/1999 | Madnick et al. | 707/10 |
| 5,926,816 * | 7/1999 | Bauer et al. | 707/8 |
| 5,974,238 * | 10/1999 | Chase, Jr. | 395/200.78 |
| 5,978,804 * | 11/1999 | Dietzman | 707/10 |

* cited by examiner

| TIME (INCREASING) | CLIENT A RECORDS (BLANK = UNCHANGED FROM PREVIOUS VALUE) | | | CLIENT B RECORDS | | | CLIENT C RECORDS | | |
|---|---|---|---|---|---|---|---|---|---|
| | R1 | R2 | R3 | R1 | R2 | R3 | R1 | R2 | R3 |
| TIME 0 | 1 | 2 | 3 | 1 | 2 | 3 | 1 | 2 | 3 |
| TIME 1 | | | | | | 3B | | | |
| TIME 2 | 1A | | | | 2B | | | | 3C |
| JUST AFTER TIME 3 (A-B SYNC) | | 2B | 3B | 1A | | | | | |
| JUST AFTER TIME 4 (A-C SYNC) | | | | | | | 1A | 2B | 3B |
| JUST AFTER TIME 5 (A-B SYNC) | | | | | | | | | |
| SUMMARY: SYNC RESULT | 1A | 2B | 3B | 1A | 2B | 3B | 1A | 2B | 3B |
| DESIRED RESULT (RULE=LATER WINS) | 1A | 2B | 3C | 1A | 2B | 3C | 1A | 2B | 3C |

FIG. 7C

SYSTEM AND METHODS FOR SYNCHRONIZING TWO OR MORE DATASETS

RELATED APPLICATIONS

The present application is related to and claims the benefit of priority from commonly-owned U.S. provisional patent applications, the disclosures of which are hereby incorporated by reference in their entirety, including any appendices or attachments thereof, for all purposes: Ser. No. 60/069,731, filed Dec. 16, 1997, and entitled DATA PROCESSING ENVIRONMENT WITH SYNCHRONIZATION METHODS EMPLOYING A UNIFICATION DATABASE; Ser. No. 60/094,972, filed Jul. 31, 1998, and entitled SYSTEM AND METHODS FOR SYNCHRONIZING TWO OR MORE DATASETS; and Ser. No. 60/094,824, filed Jul. 31, 1998, and entitled DATA PROCESSING ENVIRONMENT WITH METHODS PROVIDING CONTEMPORANEOUS SYNCHRONIZATION OF TWO OR MORE CLIENTS. The present application is also related to the following commonly-owned U.S. patent applications, the disclosures of which are hereby incorporated by reference in their entirety, including any appendices or attachments thereof, for all purposes: Ser. No. 08/609,983, filed Feb. 29, 1996, now U.S. Pat. No. 5,845,257 and entitled SYSTEM AND METHODS FOR SCHEDULING AND TRACKING EVENTS ACROSS MULTIPLE TIME ZONES; Ser. No. 09/020,047, filed Feb. 6, 1998, and entitled METHODS FOR MAPPING DATA FIELDS FROM ONE DATA SET TO ANOTHER IN A DATA PROCESSING ENVIRONMENT; and Ser. No. 09/136,212, filed Aug. 18, 1998, and entitled DATA PROCESSING ENVIRONMENT WITH METHODS PROVIDING CONTEMPORANEOUS SYNCHRONIZATION OF TWO OR MORE CLIENTS.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to management of information or datasets stored on electronic devices and, more particularly, to a system implementing methods for maintaining synchronization of datasets among one, two, or more such devices.

With each passing day, there is ever increasing interest in providing synchronization solutions for connected information appliances. Here, the general environment includes "appliances" in the form of electronic devices including, but not limited to, cellular phones, pagers, other hand-held devices (e.g., REX™, PalmPilot™ and Windows™ CE devices), personal computers (PCs) of all types and sizes, and Internet or intranet access devices (e.g., PCs or embedded computers running, for example, Java virtual machines or browsers or Internet Protocol (IP) handlers).

A problem facing such an environment today is that these devices, and the software applications running on these devices, do not communicate well with one another and are typically not designed with data synchronization in mind. In particular, a problem exists as to how one integrates information—such as calendaring, scheduling, and contact information—among disparate devices and software applications. Consider, for instance, a user who has his or her appointments on a desktop PC at work, but also has a notebook computer at home and a battery-powered, hand-held device for use in the field. What the user really wants is for the information (e.g., appointments), in each device to remain synchronized with corresponding information in all devices in a convenient, transparent manner. Still further, some devices (e.g., PCs) are typically connected at least occasionally to a server computer, e.g., an Internet server, which stores information for the user. The user would of course like the information on the server computer to participate in the synchronization, so that the server also remains synchronized.

There have been attempts to solve the problem of synchronizing datasets across different devices or software applications. An early approach to maintaining consistency between datasets was to import or copy one dataset on top of another. This simple "one-way" approach, one which overwrites a target dataset without any attempt at reconciling any differences, is inadequate for all but the simplest of applications. Expectedly, more sophisticated synchronization techniques were developed. In particular, techniques were developed for synchronization of exactly two datasets by attempting to reproduce in each dataset the changes found in the other dataset since a previous synchronization.

The conventional synchronization techniques, which are limited to such pair-wise, or binary, synchronization, may satisfy an information appliance user who wishes to synchronize exactly two datasets. However, these conventional techniques do not adequately satisfy the modem information appliance user, who is accumulating ever more information appliances and software applications and frequently wants to synchronize information from more than just two datasets. To synchronize more than two datasets, such a user is forced by the conventional synchronization techniques to try to achieve the correct synchronization result using successive binary synchronizations. This approach is not only inefficient and generally inconvenient and confusing for the user, but is also fraught with potential for human error, and, further, may produce incorrect results in certain situations.

As an example, consider a user who needs to synchronize information, e.g., scheduling information, from three sources: a PalmPilot organizer device ("Pilot"), a Windows CE device ("CE Device"), and a Microsoft Outlook PIM (Personal Information Manager) software application ("Outlook") on a PC. The user may first perform a Pilot-and-Outlook synchronization, typically using a first synchronization software program that is designed and sold specifically for the Pilot. Next, the user may perform an Outlook-and-CE-Device synchronization, typically using a second synchronization program that is designed and sold specifically for the CE Device. At this point, the user may think he or she is finished. However, he or she in reality must still perform another Pilot-and-Outlook synchronization to ensure that the Pilot correctly includes the latest information from the CE Device. Unfortunately, conventional synchronization programs do not tell the user of the need for this additional synchronization.

In general, the conventional synchronization programs do not adequately help the user in keeping more than two datasets synchronized. For example, the conventional programs do not provide a single user interface (UI) that allows the user to select more than two datasets to be synchronized with every other selected dataset. The conventional programs also do not automatically perform the synchronization of data in more than two datasets for the user without further user input. At most, a conventional synchronization program may permit the user to select a pair of datasets having data of one type (e.g., contacts data) for synchronization and a possibly different pair of datasets having data of a different type (e.g., calendar data) for synchronization. Although the user selects more than two datasets in total, any actual synchronization involves only two datasets. More particularly, synchronization of similar data involves only two datasets. Put another way, no single data record on a particular dataset will effect changes in more than one other dataset in response to a user's selection of datasets using the conventional program. In short, the conventional synchronization scheme is inconvenient and susceptible to human error, especially by less technically-savvy users, and especially as the number of datasets above two increases for a user.

The conventional synchronization scheme suffers from a further problem in that when more than two datasets are synchronized using multiple binary synchronizations, dataset status information (e.g., data modification times) that may be available during earlier-performed synchronizations may not be available during later-performed synchronizations. The failure to retain these status information may be intentional and also reasonable under an assumption that only two datasets need ever be synchronized. The failure to retain these status information may also be caused in part by the design limitations of particular information devices or software applications. Whatever the cause, the unavailability of status information during later-performed synchronizations can lead to erroneous results when, for example, conflicts are resolved during later synchronizations, as will be described in a later section.

Another characteristic of the modem environment for connected information appliances is that new appliances are introduced with ever increasing frequency. Conventionally, an entirely new synchronization software application is released with each new appliance. Such a synchronization application is dedicated to synchronizing data in a single particular information appliance with data in one or several popular PIM applications on a PC. Consequently, the user must buy and install a separate synchronization application, which typically is multi-megabytes long, for each new information appliance. This approach is undesirable for a variety of reasons, including the reason that such large software applications typically cannot be quickly downloaded from the Internet by telephone modem or low-bandwidth channels. Furthermore, should it become desirable for the synchronization programs to synchronize additional types of data, e.g., electronic mail data or expense logging data, or for the synchronization programs to handle additional PC or other software applications, the synchronization software provider typically must upgrade and re-release every affected software application, and the user typically must obtain and install every affected and updated software application.

What is needed is a system and methods for synchronizing data among two or more datasets that is efficient, correct, and resistant to human error, even when more than two datasets need to be synchronized. What is also needed is such a system and method that can easily be expanded to handle new datasets and new data types. At the same time, the approach should be automated so that the user is provided with "one-click" convenience. The present invention fulfills these and other needs.

SUMMARY OF THE INVENTION

The present invention provides a versatile synchronization system and associated methods that provide user-configurable, easily-extensible synchronization among one, two, or more than two user datasets. One aspect of the present invention is that it presents a unified user interface to the user for synchronizing an arbitrary number of the user's datasets (or, "synchronization clients"). Preferably, this user interface includes a client map that allows a user to quickly determine which of his or her clients are currently set to be synchronized and allows the user to conveniently alter the current settings to select one, two, or more than two clients for synchronization.

Another aspect of the present invention is that it preferably controls a reference dataset, sometimes called the Grand Unification Database or GUD, to store a super-set of data from his or her user datasets. In this way, the system of the present invention provides a repository of information that is available at all times and does not require that any other user dataset be connected. Suppose, for instance, that a user has two datasets: a first that resides on a desktop computer and a second that resides on a hand-held device. If the user later wishes to synchronize a third user dataset, such as one in a server computer that stores user information, the system of the present invention has, in the GUD, all the information necessary for synchronizing the new dataset, regardless of whether any of the other datasets are then available. The system of the present invention can, therefore, correctly propagate information to any appropriate user dataset without having to "go back" to (i.e., connect to) the original user dataset from which that data originated. The system of the present invention includes various "conflict" or "duplicate" resolution strategies that handle the increased complexities of allowing synchronization for an arbitrary number of datasets and including in the synchronization even data from datasets that are not available.

Another aspect of the present invention is that, internally, it employs "type plug-in" modules, each one for supporting a particular data type. Since the core synchronization engine treats data generically (e.g., as undifferentiated data), type-specific support is provided by the corresponding plug-in module. Each plug-in module is a type-specific module having an embedded interface (e.g., an API—application programming interface) that each synchronization client may link to, for providing type-specific interpretation of undifferentiated data. For instance, the system may include one type-specific record API for contact information, another for calendar information, and yet another for memo information. In this manner, each client may employ a type-specific API for correctly interpreting and processing particular data. The engine, on the other hand, is concerned with correct propagation of data, not interpretation of that data. It therefore treats the data itself generically. In this fashion, the present invention provides a generic framework supporting synchronization of an arbitrary number of synchronization clients or devices.

An exemplary method for providing synchronization of more than two datasets includes, in an information processing system, accepting a designation of more than two datasets to be synchronized. At least one of the designated datasets includes one record to be synchronized with all others of the designated datasets. The method further includes, in response to the designation, synchronizing the more than two designated datasets without requiring further designating of datasets to be synchronized. After the step of synchronizing, each of the more than two designated datasets includes a record that corresponds to, and is in a synchronized state with, the one record.

Another exemplary method capable of synchronizing more than two designated datasets includes providing a synchronizer dataset that contains records. The synchronizer dataset reflects a result of an earlier synchronization. The method further includes comparing values derived from each of the more than two designated datasets to values derived from the synchronizer dataset to identify a change of a record in the each designated dataset since an earlier synchronization involving the each designated dataset. The method further includes changing at least two of the designated datasets based on the identified change of a record.

An exemplary method is provided for interacting with a user prior to a synchronization of datasets selected from a plurality of more than two datasets, in which the synchronization will leave each of the selected datasets with a record that is synchronized with respect to a corresponding record in each other one of the selected datasets. The method includes presenting an indicator of each of at least the selected datasets; presenting indicators to indicate possible flow of changes among the selected datasets; and accepting a change to the selection of datasets such that, after the step of accepting, the selected datasets to be synchronized include more than two of the plurality of more than two datasets.

Another exemplary method is provided for interacting with a user prior to a synchronization of at least one dataset from a plurality of datasets. The method includes presenting a indicator, referred to as the dataset indicator, of each of at least the at least one dataset to be synchronized; presenting a nexus indicator in addition to the dataset indicators; and presenting path indicators that schematically link the nexus indicator to the dataset indicators of at least the at least one dataset to be synchronized.

BRIEF DESCRIPTION OF THE DRAWINGS

FIG. 7C is a table that shows a faulty result produced by the basic binary-based embodiment of the Synchronizer that can be remedied in an improved system.

DETAILED DESCRIPTION OF A PREFERRED EMBODIMENT

Figure 1:
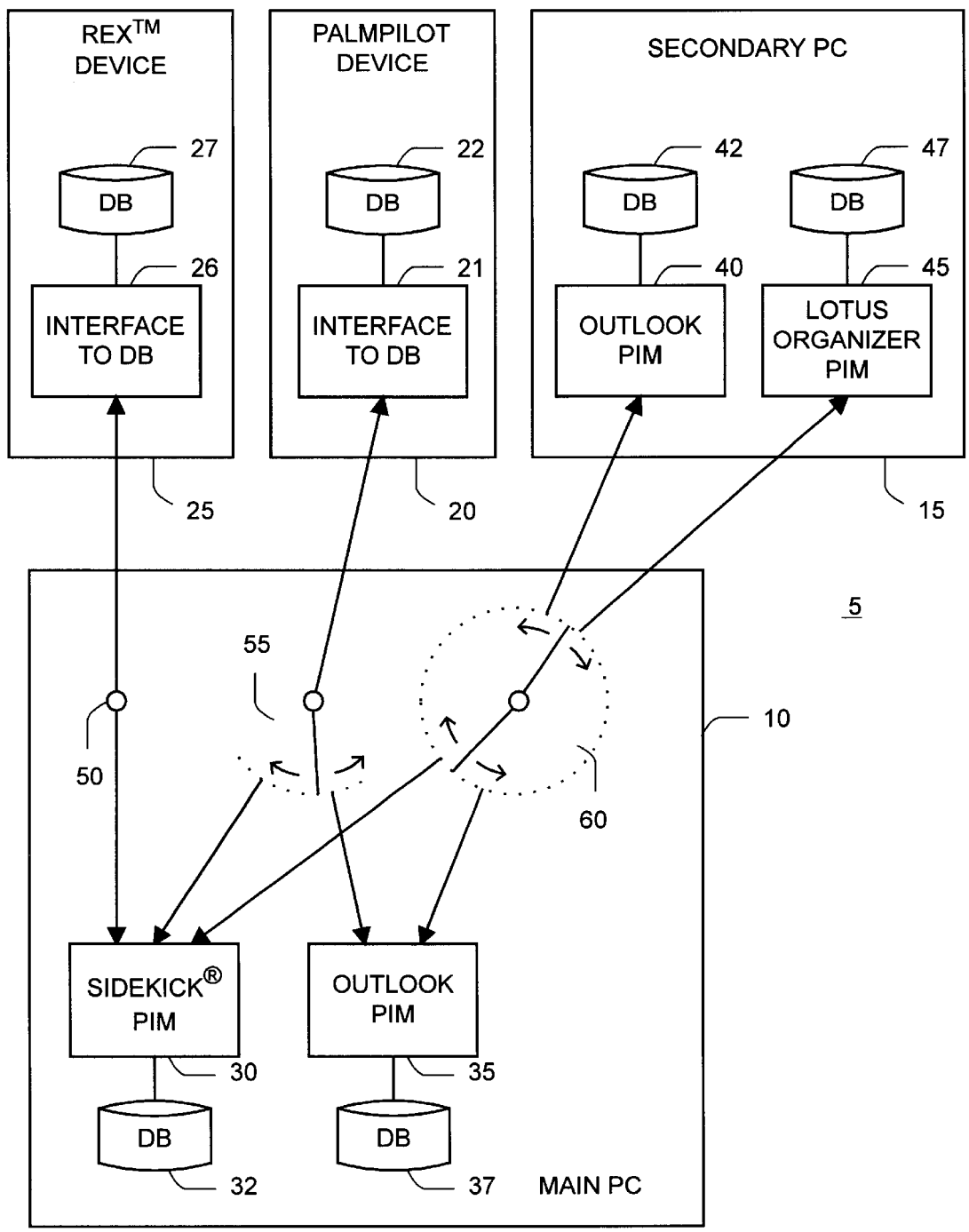
FIG. 1 is a block diagram that shows the conventional approach to synchronization of datasets.

The detailed description is separated into the following chapters:

I. Introduction

II. System Hardware

III. System Software

IV. An External View: The User Interface

V. "Binary-Based" System For Automatic Synchronization of Two Or More Datasets

VI. Comparison of Timestamps From Different Datasets

VII. A Plug-In Architecture For the Synchronizer

VIII. Core of The Synchronizer

IX. Synchronization Methods

X. Additional Embodiment(s)

I. Introduction

A. Datasets, Records, and Synchronization

Datasets are collections of data. According to the present invention, the purpose of synchronizing two, or more than two, datasets is to update them as necessary with data from one another so that they contain the same or equivalent data (generally, the latest data), at least in the portions of the datasets that the user has designated for synchronization. Each dataset may be organized into individual data records. For example, a dataset having contact information may be organized into records, including a record listing a "Bill Smith's" phone numbers and addresses and another record listing a "Ted Brown's" phone numbers and addresses. In general, if records have been added to any dataset before a synchronization, then equivalent records are added to the other datasets as a result of the synchronization. Also, generally, if modifications or deletions of records have been made to one dataset before the synchronization, then equivalent modifications and deletions of corresponding records are made to the other datasets as a result of the synchronization. (The preceding discussion of synchronization according to the present invention becomes more complicated if conflicts or duplicates are present. Conflicts and duplicates are further described in later sections.)

B. Record Files, Data Types, Data Fields, etc.

In synchronizing two, or more than two, datasets, a correspondence is generally established between particular records across the datasets. For example, a contact record for "Bob Smith, of Acme Widgets" may exist in every dataset (perhaps as a result of synchronization), and these records in different datasets may correspond to one another. The records in a dataset may be of various data types, for example, a time-zone type, a contact type, a calendar-entry type, a task (or "to do"-list-entry) type, a memo type, an electronic-mail type, or other types. In general, each record may include data organized into one or more data fields. For example, a contact-type record may include data for a "last name" field, a "first name" field, a "company" field, and many other fields. For many typical data types, it is not necessary for each record of the data type to have data for every possible field. For synchronization, a correspondence is typically established between particular data fields across datasets. For example, a "title" field for contact records in one dataset may correspond to a "Job Title" field for contact records in another dataset. In general, the systems and methodologies of the present invention can be adapted to work with any one type of data, or with any multiple types of data, and with arbitrarily defined or named data fields.

Within a dataset, the records of a particular data type may further be organized into one or more groups that are here referred to as record files. Examples of record files include "Cardfiles" in Starfish's Sidekick® PIM or "folders" in Microsoft's Outlook PIM. A preferred embodiment of the invention allows the user to specify an arbitrary correspondence, or mapping, of particular record files of the same data type in different datasets to each other. For example, the user may specify that a record file named "Business Contacts" in a first dataset, a record file named "Contacts" in a second dataset, and a record file named "Customer List" in a third dataset be mapped to one another. Separately, the user may specify that only a record file named "Calendar" in the first dataset and a record file also named "Calendar" in the third dataset be mapped to each other. As demonstrated by the preceding example, a user-specified synchronization of multiple datasets by the preferred embodiment may include a number of separate synchronizations, each of which synchronizes a set of mutually-mapped, or corresponding, record files. Each synchronization of corresponding record files does not necessarily involve all of the multiple datasets. Each synchronization of corresponding record files also need not necessarily involve the same datasets as other synchronizations of other record files. For simplicity only, unless otherwise stated or unless context demands otherwise, discussion of synchronizing datasets may use language as if to assume that all datasets involved in the synchronization each contains exactly one record file that is mapped to the one record file of all other datasets involved. It is to be understood that this simplification, and other simplifications made for ease of description, are not meant to limit the scope of the invention.

C. Record Transformations

When performing synchronization, a synchronization system transforms records from one dataset's representation into another dataset's representation. For example, the system may transform from an Internet Sidekick® cardfile for business contacts into a synchronization-system-internal representation. Typically, there is a one-to-one relationship between records in the source and target datasets. If this is not the case, however, the component of the system that interacts with a non-conforming dataset (e.g., a dataset accessor, which will be further described) includes logic to handle this non-conformity.

D. Field Mapping Types and Field Conversion Types

Record transformations are a combination of field mappings and conversions from a source record to a target record. It is often the case that there are significant differences in the number, size, type and usage of fields between two datasets in a synchronization relationship. The specification of transformations generally depends on the particular datasets involved., and may be user configurable, with the synchronization system providing defaults.

In a specific embodiment, the following types of field mappings are supported.

| | |
|---|---|
| 1. Null | Source field has no equivalent field in the target dataset and is ignored during synchronization. |
| 2. One-to-One | Map exactly one field in the target to one field in the source. |
| 3. One-to-Many | Map one field in the target to many fields in the source, such as parse a single address line to fields for number, direction, street, suite/apartment, or the like. |
| 4. Many-to-One | Map several fields in the target to one field in the source, such as reverse the address line mapping above. |

The following types of field conversions are supported.

| | |
|---|---|
| 1. Size | Source field may be larger or smaller in size than the target field. |
| 2. Type | Data types may be different, such as float/integer, character vs. numeric dates, or the like. |
| 3. Discrete Values | A field's values may be limited to a known set. These sets may be different from target to source and may be user defined. |

E. Conflicts and Duplicate Records

In general, the user may make arbitrary changes to individual datasets and later synchronize the datasets. In general, each change made to a dataset (for example, addition, modification, or deletion of a record) by its user is propagated to other datasets as a result of a subsequent synchronization. However, it sometimes happens that two, or more than two, changes are in conflict with one another such that the changes cannot all be propagated without one change's undoing or otherwise interfering with another. Such changes give rise to a "conflict." For example, a conflict exists when a user has made a modification to a record in a first dataset, and has separately made a conflicting modification to the record's corresponding record in a second dataset. For a specific example, the user may have set a contact's (e.g., Bob Smith's) "title" field to "salesperson" in his handheld organizer device and separately set the corresponding contact's (Bob Smith's) "title" field to "Sales Manager" on the user's desktop PIM. Automatic and user-assisted methods for resolving conflicts according to the present invention are discussed in later sections.

Occasionally, the user may cause the same, or matching, information to exist in different datasets without using the present invention, and then use the present invention to synchronize the datasets. For example, the user may cause records to exist for a "Bob Smith, of Acme Widgets" in multiple datasets, either by adding such records or by modifying existing records into such records. If the definition of the contact data type requires that the first name, last name, and company information for each contact be unique, then the example records would by definition match one another. In such a situation, simpleminded propagation of each added or modified record in each dataset to all other datasets would result in a duplication of records. Therefore, the present invention performs duplicate resolution to prevent such duplication. Automatic and user-assisted methods for resolving duplicates according to the present invention are discussed in later sections.

F. Timestamps

The present invention often will make processing decisions based on comparing the time at which past events occurred. For example, the system may want to know whether a record in a dataset was modified before or after a most recent synchronization. Therefore, the time of various events should be recorded. One or more "timestamp" values in record fields are dedicated to this purpose. Typically, datasets involved in synchronization can be assumed to support a "last-modification-time" timestamp. Datasets that do not have timestamps, however, can still be synchronized using the present invention, but may require more processing by the present invention (for example, to perform exhaustive record comparisons) or more intervention by the user (for example, during conflict resolution).

In conjunction with the use of timestamps to compare the relative timing of record creation or modification or synchronization, etc., the clocks on the datasets' respective devices may themselves be kept synchronized, or assumed to be synchronized, either to the same value, or to equivalent values, or to values having a constant offset. Equivalent clock values include clock values plus clock time-zone information showing that the clock values correspond to a common time, for example a common Greenwich Mean Time (GMT). Clock values having a constant offset to one another may exist for example if devices that do not include time zone information have clocks set for different time zones. Clock values having a constant offset may also exist if two devices do not have their clocks synchronized, and the user does not wish to, or cannot, synchronize them. For example, the clocks on a server computer and a local computer may not be synchronized, and the user may be unable to reset the server clock, even though it is off by, for example, five minutes. In specific situations, the present invention will work directly with timestamps from the clock of a particular dataset's device without first converting such timestamps to a common time such as time according to the synchronization system's own clock or GMT. This is done, when possible, to minimize problems due to any relative drift in the devices' clocks, such as drifts caused by clock inaccuracies or drifts caused by the user's re-setting of a clock on a device. Comparison of timestamps will be further discussed in later sections.

G. The Conventional Fragmented, Binary Approach

FIG. 1 is a block diagram that shows the conventional approach to synchronization of datasets, as was introduced in the Background section. An example environment 5 includes a main PC 10, a secondary PC 15, a Pilot organizer 20, and a REX® organizer 25. PIM applications Starfish Sidekick® 30 and Microsoft Outlook 35 reside on the main PC 10. PIM applications Microsoft Outlook 40 and Lotus Organizer 45 reside on the other PC 15. The Pilot organizer maintains a dataset 22 and includes an interface 21 (e.g., device software) to the dataset 22. The REX™ organizer maintains a dataset 27 and includes an interface 26 (e.g., device software) to the dataset 27. The PIM applications Sidekick® 30, Outlook 35, Outlook 40, and Organizer 45 maintain the datasets 32, 37, 42, and 47, respectively. A REX™-specific synchronization software module 50 performs binary synchronization between the REX™ organizer's dataset 27 and another dataset, namely, Sidekick®'s dataset 32. A Pilot-specific synchronization software program 55 performs binary synchronization between the Pilot organizer's dataset 22 and a selected one of the datasets 32 and 37 on the main PC 10. A PC-to-PC synchronization software program 60 performs binary synchronization between two datasets selected from the datasets 32, 37, 42, and 47 on the PCs 10 and 15. The synchronization programs 55 and 60 are drawn schematically as rotary contact switches to emphasize that they can select at most two datasets for any one synchronization.

H. A Unified, Not-Necessarily-Binary Approach

Figure 2:
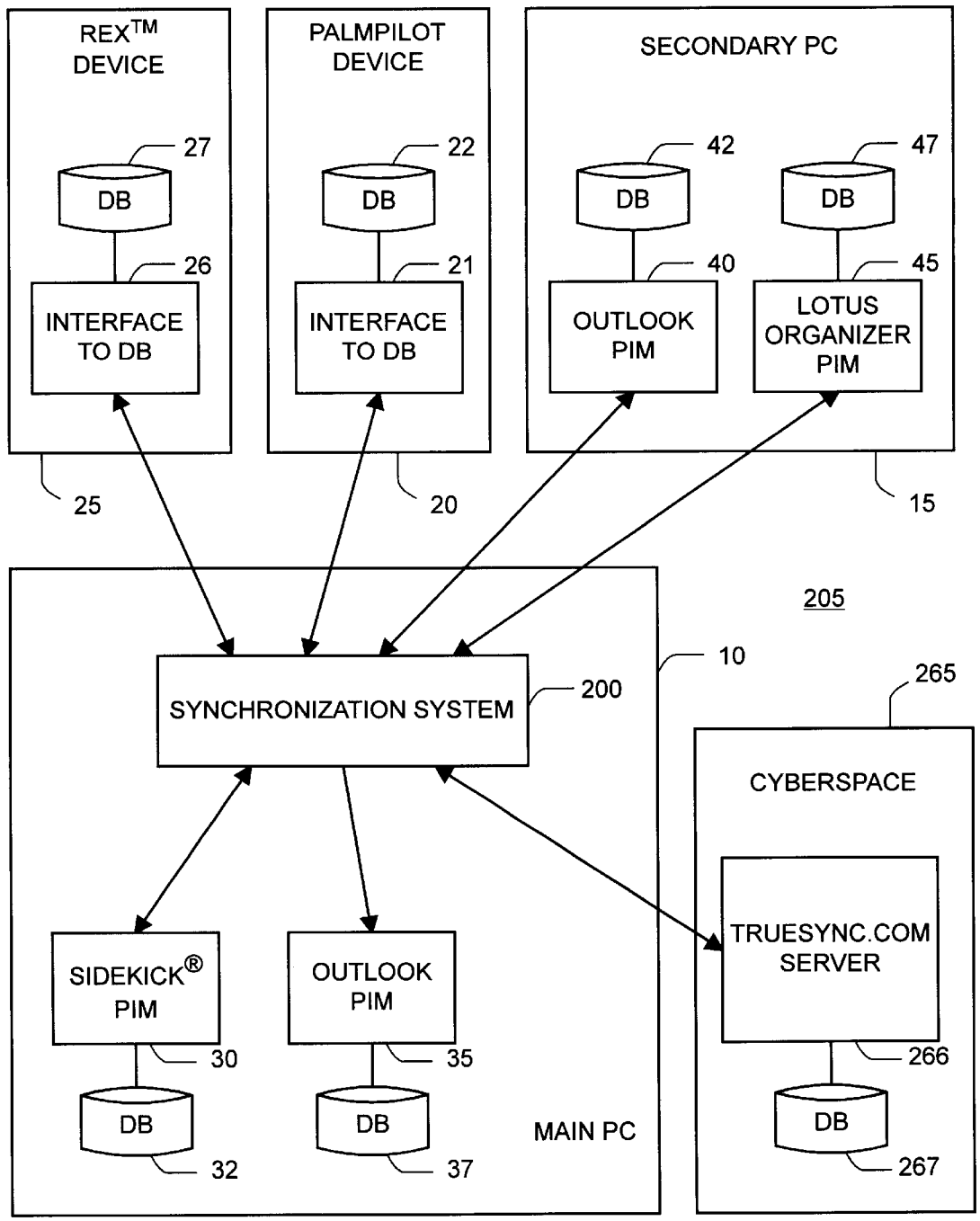
FIG. 2 is a block diagram that shows a synchronization system according to an embodiment of the present invention in an example environment.

FIG. 2 is a block diagram that shows a synchronization system 200 ("Synchronizer") according to an embodiment of the present invention in an example environment 205. As shown, the environment 205 includes a number of elements from the environment 5 of FIG. 1, and other elements. The shared elements retain their numeric labels from FIG. 1 and need not be specifically introduced again. The Synchronizer is a centralized system that can access when available an arbitrary number of datasets, for example, a dataset 267 and the datasets 22, 27, 32, 37, 42, and 47, and other datasets (not pictured), and any sub-combination of such datasets. The arbitrarily many datasets reside in various devices, for example, the main PC 10, the secondary PC 15, the Pilot organizer 20, the REX™ organizer 25, and a cyberspace 265 which includes, for example, the Internet. The dataset 267 resides in the cyberspace 265 and is accessible via an Internet server 266 (for example, an online PIM provided by the TrueSync.com Service of the present assignee, Starfish Software, Inc.; TrueSync® is a registered trademark of Starfish Software, Inc.). The Synchronizer communicates with certain devices, for example, the secondary PC 15 and the cyberspace 265 through communication channels, including for example local or wide area computer networks, telephone networks, infrared or radio-frequency or other wireless networks, or networks that use the Internet Protocol (IP), and others. Datasets do not need to be directly connected but, instead, can be connected via a store-and-forward transport, such as electronic mail. The datasets and devices shown in FIG. 2 are merely examples; the Synchronizer can in general be used with arbitrary other types of datasets and devices, through appropriate interfaces.

The datasets (e.g., 32, 267, etc.) or their control or access logic (e.g., Sidekick® 30, TrueSync.com Internet server 266, etc.) are called clients. Unlike the conventional synchronization systems shown in FIG. 1, the Synchronizer is capable of automatically synchronizing data among an arbitrary number of accessible datasets in a single synchronization session following user selection of datasets, instead of being able to synchronize data between only two datasets in such a session.

I. Synchronization Options and the Synchronizer Dataset

The Synchronizer allows the user to choose the extent to which a particular client participates, or does not participate, in a synchronization. The choices include, for example, no participation (e.g., "do not synchronize"), full participation (e.g., "synchronize"), or one-way participation toward the client (e.g., "overwrite the client"), but are not limited to these choices. "Do not synchronize" means that the client simply will not be involved in the synchronization and generally needs not even be present or accessible during the synchronization. "Synchronize" means that the client will be synchronized at least with those other datasets that are also set to "synchronize" in the synchronization. More particularly, "synchronize" implies that changes (for example, additions, modifications, or deletions), if any, may flow into and may flow out of the client as a result of the synchronization. Even more particularly, "synchronize" implies at least that (1) changes may be made to the client as a result of the synchronization, and (2) changes may be made to other datasets (for example, clients) in response to data in the client as a result of the synchronization. "Overwrite the client" means that the client's data will be overwritten with the result of the synchronization, but the synchronization does not otherwise include the client. Thus, "overwrite the client" implies that changes, if any, may flow into but will not flow out of the client as a result of the synchronization. In general, unless stated otherwise or unless context demands otherwise, discussion of synchronization may assume for simplicity that participating clients are set to fully participate in synchronization.

In a preferred embodiment, the Synchronizer itself includes a dataset, called the Synchronizer dataset, that contains the most up-to-date data as seen during any synchronization of datasets for a user since the Synchronizer dataset was created or last reset. The Synchronizer dataset may also contain much status information about the records within it. The Synchronizer is capable of having multiple Synchronizer datasets, each being used for a particular user of the Synchronizer. A single person may choose to be more than one Synchronizer user (i.e., own multiple Synchronizer datasets) if he or she wishes for some reason to have multiple, separate "worlds" of data. For example, the person may want one world of data for a first set of clients (e.g., REX™, Pilot, and Outlook) and another world for a second set of clients (e.g., Sidekick® and TrueSync.com Server) that, for example, does not overlap with the first set. For another example, the person may want additional worlds of data for experimental or archival (back-up) purposes. In general, unless otherwise stated or unless context demands otherwise, discussion will refer for simplicity to synchronization for a single particular user, and reference will be made, for example, to "the Synchronizer dataset" to mean "the Synchronizer dataset corresponding the single particular user."

The Synchronizer optionally allows the user to reset the Synchronizer dataset to be empty, such that it will later be filled anew with the result of a next synchronization of one or more clients. The Synchronizer may also allow the user to overwrite the contents of the Synchronizer dataset with the contents of a single client (this is akin to resetting the Synchronizer dataset to be empty and then synchronizing just the single client "by itself"). In a specific embodiment, allowing the Synchronizer dataset to be reset or overwritten is considered to be an advanced feature that is reserved for advanced users or is accompanied by warnings or requests for confirmation. In connection with specific embodiments of the invention, the Synchronizer dataset is also known as the Unified Database, or the "Grand Unification Database," or "GUD."

To illustrate one benefit of having the Synchronizer dataset, consider the following example scenario. A first client (e.g., the REX™ organizer) participates in a first synchronization with a first group of other clients (even zero other clients) and contributes a particular change (e.g., addition, modification, or deletion of a record) to the other participating clients and also automatically to the Synchronizer dataset. A second client (e.g., the TrueSync.com server) does not participate in the first synchronization. Later, the second client participates in a second synchronization with a second group of other clients (even zero other clients), none of which other clients has yet received the particular change via synchronization or via independent data entry. In this second synchronization, the second client can still receive the particular change because the particular change is in the Synchronizer dataset, which is preferably always available for full participation in synchronization. (One way to ensure that the Synchronizer dataset is always available is to have the Synchronizer store the Synchronizer dataset on the Synchronizer's local machine, or on another machine that is known or assumed to be always available.) The synchronization options and the Synchronizer dataset will be further discussed in later sections.

II. System Hardware

Figure 3A:
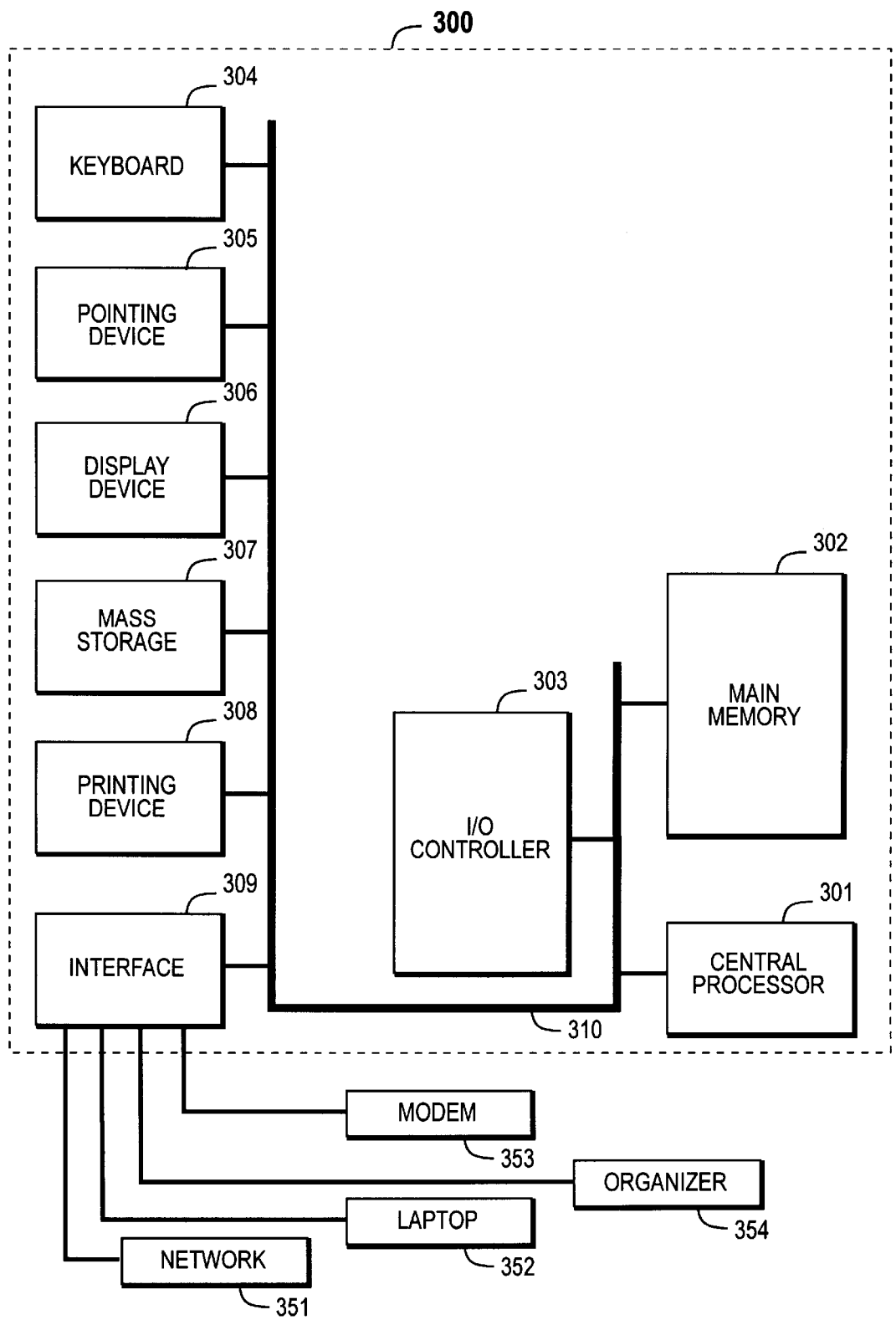
FIG. 3A is a block diagram of a computer system in which the present invention may be embodied.

The present invention may be embodied on an information processing system such as the system 300 of FIG. 3A, which comprises a central processor 301, a main memory 302, an input/output (I/O) controller 303, a keyboard 304, a pointing device 305, pen device (or the like), a screen or display device 306, a mass storage 307 (e.g., hard disk, removable floppy disk, optical disk, magneto-optical disk, or flash memory, etc.), one or more optional output device(s) 308, and an interface 309. Although not shown separately, a real-time system clock is included with the system 300, in a conventional manner. The various components of the system 300 communicate through a system bus 310 or similar architecture. In addition, the system 300 may communicate with other devices through the interface or communication port 309, which may be an RS-232 serial port or the like. Devices which will be commonly connected to the interface 309 include a network 351 (e.g., LANs or the Internet), a laptop 352, a handheld organizer 354 (e.g., the REX™ organizer, available from Franklin Electronic Publishers of Burlington, N.J.), a modem 353, and the like.

In operation, program logic (implementing the methodology described below) is loaded from the storage device or mass storage 307 into the main memory 302, for execution by the processor 301. During operation of the program (logic), the user enters commands through the keyboard 304 and/or pointing device 305 which is typically a mouse, a track ball, or the like. The computer system displays text and/or graphic images and other data on the display device 306, such as a cathode-ray tube or an LCD display. A hard copy of the displayed information, or other information within the system 300, may be obtained from the output device 308 (e.g., a printer). In a preferred embodiment, the computer system 300 includes an IBM PC-compatible personal computer (available from a variety of vendors, including IBM of Armonk, N.Y.) running Windows 9x or Windows NT (available from Microsoft Corporation of Redmond, Wash.). In a specific embodiment, the system 300 is an Internet or intranet or other type of network server and receives input from and sends output to a remote user via the interface 309 according to standard techniques and protocols.

III. System Software

Figure 3B:
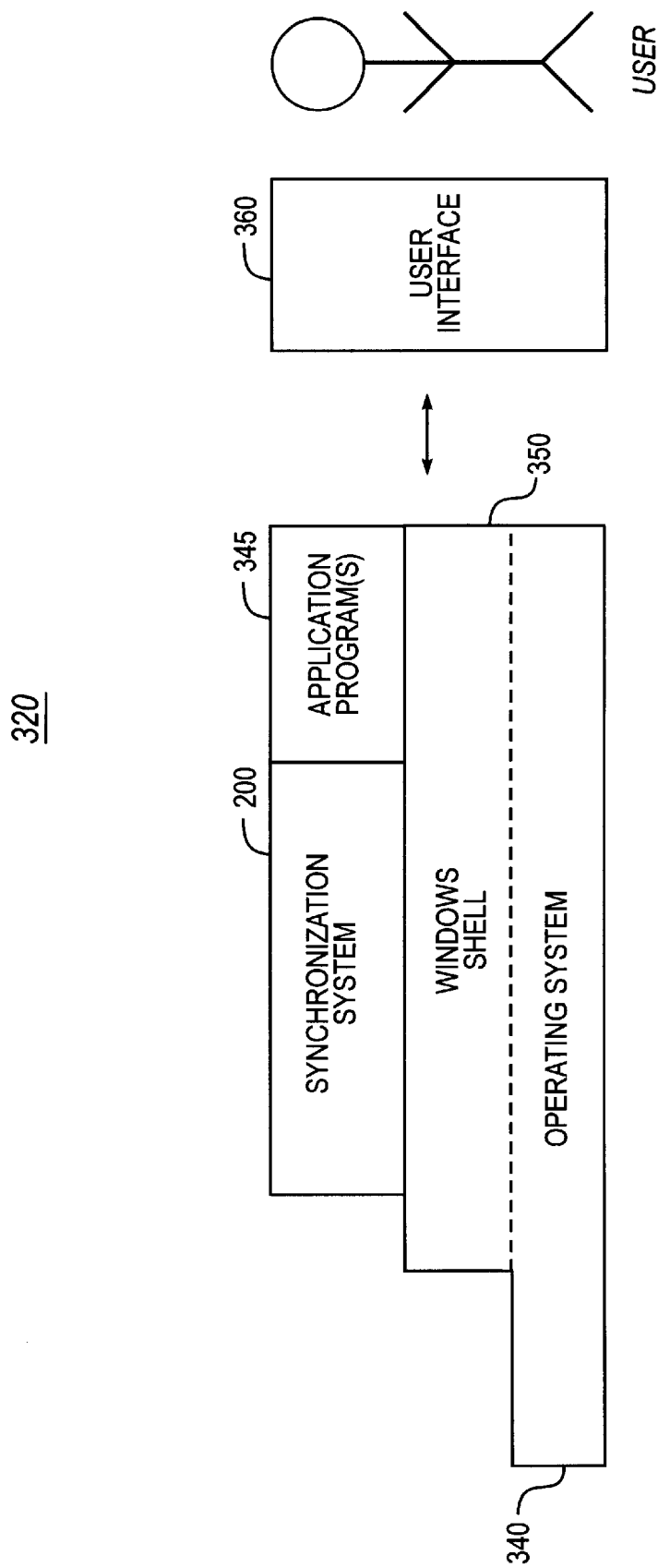
FIG. 3B is a block diagram of a software system of the present invention for controlling operation of the system of FIG. 3A.

Illustrated in FIG. 3B, a computer software system 320 is provided for directing the operation of the computer system 300. Software system 320, which is stored in system memory 302 and on storage (e.g., disk memory) 307, includes a kernel or operating system (OS) 340 and a windows shell 350. One or more application programs, such as client application software or "programs" 345 may be "loaded" (i.e., transferred from storage 307 into memory 302) for execution by the system 300.

System 320 includes a user interface (UI) 360, preferably a Graphical User Interface (GUI), for receiving user commands and data and for producing output to the user. These inputs, in turn, may be acted upon by the system 300 in accordance with instructions from operating system module 340, windows module 350, and/or client application module(s) 345. The UI 360 also serves to display the user prompts and results of operation from the OS 340, windows 350, and application(s) 345, whereupon the user may supply additional inputs or terminate the session. In the preferred embodiment, OS 340 and windows 345 together comprise Microsoft Windows software (e.g., Windows 9x or Windows NT). Although shown conceptually as a separate module, the UI is typically provided by interaction of the application modules with the windows shell and the OS 340. One application program 200 is the Synchronizer according to embodiments of the present invention, which will now be described in further detail.

IV. An External View: The User Interface

A. Overview

Figure 4A:
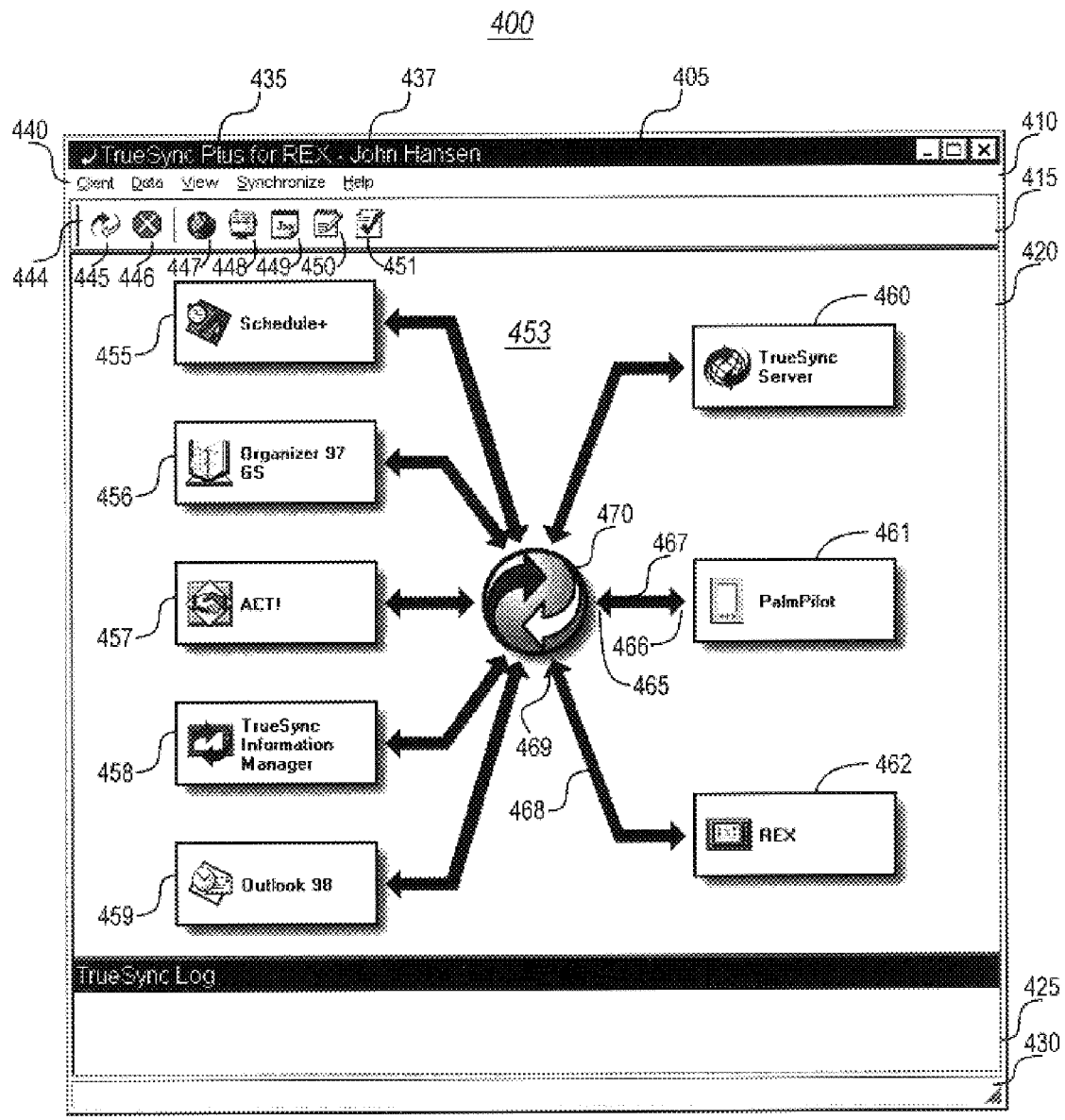
FIG. 4A is a screen-shot that shows a graphical user interface provided by the Synchronizer, according to a preferred embodiment of the invention.

FIG. 4A is a screen-shot that shows a graphical user interface 400 provided by the Synchronizer, according to the preferred embodiment of the invention. The GUI 400 includes a title bar 405, a menu bar 410, a tool bar 415, a client-chart window 420, a user log window 425, and a status bar 430. The Synchronizer displays its own name 435 and a current user's name 437 on the title bar. The Synchronizer provides several pull-down menus 440 on the menu bar. The pull-down menus may include, for example, "Client," "Data," "View," "Synchronize," and "Help" menus. The Synchronizer provides several pushbuttons 444 on the tool bar as shortcuts for common or important menu commands. These pushbuttons may include, for example, a start-synchronize button 445 or a halt-synchronize button 446. The pushbuttons may also include buttons for initiating interactive configuration of options for individual data types, such as a contact data type, by the user. Examples of such buttons include a configure-time-zones button 447, a configure-contacts button 448, a configure-calendar button 449, a configure-memos button 450, or a configure-task-list button 451. The Synchronizer displays a client chart 453 in the client-chart window 420. The client chart includes representations of the clients and representations of the flow of dataset changes (somewhat informally, "data flow"). The representations of clients include, for example, visual client indicators 455, 456, 457, 458, 459, 460, 461, or 462. The representations of the data flow include, for example, visual client data-flow direction indicators 465, 466, or 469, client data-path indicators 467 or 468, and a client nexus indicator 470, which all may be called data-flow indicators. The Synchronizer displays summary information about each synchronization session in the user log window. Examples of summary information include counts of records added, modified, or deleted from each client during a synchronization, and any warning or error messages. In general, summary information for each summary session persists as a permanent record, but the user may set a time period (e.g., a week) after which summary information will be deleted. The Synchronizer displays run-time status information in the status bar. Examples of displayed run-time status information include, but are not limited to, "initializing REX," "determining changes from REX," "distributing record modifications," and "uninitializing REX."

Figure 4B:
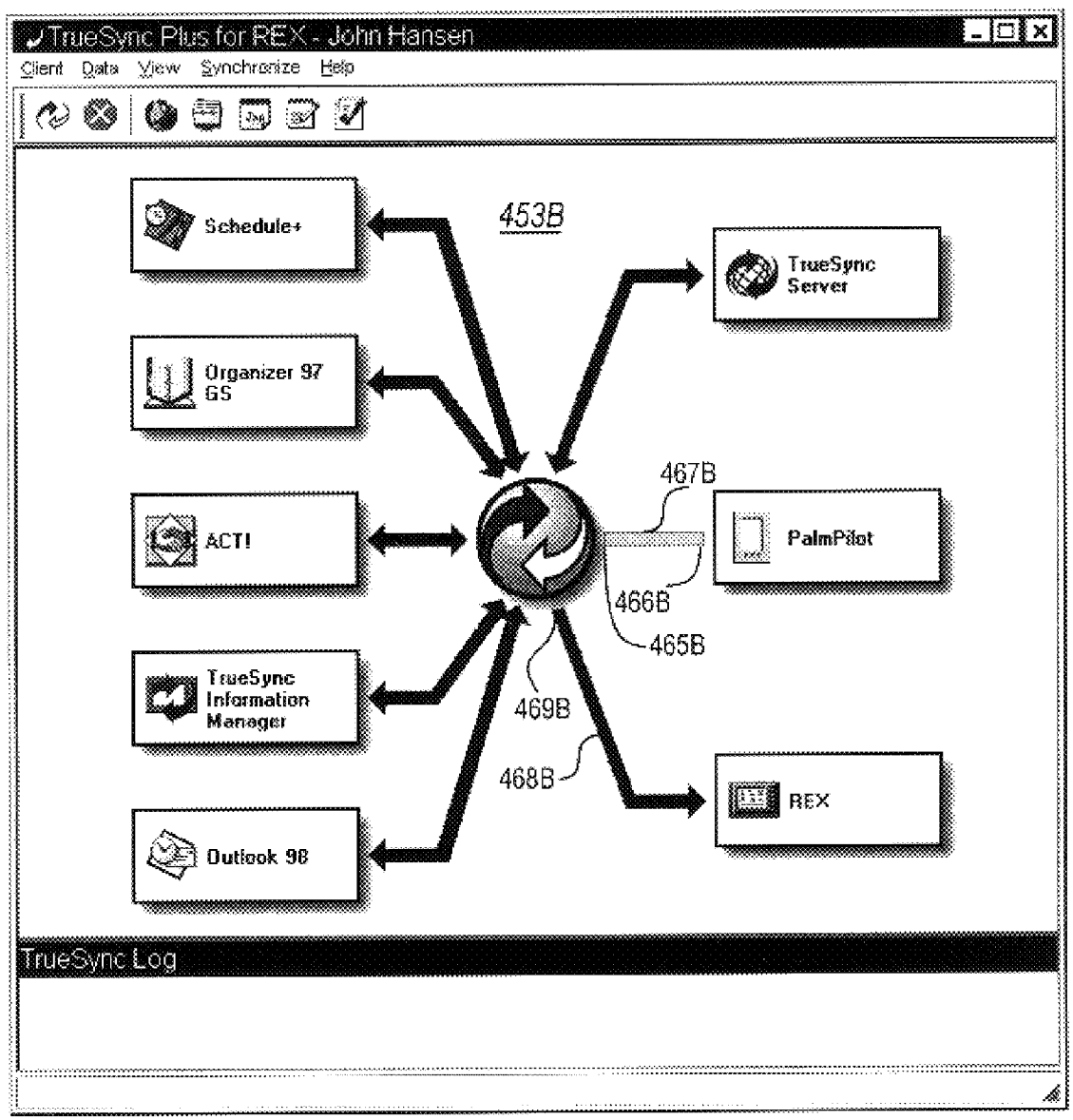
FIG. 4B is a screen-shot that shows the graphical user interface of FIG. 4A at a different moment.

FIG. 4B is a screen-shot that shows the graphical user interface 400 at a different moment, for example, after the user has modified the settings for the Synchronizer. In particular, the client chart 453 of FIG. 4A has been re-drawn by the Synchronizer as a client chart 453B to reflect the modified user settings. More particularly, the client chart 453B includes certain visual representations of the data flow that are changed as compared to the representations found in FIG. 4A. Even more particularly, the client data-flow direction indicators 465, 466, and 469 and the client data-path indicators 467 and 468 of FIG. 4A have been replaced in FIG. 4B by the indicators 465B, 466B, 469B, 467B, and 468B, respectively. The client charts 453 and 453B and their components will be further explained below. Unless reference is specifically made to FIG. 4B, the following explanation of the client charts and their components will refer to FIG. 4A. In the following discussion, the numeric labels (e.g., 455, 456, ..., 462) from FIG. 4A for client indicators may also be used to accompany references to the client indicators' respective corresponding clients, but it will be apparent from the context whether the client indicator or the client is meant and whether the distinction is important for the particular discussion.

B. Visual Representation of Clients

The Synchronizer displays client indicators, for example the client indicators 455–462, in the client chart 453 each to represent known clients (e.g., datasets). Particular client indicators may represent local or network-connected software applications, such as PC-style applications. Examples include the Schedule+PIM indicator 455, the Organizer PIM indicator 456, the ACT! PIM indicator 457, the TrueSync® Information Manager PIM indicator 458, or the Outlook PIM indicator 459. Client indicators may also represent Internet-based or intranet-based services (e.g., World Wide Web sites, and the like). An example is the TrueSync.com server visual indicator 460. Client indicators may also represent small or special-purpose devices or applications on such devices. Examples include the PalmPilot indicator 461 or the REX® indicator 462. The Synchronizer according to the preferred embodiment displays the client elements grouped according to client type. For example, the Synchronizer may display the client indicators 455, 456, 457, 458, and 459, which correspond to local or PC-style applications, adjacent to one another and in a group, as is shown. Similarly, the Synchronizer may display the client indicators 461 and 462, which correspond to small devices, adjacent to one another and in a group, as is shown. Likewise, the Synchronizer may display the TrueSync.com server indicator 460, which corresponds to Internet-based services, in its own group, as is shown, with other services, if any. The example client indicators 455–462 are shown as labeled rectangles, but other shapes or visual features may be also be used.

C. Visual Representation of the Flow of Dataset Changes

The Synchronizer displays data-flow indicators (for example, the indicators 465, 466, 467, or 468) to illustrate and summarize the possible flow of changes (e.g., additions, modifications, or deletions) into or out of each client or among clients according to current settings. Examples of data flow indicators include data-path indicators (for example, the indicators 467 or 468) which include lines (or another form) that schematically depict paths for changes to flow to or from individual clients, which clients are represented by their corresponding client indicators. Examples of data-flow indicators also include data-flow direction indicators (for example, the arrowheads 465 or 466, or the arrow stumps 465B and 466B of FIG. 4B) which indicate possible or impossible direction(s) in which changes may flow for particular clients according to current settings. For example, the arrowhead 465 points away from its corresponding client indicator 461 to indicate that changes may flow from the client 461 during a next synchronization according to current settings. Conversely, the arrowhead 466 points toward its corresponding client indicator 461 to indicate that changes may (also) flow into the client 461 during the next synchronization according to current settings. Separately, the arrow stumps 465B and 466B (both from FIG. 4B) respectively indicate that changes will neither flow out of nor into the client 461.

If the current settings call for a particular client to participate fully in synchronization, then the Synchronizer would display data-flow direction indicators showing that changes may flow both into or out of the particular client. If the current settings call for a particular client's dataset to be overwritten during synchronization, then the Synchronizer would display data flow indicators showing that changes may flow only into the particular client. If the current settings call for a particular client not to participate in synchronization, then the Synchronizer would display data flow indicators showing that changes do not flow to or from the particular client. Preferably, the data-path indicator, if shown at all, for the particular client would be shown in a different color (e.g., "greyed out") as compared to a data-path indicator for a client that is set to participate in synchronization. If the current settings call for a particular client's data to overwrite the Synchronizer dataset (and recall that this may be considered an advanced and generally rarely used setting), then the Synchronizer would display data flow indicators showing that changes may flow only out of the particular client, and preferably the Synchronizer would require that all other clients must be set to be overwritten or to "not participate" in the next synchronization. (This restriction avoids complicated-looking client charts, which may confuse the user, especially if the user is not knowledgeable about the Synchronizer.) A particular embodiment makes an additional simplifying restriction that if the current settings call for a particular client's data to overwrite the Synchronizer dataset, then at most one other client can be set to be overwritten and all remaining clients must be set to "not participate" in the next synchronization. Another particular embodiment makes a further simplification that if the current settings call for a particular client's data to overwrite the Synchronizer dataset, then there must be one and only one other client, and that other client must be set to be overwritten.

In general, each client indicator (e.g., Pilot indicator 461) may have an associated data-path indicator(s) (e.g., line 467) which may include associated data-flow direction indicator (s) (e.g., arrowheads 465 and 466). Preferably, data-flow direction indicators are arrowheads or the absence of such arrowheads(s) (e.g., arrow stumps without arrowheads or greyed-out arrowheads, or the like). Preferably, each data-path indicator is a line which may be bi-directional or unidirectional (e.g., has one or two associated arrowheads), depending on the current settings. Other configurations are possible. For example, each client indicator may have up to two lines (e.g., parallel lines) as its data-path indicator, wherein each line is a unidirectional arrow and thus is also a data-flow direction indicator, and wherein the entire line is absent or greyed-out if changes cannot flow along the indicated direction based on current settings. For another example, data-flow direction indicators may be colors (e.g., green for two-way, yellow for one-way, red for zero-way), letters, numbers, or other graphical indicia. For example, data-flow direction indicators may be animations, for example, "moving lights" (e.g., successively lit-up "light bulbs," or the like) or other animated graphics. These animations may be near or along the path-way indicators. A light or other graphic "moving" away from a client (e.g., a string of "light bulbs") and a light or other graphic "moving" toward the same client may, or may not, overlap in time or space. For example, a graphic that moves away from a client, and a graphic that moves toward the same client may each begin from opposite ends of a line at about the same time and traverse the line at about the same speed (thus, greatly or completely overlapping in time), and either pass by (non-overlapping in space) or pass through (overlapping in space) each other along the line. Still other configurations or schemes are possible.

As shown in FIG. 4A for an embodiment of the invention, the data-flow indicators (e.g., the indicators 465, 466, 467, or 468) describing flow from individual client indicators (e.g., the indicators 461 and 462) converge at the nexus indicator 470. By way of this configuration, the user may visually trace data flow from client indicator to client indicator (e.g., from indicator 461 to indicator 462). As shown, the nexus indicator 470 is displayed as a generally centrally located "hub," preferably as a circle, and preferably with the image of at least one arrow upon it. (Two arrows, both pointing generally clockwise, or both pointing generally counterclockwise, are preferred.) Other configurations or schemes are possible. For example, the nexus indicator 470 may alternatively simply be a general vicinity of empty display-screen space that serves as a nexus for flow indicators from clients to converge. Such an empty space may be, for example, a generally centrally located space, for example, of approximately the same size as a client indicator. For another example, the nexus indicator 470 may alternatively be displayed as a straight or winding or bent line (e.g., a "street"), and the individual data path indicators (e.g., "driveways") may tap into the line at separate points, preferably at approximately right angles. The "street" may have driveways on both sides or only one side. Also, the street may be located generally in the center of the client chart (e.g., as a horizontal line segment), or the street may form a border that surrounds the client indicators. Still other configurations or schemes are possible.

D. Visual Representation of the Synchronizer

The nexus indicator 470 according to the preferred embodiment not only represents the conceptual place where data paths from individual clients converge but also represents the Synchronizer itself. Thus, the nexus indicator 470 is also a synchronizer indicator 470 in the preferred embodiment. Preferably, when the Synchronizer is actively synchronizing, the nexus indicator 470 indicates this activity by changing its appearance. In the preferred embodiment, the nexus indicator 470 is a circle imprinted with two arrows, as described earlier, and indicates that synchronization is ongoing by rotating, preferably in the direction of the two arrows on the indicator 470, i.e., clockwise about its center.

In the client chart 453 shown in FIGS. 4A and 4B, the Synchronizer dataset is represented along with the rest of the Synchronizer by the nexus indicator 470. In an alternative embodiment of the Synchronizer (not shown), the Synchronizer displays a client chart that separately represents the Synchronizer dataset as if it were another client (e.g., as another satellite around the Synchronizer hub). In particular, the client chart would include a Synchronizer dataset indicator (not pictured) that is like a client indicator but may be highlighted in some way, for example, by having special appearance, including special position, or by having data flow indicators that have a special appearance or position, and so forth, as compared to client indicators. For example, the Synchronizer dataset indicator may be closer to the Synchronizer indicator 470 than the client indicators.

In general, the Synchronizer dataset is utilized in every synchronization, and therefore the Synchronizer dataset indicator would generally be displayed as if representing a client that participates in synchronization, e.g., with at least one data-flow direction indicator (e.g., arrow) in the "on" or "present" state. For example, data-flow direction indicators showing possible two-way flow from the Synchronizer dataset imply that at least one client is set to be synchronized; data-flow direction indicators showing possible one-way flow only, into the Synchronizer dataset, show that the Synchronizer dataset has been set to be overwritten with the result of synchronization; and data-flow direction indicators showing possible one-way flow only, out of the Synchronizer dataset, show that all participating clients are set to be overwritten. Particular embodiments may permit special synchronization modes, in which the Synchronizer dataset indicator may instead be displayed as a client that does not participate in synchronization. An example of such a special synchronization mode is one in which the user specifies that the Synchronizer dataset is to be cleared (e.g., reset) both before and after synchronization.

E. Accepting User Input

1. Using the Client Chart to Accept User Input

The client indicators (e.g., indicators 455 or 462, etc.) and the synchronizer indicator 470 are useful in accepting user input. In particular, the Synchronizer is programmed to allow the user to "select" or "shift focus to" such an indicator for changing the settings relevant to the indicated client or the indicated Synchronizer. For example, in the preferred embodiment, the Synchronizer permits a user to first position a cursor (not shown) over an indicator using a pointing device 305 (from FIG. 3A) and then hit a key (e.g., a left mouse button) or other similar input to select the indicator to modify its options. This action is commonly termed "clicking on" the indicator (or "left-clicking on" the indicator, if the left mouse button is used). In the preferred embodiment, the Synchronizer responds to a left-click on a client indicator (e.g., indicator 462) by displaying an options dialog box by which the user can change synchronization and other settings for the indicated client (e.g., the REX™ organizer). Similarly, the Synchronizer responds to a user click on the right mouse key, when the cursor is over a client indicator, by bringing up a more terse dialog box having commonly chosen commands from the options dialog box (e.g., "Overwrite this client" or "Overwrite the <Synchronizer dataset>") for quick access by the user, and an "Options . . . " command (or a similar command) that brings up the options dialog box in case the user desires access to the full range of choices from the options dialog box. In the preferred embodiment, the Synchronizer responds to a left-click on the Synchronizer indicator by starting synchronization. The Synchronizer may also respond to a click on the Synchronizer indicator (or on the Synchronizer dataset indicator, if any) by displaying an options dialog box by which the user can change synchronization and other settings for the Synchronizer in general or for the Synchronizer dataset.

Other schemes for using the graphical client indicators and the synchronizer indicator for accepting user input are possible. For example, the Synchronizer can, in an alternative embodiment, display a "focus" indicator near a single client or synchronizer indicator, and allow the user to shift the focus to another client or synchronizer indicator using, e.g., forward or backward cursor keys or the tab or shift-tab keys on the keyboard, or similar inputs. The Synchronizer can then allow the user to select a highlighted indicator for modifying its options by depressing an "enter" or space key on the keyboard, or another input on any user input device. Focus indicators may take many forms, including for example a highlight such as a border, symbol, "backlighting," and/or color change, etc.

2. Choosing Client and Synchronizer Settings

Figure 5A:
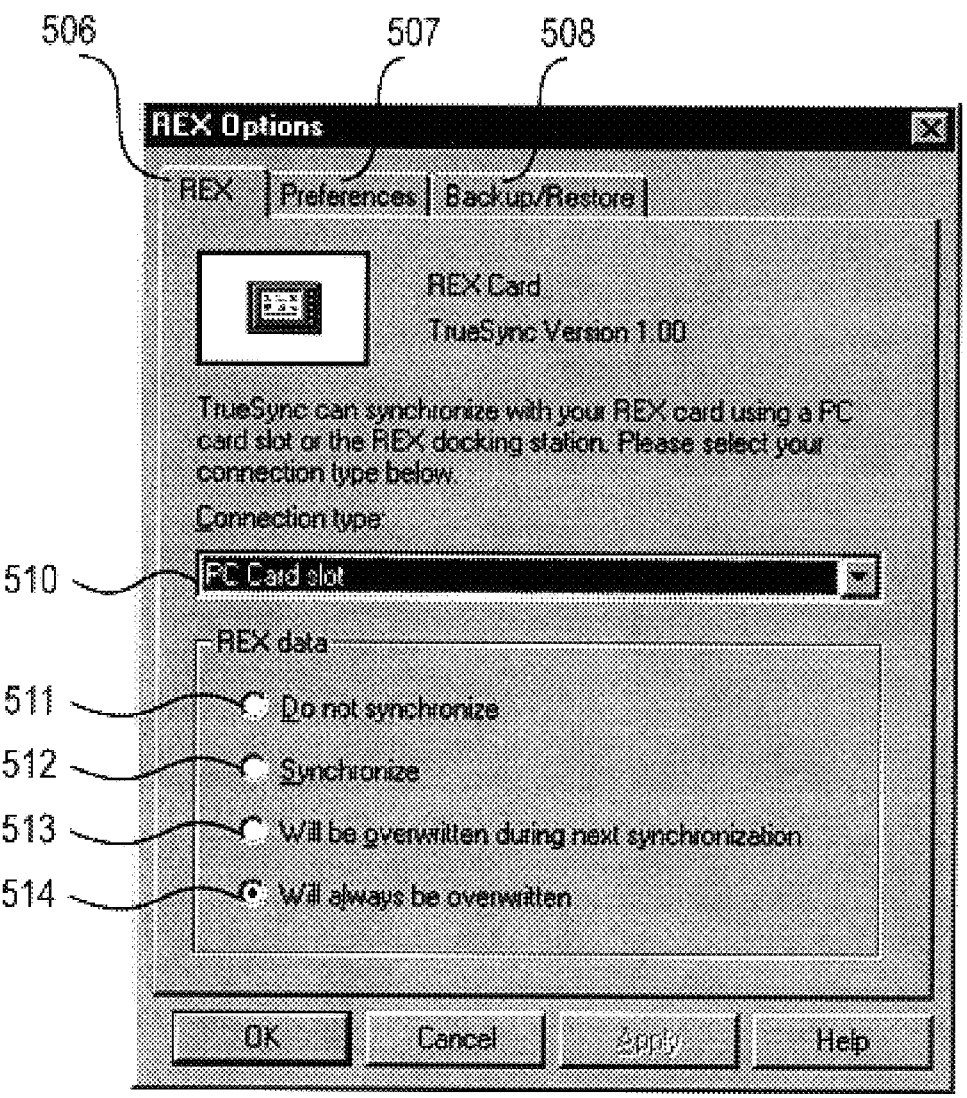
FIG. 5A is a screen-shot of an options dialog box for changing synchronization and other settings for an example client, the REX™ organizer.

FIG. 5A is a screen-shot of the options dialog box 505 for changing synchronization and other settings for an example client, the REX™ organizer. In general, each client will have an options dialog box, and these boxes may differ for each client according to the particular capabilities of each client or according to the necessary or available options for each client. (Incidentally, such client-specific behavior is easy to implement, in light of the Synchronizer's modular underlying architecture, as will be described in other sections.) In certain embodiments of the invention, an options dialog box is also implemented for changing synchronization and other settings for the Synchronizer dataset.

The options box 505 includes a number of tabbed panels, including for example, a synchronization panel 506, a preferences panel 507, or a backup/restore panel 508. The synchronization panel 506 includes a listing of synchronization settings for the client which may be chosen by the user (e.g., by mouse-clicking). In particular, the possible settings include a do-not-synchronize setting 511, a synchronize setting 512, an always-overwrite-client setting 514, and an overwrite-client-once setting 513. These possible settings have been discussed in an earlier section. The synchronization settings 511, 512, 513, and 514 are generally applicable to typical clients, and thus are typically found in the options dialog box for any client, but selected settings may be omitted from the options dialog box for specific clients or for the Synchronizer. The synchronization panel 506 also includes other settings that are more client-specific, such as a connection-type setting 510.

The connection-type setting 510 is a choice of a connection type (e.g., PC-Card slot or a serial cradle) to be used for communicating with REX™, the example client. For example, the user may select the connection-type setting 510 from available choices "PC-Card slot" or "Docking station on COM port 1," or "Docking station on COM port 2," etc. (The choices may be displayed on, for example, a pop-up list, as shown, or another type of selector.) For other clients on other devices, connection-type settings could include infrared port, modem, Internet server, etc. The preferences panel 507 includes other settings (generally client-specific settings) for the user's adjustment. The backup/restore panel 508 permits the user to generate a back-up copy of the client's dataset or to select previously generated back-up cop(ies) of the client's dataset for restoration to the client.

As discussed in a previous section, the options dialog box 505 may be invoked by, e.g., clicking on the corresponding client indicator on the client chart. The options dialog box 505 may also be invoked by navigating the pull-down menus 440 (shown in FIG. 4A). In particular, the options dialog box 505 may be invoked by pulling open the "Client" menu and selecting a revealed "REX Options . . . " menu command (not shown). Other commands on the "Client" menu include commands for invoking options dialog boxes for the other clients. For example, these other commands include "Schedule+Options . . . ," "Outlook 98 Options . . . ," etc. The other commands on the "Client" menu also include an "Add" command for adding new clients to the Synchronizer's awareness, a "Remove" command for removing clients, and a Backup/Restore command for generating back-up copies of various client(s)' data or for restoring previously backed-up copies of data to particular client(s).

3. Choosing Data-Type Settings

The "Data" menu, when pulled open, includes commands for changing settings related to particular data types. These commands include, for example, a "Time Zones . . . " command, a "Contacts . . . " command, a "Calendar . . . " command, a "Memos . . . " command, and a "To-Do List" command. (Recall that these commands can also be invoked using the shortcut pushbuttons 447, 448, 449, 450, and 451, respectively, from the tool bar 415, as shown in FIG. 4A. Settings for a particular data type include user choices for mapping record files of the particular data type in each dataset to record files of the particular data type in every other dataset. Settings for a particular data type also include user choices for mapping data fields across datasets for each mapping of record files across datasets. The mappings (both of record files and of data fields) may be attempted automatically by the Synchronizer (e.g., by string-matching and thesaurus-string-matching filenames or field names across datasets and matching files or fields to one another if their names are the closest string-match or thesaurus-string-match available). The mappings (both of record files and of data fields) may also be chosen directly by the user, perhaps with the automatically-generated mappings as a starting point or default choice. In the preferred embodiment, automatic mapping of data fields is performed as described, for example, in commonly-owned U.S. patent application Ser. No. 09/020,047, entitled METHODS FOR MAPPING DATA FIELDS FROM ONE DATA SET TO ANOTHER IN A DATA PROCESSING ENVIRONMENT, the disclosure of which has been incorporated by reference. Automatic record file mapping may be performed by analogous methods, except that record file names are used instead of data-field names. Settings for a particular data type also include a user choice of whether to exclude records of the particular data type from synchronization.

a. Choosing Mappings of Record Files

Figure 5B:
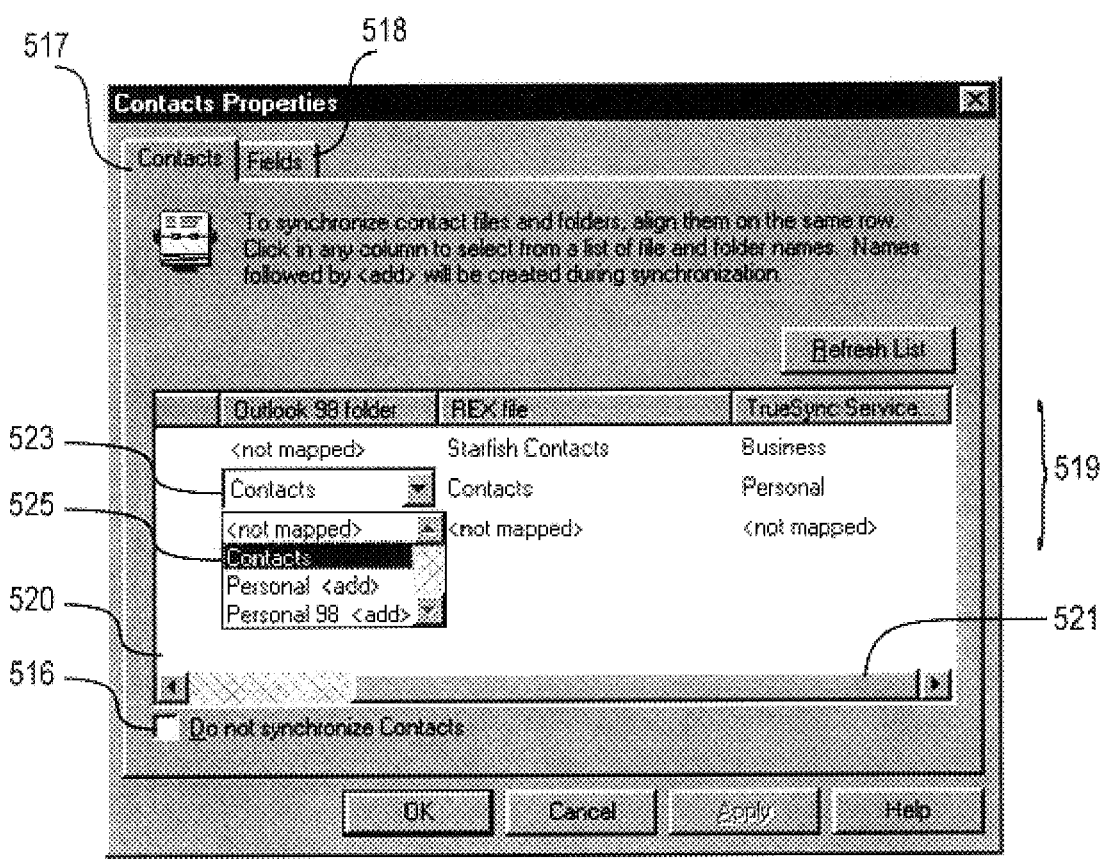
FIG. 5B is a screen-shot that shows a dialog box for changing options related to the Contacts data type.

FIG. 5B is a screen-shot that shows a view of a dialog box 515 displayed by the Synchronizer for changing options related to the Contacts data type. The Synchronizer displays the dialog box 515 in response to the "Contacts . . . " command. The dialog box 515 includes a toggle box 516 by which the user can choose whether the Synchronizer is to exclude the particular data type from synchronization. The view includes an active, or exposed, tabbed record-file-mapping panel 517 that displays current mappings for record files and accepts user input for modifying these mappings. Another tabbed panel, panel 518, is not active in the view of FIG. 5B. As shown, a record-file-mapping table 519 (e.g., a two dimensional matrix) is used to represent the record file mappings. The columns of the table 519 represent clients. The rows of the table each represents a mapping of record files, such that the record files named in each row are mapped to each other. In each row (i.e., each mapping), certain cells may contain "<not mapped>" (or another indicator) to show that the particular mapping does not include any record file from the cell's corresponding dataset (i.e., column). Note that a single table, namely table 519, is used to display, and accept user changes to, current mappings for an arbitrary number of clients, for example, for more than two clients. If the table 519 is too large to be fully displayed in the dialog box, then the table 519 is a virtual table, only a portion of which is viewable at one time through a viewing window 520 in the dialog box, and vertical and/or horizontal scroll bars (for example, a horizontal scroll bar 521) will be used to move the virtual table 519 vertically and/or horizontally with respect to the viewing window.

The method of accepting user input for changing record file mappings is as follows. Consider a particular cell (for example, a cell 523) in the table 519. This particular cell corresponds to a particular client, or column. If a user clicks on the particular cell, the Synchronizer displays a pop-up list (for example, a pop-up list 525), preferably near the particular cell, of candidates for a record-file name to appear in the particular cell. The candidates include the names of all record files in the particular client. If other cells in the particular cell's row contain record-file names (from other clients) that differ from the record file names in the particular cell's client, then those different names, appended with the text "<add>" (or another indicator), are also included in the candidates. The addition of the text "<add>" to a candidate indicates that, if the candidate is chosen, the Synchronizer will add a record file having the candidate name to the particular client.

b. Choosing Mappings of Data Fields

Figure 5C:
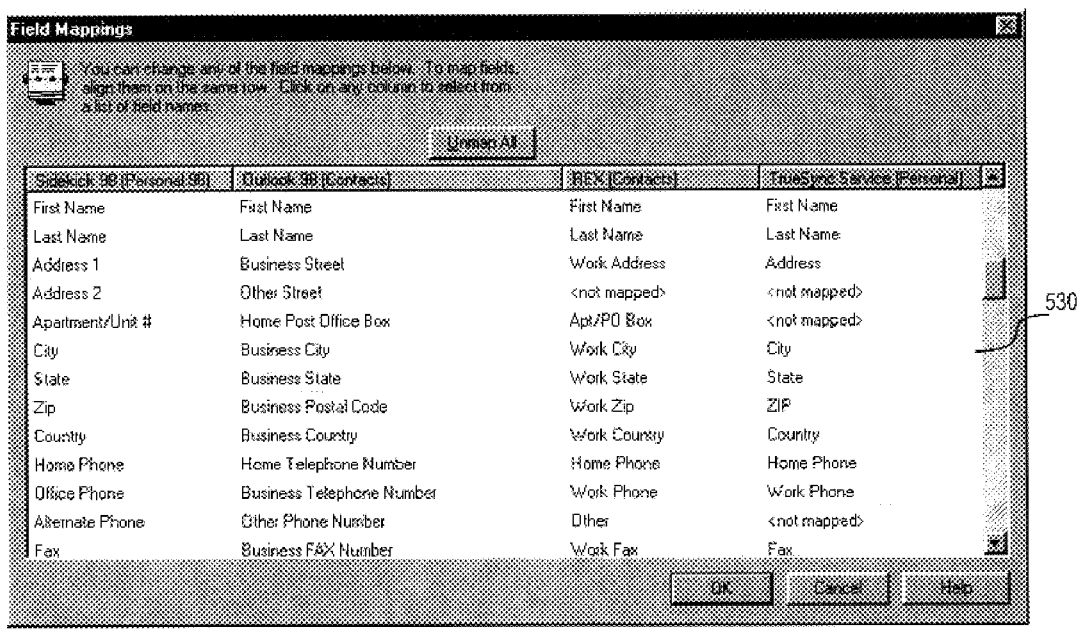
FIG. 5C is a screen-shot that shows a data-field-mapping table displayed by the Synchronizer for changing data-field mappings for a particular mapping of record files from different clients.

The tabbed panel 518 is used to initiate choosing of data-field mappings. When active, or exposed, the tabbed panel 518 contains a copy (not shown) of the record-file-mapping table 519. When the user clicks on any row in this copy (which represents a particular record-file mapping), the Synchronizer responds by displaying a data-field-mapping table 530, in a separate pop-up window 532, as shown in FIG. 5C. This data-field-mapping table displays, and accepts user changes to, current data-field mappings for the record files (from different clients) that map to each other under the particular record file mapping. The data-field-mapping table 530 operates in essentially the same manner as the record-file-mapping table 519 of FIG. 5B, except that the rows in table 530 represent mappings of data fields instead of mappings of record files as in table 519.

4. Choosing Other Settings and Commands

Other settings can be set by the user by using, for example, the pull down menus. For example, the user may use a "Set Current User" command to select a particular existing Synchronizer dataset to be used in the next synchronization; the user may use an "Add User" command to create an additional Synchronizer dataset; or the user may use other commands to select conflict resolution modality, or, optionally, to select duplicate resolution modality, or to reset the Synchronizer dataset, or to choose to overwrite the Synchronizer dataset, or to begin synchronization (including overwriting). Conflict resolution and duplicate resolution will be further described in subsequent section(s). For now, it suffices to note that these modalities may each include the choice of automatic versus manual resolution, and optionally the particular rule(s), e.g., precedence rule(s), to be used by the Synchronizer to perform automatic resolution. These various user commands may also be invoked by the user via shortcuts—e.g., by clicking on relevant indicators on the client chart, for example by clicking on the Synchronizer indicator to bring up a dialog box having the choices "Conflict Resolution . . . " and "Duplicate Resolution . . . ", or simply "Conflict/Duplicate Resolution . . . " and clicking on the desired choice.

F. Methodology for User Interaction

Figure 6:
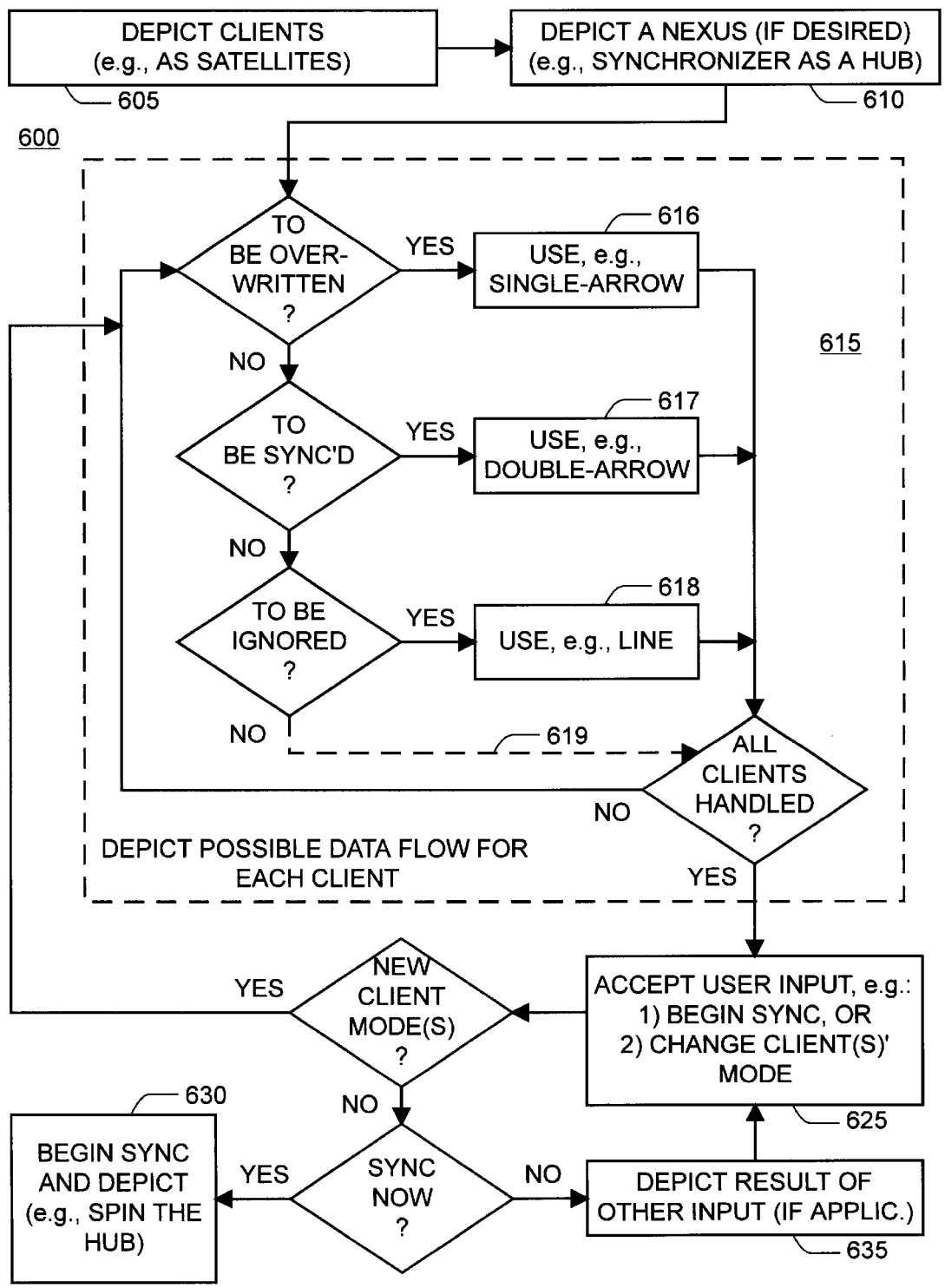
FIG. 6 is a flowchart that summarizes a method used by the Synchronizer for interacting with a user.

FIG. 6 is a flowchart 600 that summarizes a method used by the Synchronizer for interacting with a user. Many elements within the flowchart have been already been discussed above, or will be described in later sections, and need not be described again in detail. In the flowchart, in a step 605, the Synchronizer depicts (e.g., visually) its clients. In an (optional) step 610, the Synchronizer depicts a nexus. Next, in a step 615, the Synchronizer depicts possible data flow for each client. The step 615 may include: a step 616 of depicting, e.g., a single arrow toward a client indicator for a client to be overwritten, a step 617 of depicting, e.g., a double arrow for a client to be synchronized, a step 618 of depicting, e.g., a naked line for a client not to participate in synchronization, or other steps 619 for depicting indicators for other synchronization modes for a client. After the step 615, in a step 625, the Synchronizer accepts user input, for example, in the manner described in previous sections. If the user input changes the synchronization mode for any client, the Synchronizer re-performs the step 615. If the user input is an instruction to begin synchronization, then, in a step 630, the Synchronizer begins the synchronization and depicts an indication of the ongoing synchronization. For other user input, in steps 635, the Synchronizer may depict changes caused by the user input, for example by displaying or re-displaying visual elements of the GUI to reflect changes caused by the user input.

G. Other Embodiments of the UI

1. Small-Display Embodiment

In a specific embodiment, the Synchronizer is implemented to present output not on a PC-type display screen, but on a much smaller display, for example, a display having about 200-by-160 pixels or fewer, about 160-by-100 pixels or fewer, or about 100-by-60 pixels or fewer. For example, the Synchronizer may be implemented on a REX™ organizer-type device or an even smaller device, for example, a wireless pager or a wrist-watch-sized device. In this embodiment, the Synchronizer displays the client chart in the form of multiple display frames that the user can view, one frame or screenful at a time. The user pushes a button (or performs another action) to advance to the next frame. Depending on the number of clients, each frame may include just a subset of all client indicators (e.g., just one client indicator) and the data-flow direction indicator(s) for that subset. One frame may include a synchronizer indicator and associated data-flow indicators. One frame may be a selector or "home" frame that gives a global count or summary of the clients participating in synchronization, and allows the user to select into particular clients' frames, perhaps by clicking on miniature client indicators in a miniature copy of the client chart, wherein a miniature client indicator does not necessarily include the client's full name, but may include an icon or a first one or two letters of the client's name.

2. Audio/Telephone-Interface Embodiment

In another specific embodiment, the Synchronizer's user interface uses audio output to the user, and optionally, audio input from the user as well. This embodiment is useful for a telephone-based Synchronization system, or for a system for the visually handicapped. In this embodiment, the user interface outputs frames that include client indicators and data-flow indicators as described above for the small device implementation, but the frames comprise snippets of audio. In particular, each client indicator contains a recorded or synthesized utterance of the client's name, and the data-flow indicator(s) for each client contain an utterance of the current synchronization setting for the client, for example, "is set to synchronize" or "will be overwritten," etc. The Synchronizer uses these indicators to accept user input by allowing the user to enter input relevant to a particular client after the user hears the client indicator and its associated data-flow indicator(s). For user input, the Synchronizer accepts either keypad input (e.g., from a telephone keypad) or speech input. Keypad input is prompted by voice-menu choices, similarly to those found in telephone voice-mail systems. Speech input is recognized into commands using standard speech-recognition engines (e.g., software engines). Speech recognition software is available from, for example, Dragon Systems of Newton, Mass. or from IBM. After the user changes a synchronization option for a particular client, the Synchronizer repeats the (updated) data-flow indicator for the client, preferably prefaced with a repeating of the client indicator—for example, "REX will be overwritten."

V. "Binary-Based" System for Automatic Synchronization of Two or More Datasets

A. Binary-Based System is Implemented Using Binary Synchronizations

A UI has been discussed above that allows a user to conveniently specify the clients (e.g., two, or even more than two clients) that are to be synchronized, and the manner in which each such client is to be synchronized (e.g., using reconciliation of changes or mere overwriting of data). Given the user's specification of participating clients, a goal of the Synchronizer is to automatically achieve the requested synchronization result for the user, without requiring further user input. A particular, binary-based embodiment of the Synchronizer achieves the desired synchronization result (at least for certain data) by intelligently, and automatically utilizing successive pair-wise synchronizations. The synchronizer can even effect these pair-wise synchronizations by invoking the prior art synchronization systems (e.g., programs 55 or 60 of FIG. 1). (The preferred embodiment, which does not rely on successive pair-wise synchronizations and is more efficient, will be further described in later sections.)

Figure 7A:
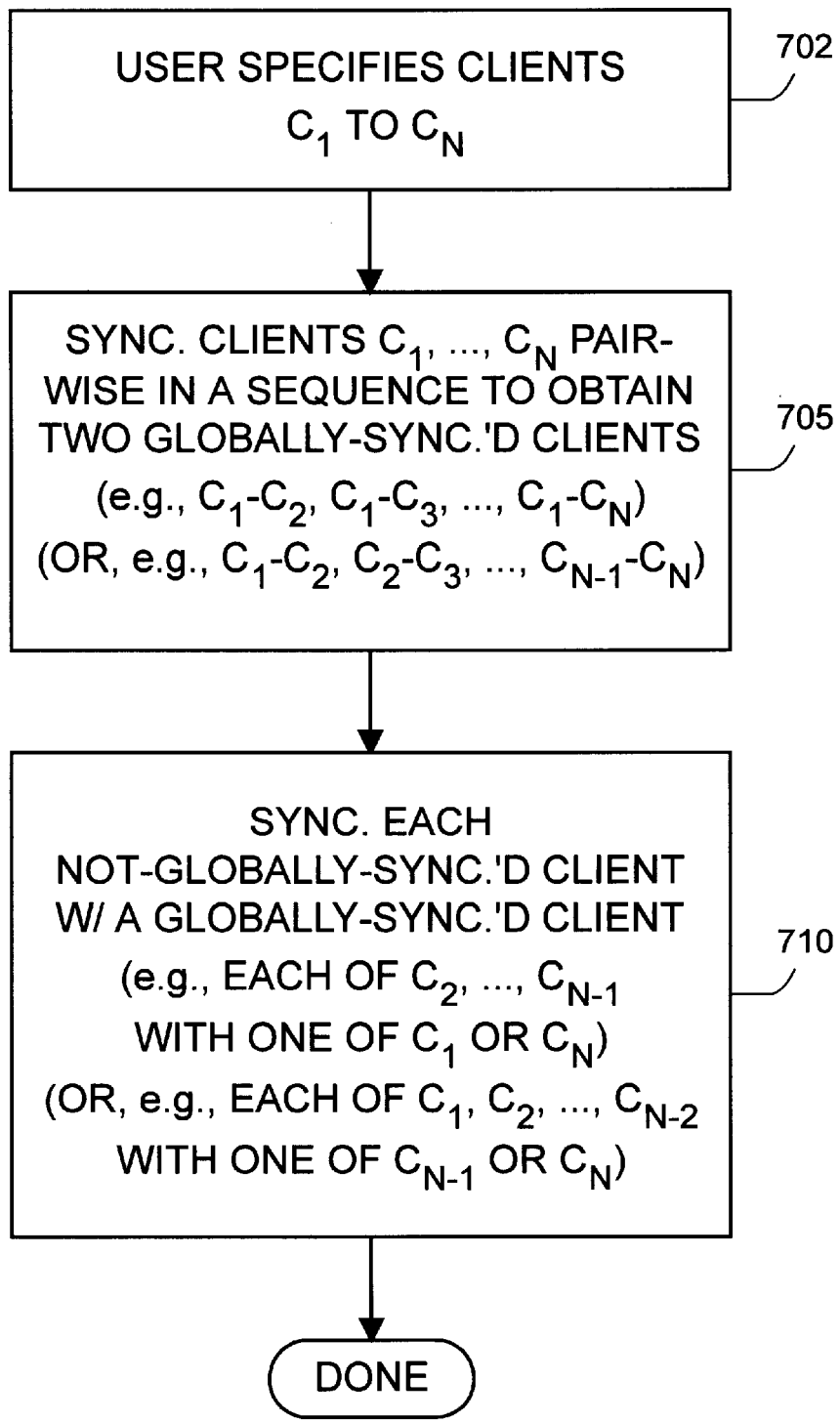
FIG. 7A is a flowchart that illustrates a method used by a "binary-based" embodiment of the Synchronizer for synchronizing two or more than two datasets using multiple binary synchronizations.

FIG. 7A is a flowchart that illustrates a method 700 used by the binary-based embodiment of the Synchronizer for synchronizing two or more than two datasets. The method 700 includes a user-input step 702, followed by a first-pass step 705, followed by a second-pass step 710. In the user-input step 702, the Synchronizer accepts a user specification of the clients to be synchronized. The user specification may be accepted interactively, for example according to the flowchart 600 of FIG. 6. The user specification may also be accepted without interactive user input, for example from a default configuration file or programmatically from an invoking software process that may not require interactive user input. In the first-pass step 705, the Synchronizer synchronizes pairs of the user-specified clients in a sequence so as to obtain two globally-synchronized clients—i.e., two clients that include changes (if any) from all clients. Preferably, for N clients, (N−1) number of binary synchronizations are performed in the first-pass step, including a final binary synchronization that occurs after all other binary synchronizations in the sequence. The two clients from the final binary synchronization are the globally-synchronized clients. In the second-pass step 710, the Sychronizer binary-synchronizes every not-globally-synchronized client with a globally-synchronized client. Preferably, for N clients, (N−2) number of binary synchronizations are performed in the second-pass step.

Figure 7B:
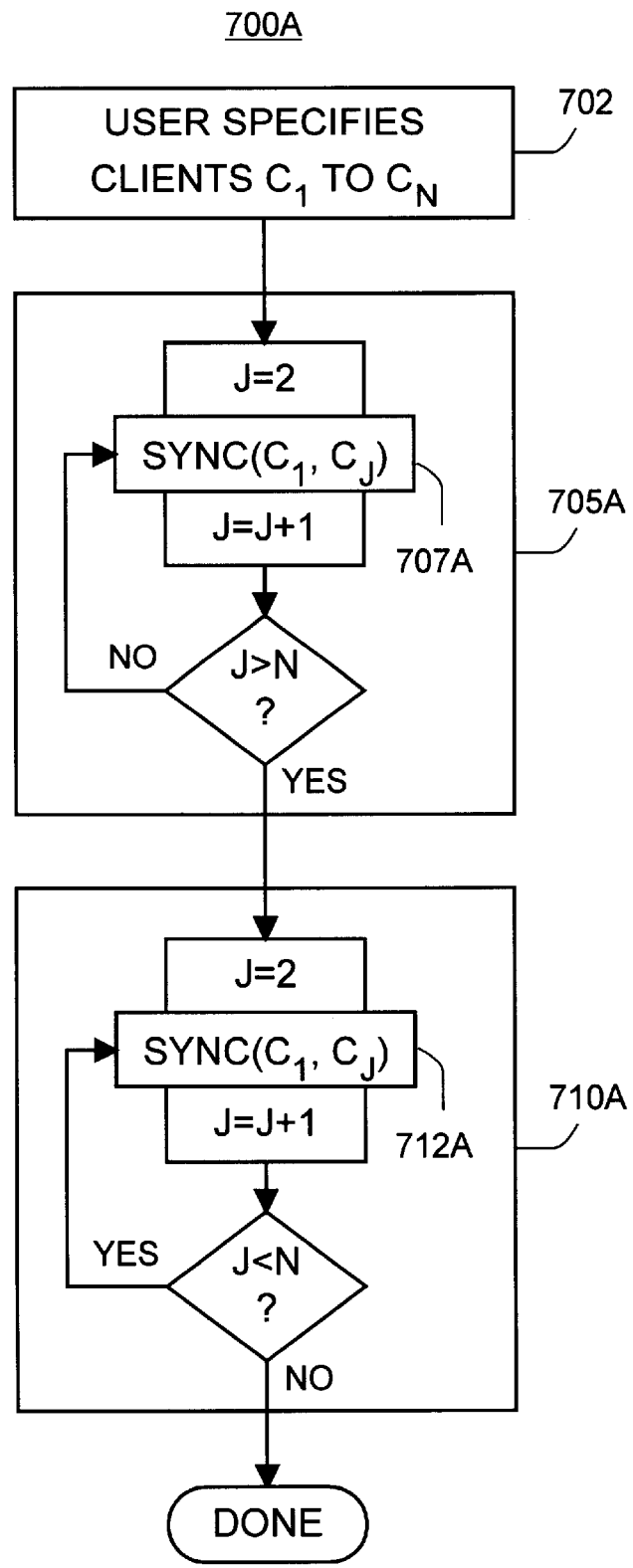
FIG. 7B is a flowchart that illustrates a particular implementation of the method of FIG. 7A.

FIG. 7B is a flowchart that illustrates a particular implementation 700A of the method 700 of FIG. 7A. As shown, according to the implementation 700A, the first-pass step 705A implements the first-pass step 705 of FIG. 7A, and the second-pass step 710A implements the second-pass step 710 of FIG. 7A to synchronize N clients, $C_1, C_2, \ldots, C_N$. (The user-input step 702 is unchanged from FIG. 7A.) The first-pass step 705A includes a binary-synchronization step 707A, which is performed (N−1) number of times. The second-pass step 710A includes a binary-synchronization step 712A, which is performed (N−2) number of times. In the first-pass step 705A, the Synchronizer binary-synchronizes one particular client, $C_1$, with every other client, one at a time to obtain two globally-synchronized clients, $C_1$ and $C_N$. The sequence of binary synchronizations is $C_1$–$C_2$, $C_1$–$C_3$, ..., $C_1$–$C_N$. In the second-pass step 710A, the Synchronizer binary-synchronizes each of the clients $C_2$, ..., $C_{(N-1)}$ with one of the client $C_1$ or the client $C_N$. Other implementations are possible. For example, the first-pass step could instead use $C_1$–$C_2$, $C_2$–$C_3$, ..., $C_{(N-1)}$–$C_N$ as its sequence of binary synchronizations to obtain $C_{(N-1)}$ and $C_N$ as the globally-synchronized clients, and the corresponding second-pass step could then use, for example, $C_N$–$C_1$, $C_N$–$C_2$, ..., $C_N$–$C_{(N-2)}$ as its sequence of binary synchronizations.

An optimization may be made to the method 700 if the user has requested that certain clients be "synchronized" by being overwritten instead of by being synchronized in the two-way-reconciliation sense during the synchronization. In such a situation, the Synchronizer first withholds clients to be overwritten from the method 700, and synchronizes the remaining clients using the method 700. Afterward, the withheld clients are overwritten with the synchronization result, which can be found in any of the clients synchronized using the method 700.

In an alternative version of the binary-based embodiment, the Synchronizer does not automatically invoke all binary synchronizations of the method 700, but instead requests that the user invoke some or all of the binary synchronizations. For example, the Synchronizer may maintain a window on a computer display screen from which the Synchronizer displays instructions to the user. The Synchronizer may display a listing or representation of the entire sequence of needed binary synchronizations in the window (with window scrolling, if the window is too small to simultaneously display all the instructions). Alternatively, the Synchronizer may display a listing of one or a few binary-synchronizations in the window at a time (for example, "please synchronize REX and Outlook, now, and click OK when finished") and await the user's confirmation before displaying a listing of further binary-synchronizations to be performed.

B. Basic Binary-Based System May Resolve Conflicts Incorrectly

As alluded to in the Background section, a problem with using conventional binary synchronizations in sequence to effect synchronization of more than two datasets is that data-modification times, that may be available during earlier-performed binary synchronizations, may not be available during later-performed binary synchronizations. Thus, conflict resolution that relies on comparing data-modification times may fail during later-performed synchronizations and thereby cause errors. (Even user-assisted conflict resolution may fail because the synchronization system will be unable to provide the user with data-modification times for use in the user's decision-making process.) The binary-based system as described in the previous section would also suffer such failure, if implemented using invocations of prior-art binary synchronizers such as programs 55 or 60 of FIG. 1 to binary-synchronize the clients. FIG. 7C demonstrates an example of such a failure.

FIG. 7C is a table that shows the contents of three example clients at various times during a sequence of binary synchronizations initiated by the binary-based embodiment of the Synchronizer. In the example, the binary synchronizations are set to resolve conflicts by giving effect to the most recent (later) change and ignoring the less recent (earlier) conflicting change. As shown by upper column headers 720, the example clients are referred to as Clients A, B, and C. Each client contains three records, labeled R1, R2, and R3, that each corresponds to the identically-labeled record in each other client.

Initially, at Time 0 (row 724), corresponding records R1, R2, and R3 in all clients have identical (e.g., synchronized) values of 1, 2, and 3, respectively. Next, at Time 1 (row 726), the user changes the value of record R3 in Client B to 3B. Next, at Time 2 (row 728), the user changes the value of record R1 in Client A to 1A, the value of record R2 in Client B to 2B, and the value of record R3 in Client C to 3C. Each client records the time of modification of each record. Next, the binary-based Synchronizer begins to synchronize Clients A, B, and C using repeated binary synchronizations according to the steps 705A and 710A of FIG. 7B. The sequence of binary synchronizations will be A–B at Time 3, followed by A–C at Time 4, followed by A–B again at Time 5. At Time 3, Clients A and B are binary-synchronized such that they both contain the values 1A, 2B, and 3B (row 730). In particular, Client A's record R3 has been modified to have the value 3B, and Client A has dutifully recorded the modification time of its record R3 as Time 3. At Time 4, Clients A and C are binary-synchronized such that they both contain the values 1A, 2B, and 3B (row 732). In particular, Client C's record R3 has been modified to have the value 3B as a result of conflict resolution of the value 3B in Client A and the value 3C in Client C. The value 3B prevailed in the conflict resolution because its modification time of Time 3 in Client A is more recent than 3C's modification time of Time 2 in Client C. This is the wrong result, because the user actually entered the value 3C (Time 2 in Client C) more recently than he or she entered the value of 3B (Time 1 in Client B). Thus, because the original (user-) modification time (Time 1) of the value 3B was not available for use in conflict resolution during the binary A–C synchronization, the wrong result is obtained. At Time 5, the second-pass A–B binary synchronization produces no further changes (row 734). In summary, a wrong result (summarized in row 736) results from the binary-based Synchronizer because it relies on prior-art binary synchronizations of clients to try to effect a synchronization of more than two clients. The desired, correct result of 1A, 2B, and 3C is shown in row 738.

C. An Improved Binary-based System Resolves Conflict Better

As shown in the preceding example, the problem with conflict resolution occurs because when a record in a client is updated by a binary synchronization, the record's last-modification time is set to the time of the binary synchronization. Thereafter, if the updated record is used in subsequent binary synchronization, its last-modification time, which is the "priority time" that is used in conflict resolution, is not the updated record's original modification time. (The original modification time is the time that the user, or other non-Synchronizer entity, first entered a change into a corresponding record to thereby originally cause the updating of the updated record in the first place.) One might be tempted to try to repair this defect by setting the last-modification-time field of records updated or added during binary synchronization to the original modification timestamp as obtained from the other client. However, this simpleminded approach would fail for a first and a second reason. The first reason is that most clients produce their own timestamps and will not let a synchronization program set the last-modification-time field of records to arbitrary values. The second reason is that the last-modification-time field of records in a client is used not only in conflict resolution but also to determine the changes (for example, additions, deletions, or modifications) that have been made since a previous synchronization of the client. Therefore, setting a last-modification-time field for a record to an earlier time may cause the last-modification-time field to have a value that is earlier than a previous synchronization of the client. If such a situation occurs, the record may be erroneously ignored during a subsequent synchronization with another dataset and its value may thereby erroneously not be propagated to the other dataset.

An improved binary-based Synchronizer repairs the conflict-resolution problem of FIG. 7C by storing two timestamps for each record: a last-modification-time for determining the changes since a prior synchronization, and an original-modification-time to be used as the "priority time" that is compared during automatic conflict resolution or displayed to the user during user-assisted conflict resolution. In part because it is impractical to try to add a new, original-modification-time field to all records of all possible clients, the improved binary-based Synchronizer requires only that a single dataset, here referred to as the reference dataset, which is to be available always for the Synchronizer's use, include the new, original-modification-time field for all its records. If it is not convenient or possible for one of the user's datasets to be used for this purpose, the improved binary-based Synchronizer can create its own private reference dataset that has the new, original-modification-time field. The reference dataset will always be used as the "client" $C_1$ in the steps 705A and 710A of FIG. 7B. For conflict resolution, the priority time that is used for the reference dataset $C_1$ is its original-modification-time field, and the priority time used for the other datasets $C_2, \ldots, C_N$ need not be changed by the improvement (i.e., can be the last-modification-time field).

Even though the improved binary-based Synchronizer solves the conflict-resolution problem of FIG. 7, it pays a price. This price is that the improved binary-based Synchronizer cannot easily be implemented using repeated calls to existing, prior-art binary-synchronization systems. This is because the improved binary-based Synchronizer requires a new timestamp field (the original-modification-time) in at least one dataset (perhaps a brand new dataset) and requires this new timestamp field to be the priority time used in conflict resolution for at least the reference dataset. Thus, the improved binary-based Synchronizer loses an advantage of the non-improved binary-based Synchronizer, which is that existing prior-art binary-synchronizers could be intelligently invoked to effect a novel automatic synchronization result for even more than two datasets.

VI. Comparison of Timestamps from Different Datasets

A. Conversion Into a Common Time

In comparing the timestamps from different clients, for example, during conflict resolution (automatic or user-assisted) in any embodiment of the present invention, the timestamps are preferably first converted into a common time (e.g., GMT) in the synchronizer's memory, if possible, for comparison. This conversion is performed by, for example, the improved binary-based embodiment described above or the preferred embodiment that is further discussed in other sections. Each client's timestamps are converted into a common time in a way that is appropriate to the client. For example, if the client's timestamps individually include time-zone information (e.g., "timezone-stamps"), then the client's timestamps are directly converted into the common time using simple time-zone conversion. Otherwise, if the client's clock includes current time-zone information and the client's timestamps are assumed to share the clock's current time zone, then the client's timestamps are converted into the common time using simple time-zone conversion from the clock's current time zone. Otherwise, if the client's clock is known to have a constant offset with respect to another clock for which time-zone information is known or can be presumed, and the client's timestamps are assumed to have the same constant offset, then the client's timestamps are converted into the common time by shifting by the offset and by simply converting into the other clock's time zone. The value of the offset is preferably the value as observed, computed, and recorded by the Synchronizer at the end of a most recent previous synchronization (for improved compatibility with an optional clock-drift compensation scheme further described in another section), but may also be other values. For example, the offset value may be a current offset observed and computed by the Synchronizer at the beginning of the current synchronization (especially if this is a first synchronization of the dataset), or an offset supplied by the user.

B. Clock Drift

In practice, clocks on separate devices may run at different rates due, for example, to clock imperfections. If the system clocks of multiple datasets drift apart from one synchronization to the next, comparison across datasets of timestamps generated after the previous synchronization is potentially suspect. A user may re-set the clock used by a particular dataset, for example to reflect a new time zone on a device that does not explicitly support time zones. Such clock re-setting can also constitute an artificial type of drift that can also endanger timestamp comparisons. Additionally, a user may change the active time zone without actually re-setting the underlying time on a device that supports time zones. If the device's dataset has adequate protection of its existing timestamps against such a change of the active time zone, then comparison using those timestamps should be safe against such a change. However, if the device's dataset does not provide adequate protection, the time-zone change again constitutes a kind of drift that can endanger comparison using those timestamps. (Examples of adequate protection include timestamps that explicitly include timezone-stamps, or existing timestamps that are automatically updated throughout the dataset to reflect any newly chosen active time zone.) Embodiments of the present invention (including the previously-described improved binary-based embodiment and the preferred embodiment that is further described in other sections) take steps to detect, and if appropriate, try to compensate for such clock drift. The following description of clock-drift detection and compensation methods applies primarily to clock drift caused by clock imperfection, but is also applicable to, and may briefly discuss, the other types of timestamp-endangering clock drift.

C. Clock-Drift Detection

Figure 8A:
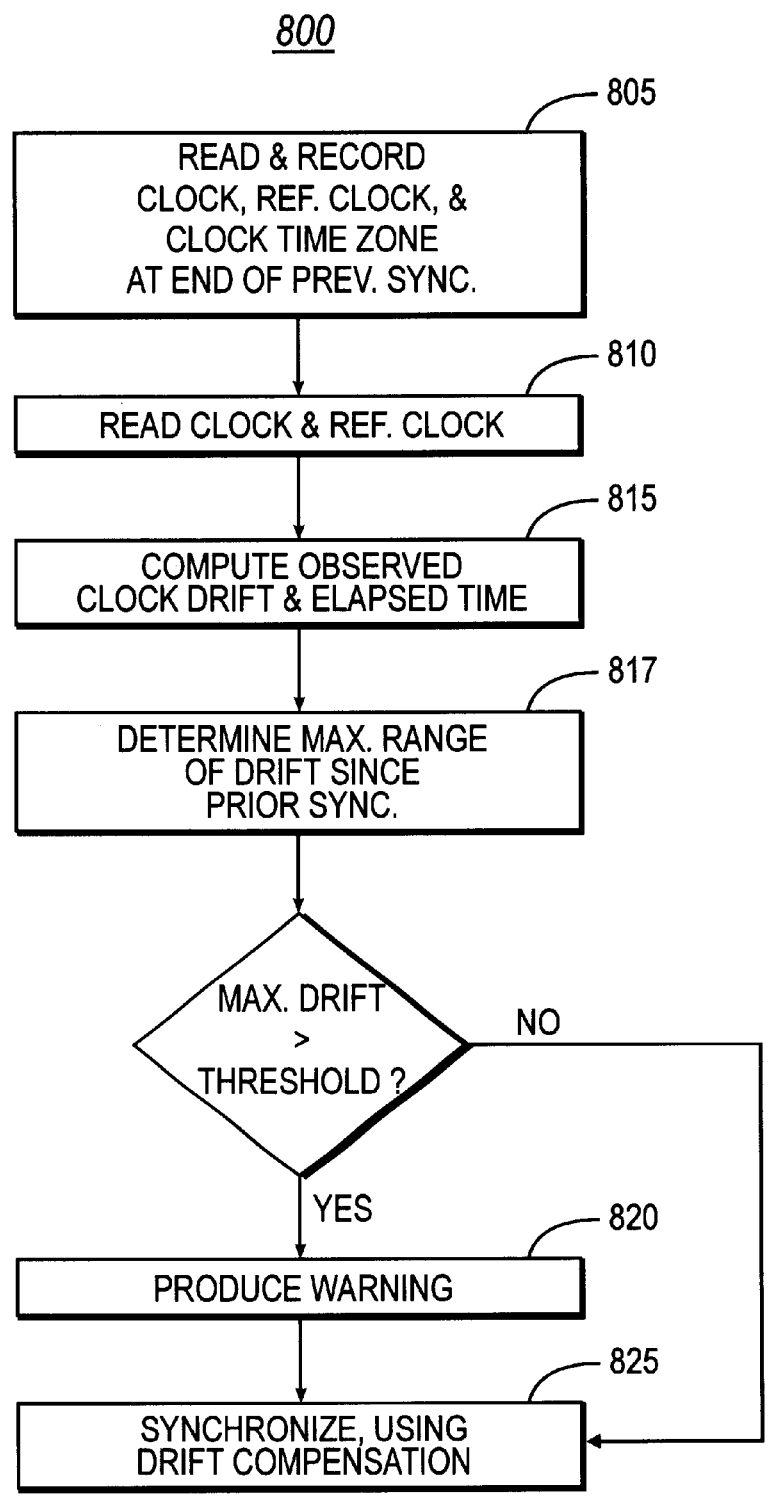

FIG. 8A is a flowchart that illustrates a method 800 that is optionally used by the Synchronizer to detect clock drift for a particular dataset's clock since the most recent previous synchronization involving the dataset (here referred to as "the previous synchronization"). The method 800 includes steps 805, 810, 815, 817, 820, and 825. In the step 805, the Synchronizer has simultaneously read the dataset clock and the reference clock at the end of the previous synchronization and recorded the dataset clock's reading, the reference clock's reading, and the dataset clock's active time zone, if any, for possible use in a later (i.e., a current) synchronization. (In an alternative embodiment, the dataset clock's reading is not directly recorded but an offset of that reading versus the reference clock's reading is recorded.) In the subsequent step 810, at the beginning of the current synchronization, the Synchronizer simultaneously reads the dataset clock and the reference clock. Preferably, the reference clock has full time-zone support and has not been re-set since the previous synchronization. In the subsequent step 815, the Synchronizer obtains (e.g., computes) the offsets between the dataset clock and the reference clock both from the end of the previous synchronization (previous offset) and from the beginning of the current synchronization (current offset). The Synchronizer also computes in the step 815 the difference between the current offset and the previous offset. This difference (which may be negative) is here referred to as the observed clock drift, or $T_{DRIFT}$. The Synchronizer also computes in the step 815 the difference, or elapsed time, or $T_{ELAPSED}$, between the two reference clock readings (i.e., between the end of the previous synchronization and the beginning of the current synchronization). To give a concrete example, at the beginning of a synchronization, $T_{ELAPSED}=1,000,000$ seconds according to the reference clock may have elapsed since the end of a previous synchronization, and a dataset's clock may have gained $T_{DRIFT}=100$ seconds versus the reference clock since then.

In general, for detecting in the step 815 drifts caused by clock imperfection or actual clock-resetting by the user, the Synchronizer computes the offsets after converting the dataset clock's reading to a common time, e.g., GMT, if possible, as described in the previous section. For detecting in the step 815 drifts caused by a change of active time-zone in a dataset that doesn't protect existing timestamps, the Synchronizer computes the current offset after converting the dataset's current clock reading to a common time, but under a forced pretense that the dataset's current clock reading represents the dataset's time zone at the end of the previous synchronization. The Synchronizer performs this latter type of conversion if it detects that the dataset's active time zone has changed since the previous synchronization and that it is of the type that does not protect existing timestamps.

In the subsequent step 817, the Synchronizer determines the presumed range (maximum and minimum) by which the dataset clock may have drifted at any time since the prior synchronization. For simplicity, it is currently preferred that the Synchronizer implicitly assume that the observed clock drift is one extreme of this "drift range" and that the other extreme is zero drift, and hence the step 817 is inherently completed as soon as the step 815 is completed. (This assumption is reasonable, for example, if the drift is due only to clock imperfection.) In alternative embodiments, the Synchronizer may seek or have additional information about drift characteristics of the dataset's clock. For example, the Synchronizer may ask the user for the greatest-magnitude amount in both positive and negative directions by which the user or other factors may have shifted the dataset's clock since the last synchronization. This query may be accomplished, for example, by asking the user to check off all the time zones that he or she has used as an active time zone since the last synchronization. For another example, the Synchronizer may access a known history of the clock's re-settings by its user, for example, from the client if the client has been programmed to record such information according to an aspect of the present invention. For yet another example, the Synchronizer may access interim readings of the clock (calibrated to the reference clock) which may exist, according to an embodiment of the present invention, because the Synchronizer automatically, and periodically reads the client's clock even when no synchronization is being performed. If the observed clock drift from the step 815 exceeds one extreme of the user-supplied or otherwise-obtained range, then the observed clock drift replaces the exceeded extreme in the drift range. Preferably, the range must include zero, and if it doesn't (i.e., if both drift range boundaries somehow have the same sign), then the Synchronizer replaces the drift-range boundary nearest to zero with zero.

To flag the presumed range of possible clock drift since the previous synchronization (i.e., the drift range), the Synchronizer in the step 820 optionally produces a warning message to the user, for example, via a synchronization log, if the maximum clock drift (either positive or negative) exceeds in magnitude a user-preset or Synchronizer-default clock-drift threshold value. Examples of useful default clock-drift threshold values include about zero, about ten seconds, about five minutes, about one hour (a difference due to daylight savings time), about twenty-four hours (the maximum difference due to time zone difference), or about twenty-five hours. Separate threshold values may be used for positive versus negative drift or for different types of drift. (Different types include, for example, drift thought to be caused only by clock imperfection, drift thought to be caused at least in part by user clock-resetting, or drift thought to be caused at least in part by a change of a time zone in a dataset that does not adequately protect existing timestamps). After any warnings have been produced, the Synchronizer proceeds to perform synchronization, in the Step 825, preferably using clock-drift compensation according to an aspect of the present invention, as is further described in the next section.

D. Clock-Drift Compensation

Figure 8B:
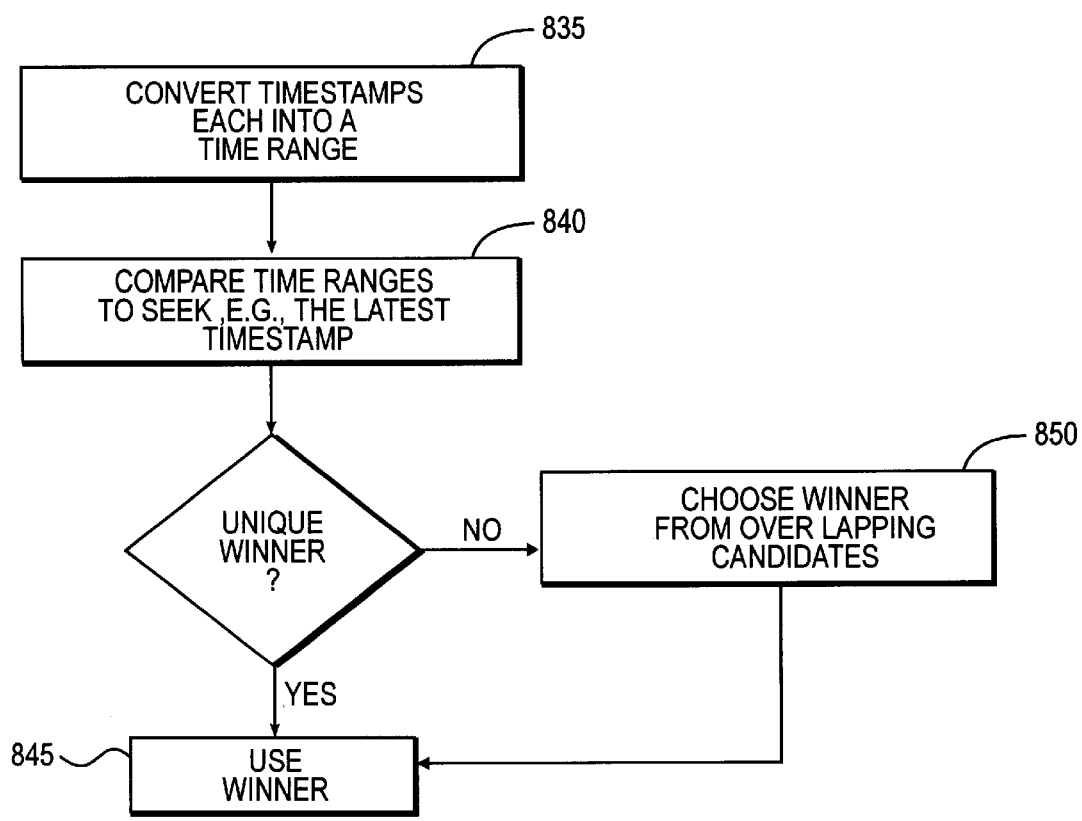

FIG. 8B is a flowchart that illustrates an optional method 830 used by embodiments of the Synchronizer to attempt to compensate for clock drift in the event that any timestamp ("the timestamp") from a particular dataset ("the dataset") needs to be compared to timestamp(s) made by other clock (s). The method 830 includes steps 835, 840, 845, and 850. The method 830 assumes that the steps of the clock-drift detection method 800 of FIG. 8A have already been performed. In particular, the method 830 assumes that the presumed drift range (i.e., possible clock drift since the previous synchronization) has already been determined for the dataset's clock ("the clock"), according to the step 817 of FIG. 8A.

Recall from a previous section that comparison of timestamps across datasets is preferably preceded by a conversion of the timestamps, at least in the Synchronizer's memory, into a common time such as GMT for comparison. Under the clock-drift compensation scheme, this conversion is accompanied by other actions. In particular, in the step 835, the Synchronizer converts the timestamp not merely into a common time but (also) into a range of possible "true," or drift-compensated common times. The range is here referred to as the "timestamp range" and is defined by an upper and a lower timestamp-range boundary. Each timestamp-range boundary is simply the timestamp's common time minus a respective one of the boundaries of the clock's presumed drift range. (If one of the boundaries is zero, then the timestamp's common time is itself one of the timestamp-range boundaries.) The subtraction of the drift-range boundary can be performed either before or preferably after conversion of the timestamp to the common time. In general, whenever the Synchronizer seeks a latest (or earliest) timestamp from a set of timestamps from different clocks, each of the timestamps will have a range of possible values in the common time. In the step 840, the Synchronizer compares the timestamp ranges of all timestamps to seek a latest (or an earliest) timestamp (for example, as a part of conflict resolution). If the Synchronizer can find a latest (or earliest) timestamp whose possible values are uniformly higher (or lower) than the possible values of any other timestamp (i.e., the found timestamp's possible values do not overlap with those of any other timestamp), then, in the step 845, that found timestamp can be used as the correct latest (or earliest) one.

However, if no such single, "clear-winner" timestamp can be found, then a winner must be selected, in the step 850, from multiple candidate timestamps whose possible values overlap. The Synchronizer may use a pre-set rule (e.g., a rule selected by the user) to determine the winner. The Synchronizer may also optionally display the candidate timestamps' corresponding records to the user and allow the user to select the winner. In allowing the user to select the winner, the Synchronizer may make one or more recommendations based on one or more pre-set rules. The preferred rule for automatically determining or recommending a winner is for the Synchronizer to convert each candidate timestamp into a "model-drift-compensated" time, according to any known or assumed model of the candidate timestamp's clock's drift. Detailed models of the clock drift may be built according to any known drift characteristics of the dataset's clock, for example, characteristics as described in connection with the step 817 of FIG. 8A. An example of a detailed model is one built by the Synchronizer using piecewise-linear connecting of clock drift observed from any interim calibrated readings of the clock. Typically, there is no particular known drift characteristic of the dataset's clock, and, as described earlier, each candidate timestamp's drift range is merely between zero and the observed clock drift, $T_{DRIFT}$. In this situation, the dataset's clock drift is assumed to be constantly monotonic—i.e., the clock drift is modeled as being linear with respect to elapsed reference time—i.e., the model is built using a linear connecting of the present synchronization's observed clock drift and the previous synchronization's zero clock drift. Therefore, the model-drift-compensated time, $T_{MCOMP}$, is set to the timestamp with a linearly interpolated portion of the observed clock drift, $T_{DRIFT}$, subtracted out. The model-drift-compensated time is shown by the following equation:

$$T_{MCOMP}=T_{STAMP}-T_{DRIFT}*(T_{STAMP}-T_{PREV})/(T_{ELAPSE}+T_{DRIFT})$$

where $T_{PREV}$ is the timestamp of the dataset clock at the end of the previous synchronization (i.e., when the clock drift was zero). For the concrete example given earlier, $T_{MCOMP}=T_{STAMP}-100*(T_{STAMP}-T_{PREV})/(1,000,100)$. For other types of models (for example, multi-piece, piecewise-linear models), analogous interpolation techniques or other techniques can be used, as appropriate to the particular model. Thereafter, the Synchronizer compares the model-drift-compensated time of the candidate timestamps (preferably, each converted to a common time such as GMT) and chooses the latest (or earliest) as the winner, and uses the winner in step 845.

E. Clock-Drift Avoidance

1. Example: Keep "Pre-Fresh Threshold" in Client's Time

The Synchronizer avoids some pitfalls and complexities of clock drift by avoiding comparison of timestamps from different clocks in certain circumstances, if possible. To understand this, note that one aspect of synchronization is that "fresh" changes generally need to be requested or determined from the client at the start of a synchronization. Here, fresh changes refer to changes in the client (for example, additions, modifications, and deletions) that have not been previously seen by the Synchronizer and are therefore fresh with respect to the Synchronizer. For this purpose of identifying fresh changes, the Synchronizer records a time, which may be called a "pre-fresh threshold," during each synchronization for use in the next synchronization involving the client. During the next such synchronization, changes occurring later than the recorded pre-fresh threshold will be considered "fresh" changes and will be examined by the Synchronizer for possible propagation to other dataset(s). The Synchronizer records a pre-fresh threshold for every particular client involved in a synchronization, and records the pre-fresh threshold for each client according to the particular client's clock, and not merely according to the Synchronizer's own clock. In this way, at the next synchronization involving any particular client, the pre-fresh threshold for the particular client can be recovered from the recorded information in the client's clock's own time. Thereafter, changed records in the client can be identified as fresh by comparing the changed records' modification timestamps directly with the pre-fresh threshold for the client without need for time conversion (assuming that no truly-fresh change has nevertheless received a timestamp earlier than the pre-fresh threshold as a result of the client's clock' being artificially re-set, after the previous synchronization, to a time earlier than the client's pre-fresh threshold).

2. An Improved Pre-Fresh Threshold

The time of synchronization (e.g., a clock reading during a synchronization) may be used as the pre-fresh threshold. However, in the preferred embodiment, the Synchronizer will record, as the pre-fresh threshold, the latest last-modified timestamp seen on any record in the client during the synchronization (except timestamps caused by the synchronization itself). Using this timestamp instead of the synchronization time can produce a more reliable result in the next synchronization for certain clients, in the situation that a change was made in those clients (slightly) earlier than the time of the synchronization, but the client was somehow not able to produce the changed record for the Synchronizer's use during the synchronization.

F. Clock-Synchronization

The Synchronizer may optionally synchronize the datasets' devices' system clocks by re-setting them to match a clock that is considered to be a reference clock, for example by re-setting them to have a same offset (perhaps zero) from the reference clock as they had during a most recent previous synchronization. Preferably, each clock is re-set, if at all, after any reading of the device's clock for drift detection and/or drift compensation, as described earlier, and before synchronization begins for the device's dataset(s), or at least before the time when the time of synchronization is recorded for use during a subsequent synchronization. The precise timing of re-setting the clocks may be varied depending on the particular characteristics of the devices and datasets involved. The reference clock may be the system clock of the Synchronizer dataset, or the system clock of the reference dataset in the improved binary-based embodiment, or another reference clock. Preferably, the Synchronizer will compare the proposed new time for a clock to the clock's dataset(s)' pre-fresh threshold (s), and will refrain from moving a clock to a proposed new time if that time is earlier than any of the clock's dataset(s)' pre-fresh threshold(s), or in the alternative at least generate a warning that such synchronization jeopardizes the quality of the next synchronization by making it possible for the next synchronization to erroneously ignore certain changes in a dataset(s) made after this synchronization but before the pre-fresh threshold of the dataset(s). Preferably, the Synchronizer records the amount by which it shifts each clock during clock synchronization for possible use during a next synchronization.

VII. A Plug-In Architecture for the Synchronizer

A. Overview

Figure 9A:
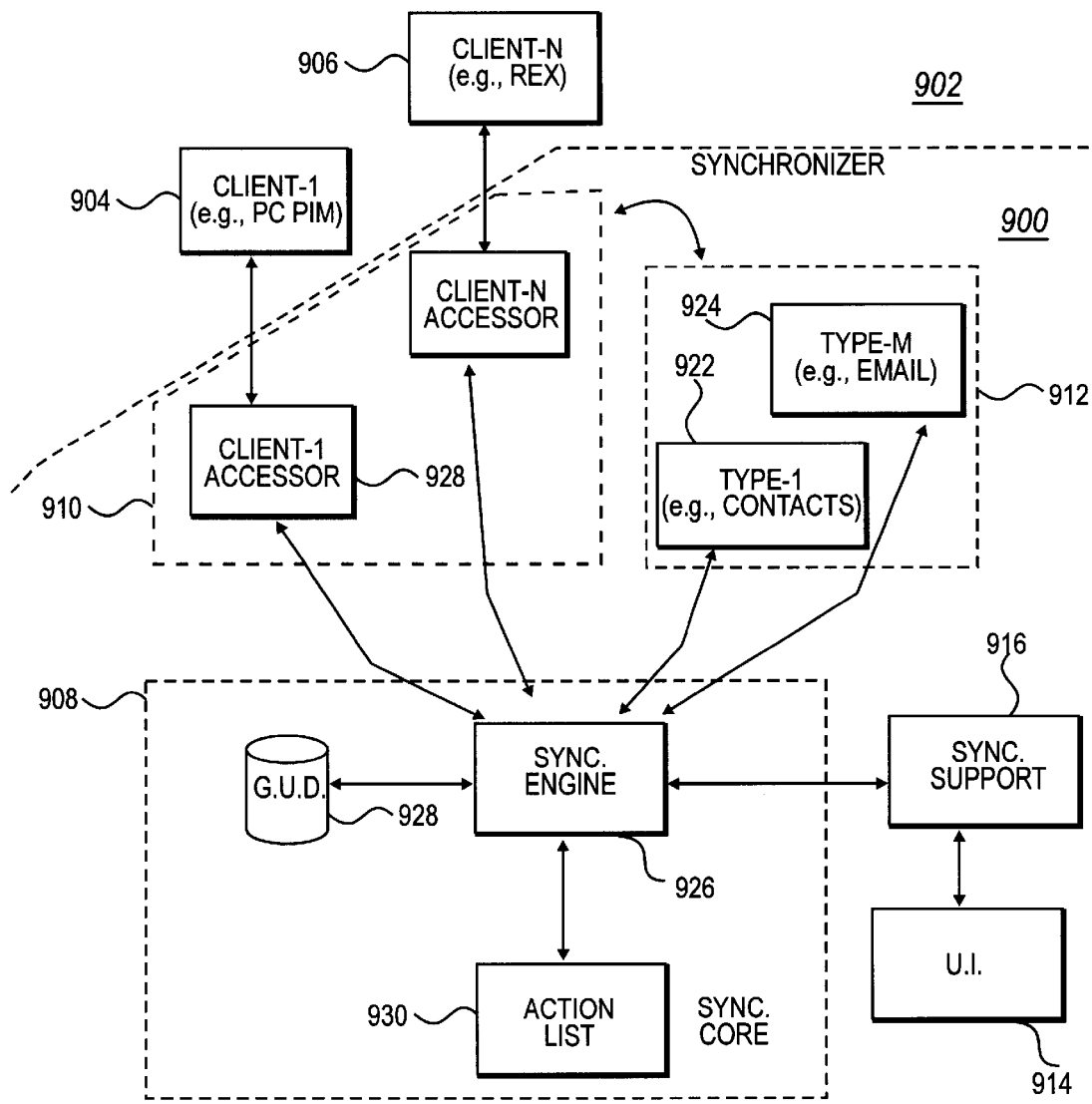
FIG. 9A is a block diagram that shows the architecture of a Synchronizer according to the preferred embodiment of the invention.

FIG. 9A is a block diagram that shows the architecture of a Synchronizer 900 according to the preferred embodiment of the invention. As shown, the Synchronizer 900 exists in an example environment 902 that includes at various times N clients. These clients include a Client-1 904 (e.g., a PC PIM) and a Client-N 906 (e.g., the REX™ organizer). The Synchronizer includes a synchronizer core 908, client accessors 910, data-type modules 912 ("type modules"), a user interface module 914, and a configuration module 916. The client accessors 910 include N client accessors that each provides the synchronization core with access to one of the N clients. For example, a Client-1 accessor 918 provides access to Client-1, and a Client-N accessor 920 provides access to Client-N. The type modules 912 include M modules that each stores definitions and provides services related to each of M data types. For example, a Type-1 module 922 may support a "contact" data type and a Type-M module 924 may support an "e-mail" data type. The synchronizer core includes a synchronization engine 926 ("Engine") that includes synchronization logic and controls the synchronization process. The synchronization core also includes a Synchronizer database 928, here referred to as the GUD 928, that includes, or provides access to, a copy of the most "current" data records as seen from synchronizations performed by the Synchronizer. The GUD also includes various status information about these records. The synchronization core also includes a local store of status information regarding any synchronization in progress. This local store includes an action list 930, which includes a list indicating conditionally-pending actions to be performed or discarded under the direction of the Engine, according to the methods of the present invention.

B. Each Module Has Distinct Function and Knowledge

The Synchronizer 900 has a highly modular architecture. Individual modules within the Synchronizer have very specific and distinct functionality. Each module encapsulates enough knowledge to perform its own functions and makes as few assumptions about the knowledge encapsulated in other modules as possible. In particular, the Engine, each of the client accessors 910, and each of the type modules 912 each have distinct functionality and knowledge. The Engine is responsible for orchestrating the distribution of changes from clients (and from the GUD) to each other for synchronization. To perform this functionality, the Engine includes knowledge of the synchronization methods of the present invention, as they might be applied to datasets and records in general, but preferably does not assume much about the particular structure of datasets or records and preferably does not know anything about what the records actually mean. In particular, the Engine need not be, and preferably is not, "hard-wired" (e.g., in software) to have specific knowledge of any particular client (e.g., the REX™ organizer) or any particular data type (e.g., "contact"). When the Engine needs to handle records from a particular client, it calls upon a particular client accessor to provide the needed client-related service. When the Engine needs to perform functions upon records of a particular type, it calls upon a particular type module to perform the needed function. Thus, the preferred Engine is generic and can handle arbitrary clients and arbitrary data types, so long as they can be defined (by appropriate client accessors and type modules) as having records.

C. Engine Uses Pre-Specified Client and Type Interfaces

Figure 9B:
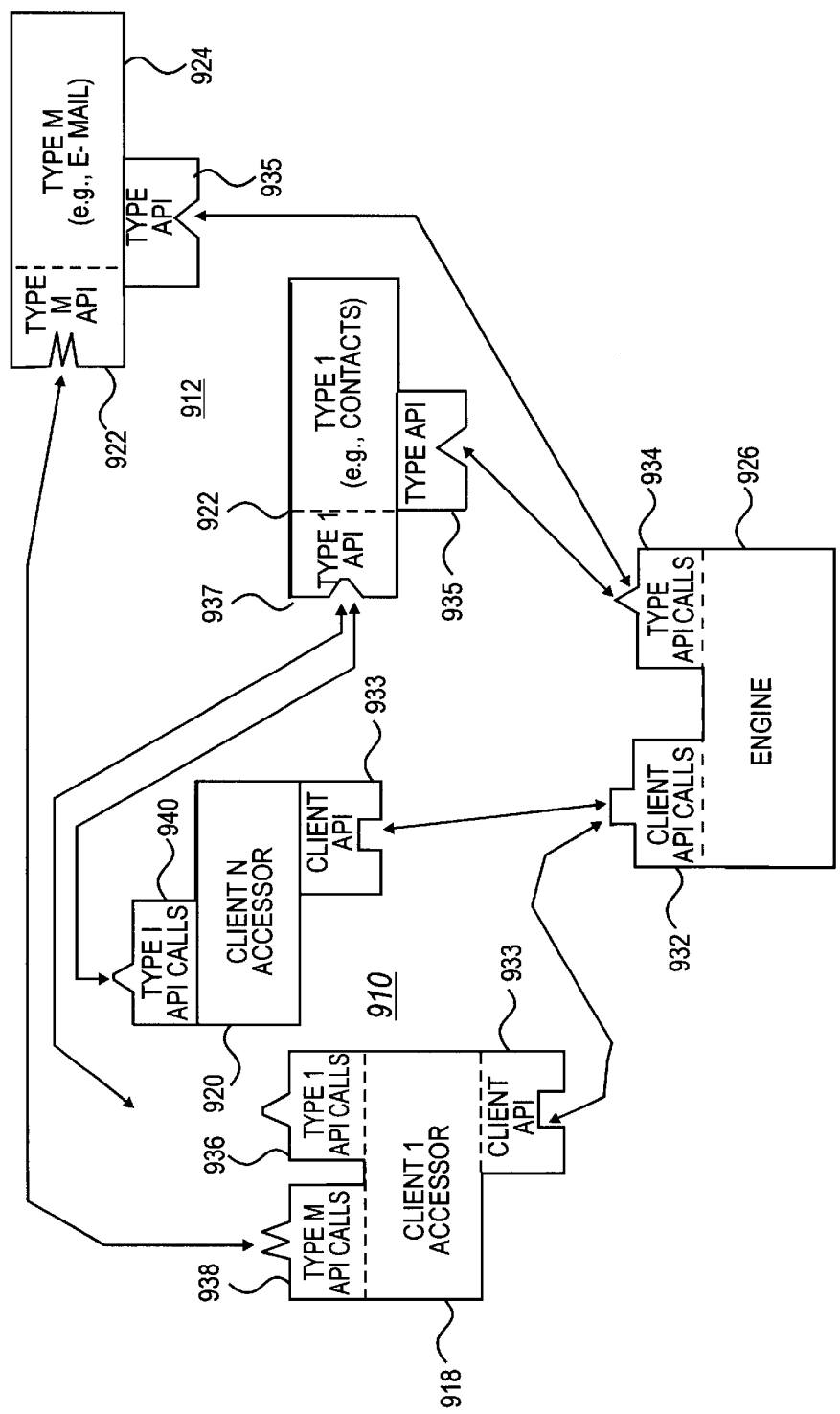
FIG. 9B is a block diagram that schematically shows the mechanism by which the engine, the client accessors, and the type modules of the Synchronizer communicate with one another.

FIG. 9B is a block diagram that schematically shows the mechanism by which the Engine 926, the client accessors 910, and the type modules 912 communicate with one another. As shown, the Engine communicates with each client accessor using calls 932 to a pre-specified, generic client interface 933 that is implemented by each client accessor, including the Client-1 accessor 918 and the Client-N accessor 920. An example method of the generic client interface 933 is add( ), which adds a record to a client. Similarly, the Engine communicates with each type module using calls 934 to a pre-specified, generic type interface 935 that is implemented by each type module, including the Type-1 module 922 and the Type-M module 924. An example method of the generic type interface is compare( ), which compares records for equivalence. By each implementing a same generic client interface 933 or generic type interface 935, the client accessors and type modules provide generic services to the Engine for working with records. These generic services are specified at a high enough level of abstraction that they generally make sense with regard to any record, regardless of the identity of the record's dataset or any structure or meaning of the record's type. In addition to the pre-specified, generic type interface 935, each type module generally also implements its own type-dependent interface for providing type-dependent services to clients. For example, the Type-1 module 922 implements its own Type-1 interface 937, which is invoked by both the Client-1 accessor 918 and the Client-N accessor 920 via the calls 936 and 940, respectively. For another example, the Type-M module implements its own Type-M interface 939, which is invoked by the Client-1 accessor via the call 938. As shown, the Client-N accessor does not invoke the Type-M module's Type-M interface 939. This is because, in the example, the Client-N accessor's dataset does not include data of Type-M. Example methods of a type-dependent interface, for an example "email" data type include subject( ) which gets or sets (depending on which overloaded version is invoked) a subject field from a record.

Because the generic client and type interfaces are pre-specified, the Engine will work with any client accessor and any type module that implements the specified client or type interface, respectively. Thus, as the Synchronizer needs to be updated to work with new clients or new data types, only new client accessors and/or new type modules need to be written and "dropped-in," or "plugged-in," to the Synchronizer. The Engine itself generally needs not be updated, and existing client accessors and type modules generally need not all be updated. (But, if a new type module is added, an existing client accessor that is wished to support the new data type may need to be updated, for example, to request type-dependent services via calls to the new type module's type-dependent interface.) Typically, the amount of software that needs to be acquired and installed for any update is small in relation to the entire size of the Synchronizer, for example, on the order of 100 kilobytes for each client or type module, and is suitable for rapid downloading from, for example, the Internet, even from a low-bandwidth modem connection. Furthermore, the modular, plug-in architecture is suitable for enhancement of the Synchronizer by third-party developers, and is less likely to lead to the breaking of existing functionality when new functionality (e.g., clients, data types) are added.

The generic interfaces and the type-dependent interfaces can be implemented with any suitable interface or protocol technology. For example, the interfaces may be implemented using statically- (not preferred) or dynamicallylinked software libraries, Microsoft Windows OLE or ActiveX, other Microsoft COM (Component Object Model)-based technologies, Java- or JavaBeans-based technologies, CORBA (Common Object Request Broker Architecture), or other technologies. Such technologies are well-known in the art and are described in numerous publications, including, for example, Dale Rogerson, *Inside COM* (*Programming Series*), Microsoft Press (February 1997), ISBN: 1572313498; James Gosling, Bill Joy, Guy L. Steele, *The Java Language Specification* (*Java Series*), Addison-Wesley (September 1996), ISBN: 0201634511; Laurence Vanhelsuwe, *Mastering JavaBeans,* Sybex (May 1997), ISBN: 0782120970; and Robert Orfali, Dan Harkey, *Client/Server Programming with Java and CORBA,* Second Edition, John Wiley & Sons (February 1998), ISBN: 047124578X.

D. Data-Type Modules

Each type module is a repository for the definitions associated with a particular data type. Each type module implements a generic type interface for the Engine and a possibly type-dependent interface for modules other than the Engine, including, in particular, client accessors supporting synchronization of data of the type module's particular data type in the client accessors' corresponding clients.

1. Generic Type Interface

The generic type interface is very small in the preferred embodiment, because the Engine does not care much about the details of any data type. The generic type interface provides common operations upon records of its data type. In the preferred embodiment, the generic type interface includes the following methods.

1. Compare( )

Compares multiple (e.g., two) records of the interface implementation's (i.e., type module's) data type to determine if they are equivalent according to whatever definition is implemented. This comparison is useful, for example, in duplicate resolution (using one definition of equivalence) or in determining whether a record has changed from an earlier value (generally using another definition of equivalence). Optionally, a QuickCompare( ) method may also be defined for performing a CRC-type comparison to quickly rule out equivalence. A CRC( ) method may be defined to calculate CRC-type values for such comparisons. QuickCompare( ) and CRC( ) are further discussed in a later section.

2. Merge( )

Merges multiple (e.g., two) records of the data type according to whatever scheme is implemented. A typical scheme merges records to keep all non-conflicting fields from all (either) records, but will choose for any conflicting field just the value from a latest-timestamped record. If no timestamps are available, an arbitrary rule can be implemented (e.g., ask the user, depending on the Synchronizer settings).

3. Filter( )

Filter one or multiple records to determine if the records meet certain criteria, based on the records' values. The filtering may be based on a last-modification-date range or boundary, or on other criteria.

The generic type interface is, in a sense, provided as a convenience to the Engine. In an alternative embodiment, the generic type interface does not exist as a separate interface, but its type-generic methods are implemented within every type-dependent interface. In the alternative embodiment, the generic client interface includes methods that, when called by the Engine, will invoke the type-generic methods on behalf of the Engine.

2. Type-Specific Interface

A type-specific interface for interacting with a record may be defined as follows (in the C++ programming language). The following example is for a "memo" data type.

```
 1: //********************************************************
 2: //    TSMemoRecord class definition
 3: //********************************************************
 4: class MemoTypeExport TSMemoRecord : public TSRecord
 5: {
 6: public:
 7:
 8:         TSMemoRecord                    ( );
 9:         TSMemoRecord                    ( TSRecord* );
10:         virtual ~TSMemoRecord           ( );
11:
12:         virtual TSINT32   Compare ( TSObject* );
13:
14:         TSString&         Subject       ( );
15:         TSString&         Body          ( );
16:         TSBOOL            Modified      ( );
17:
18:         void     Subject    ( TSCSTR, TSUINT32 = (TSUINT32) -1 );
19:         void     Body       ( TSCSTR, TSUINT32 = (TSUINT32) -1 );
20:         void     Modified   ( TSBCOL );
21:
22:         TSINT32           QuickCompare  ( TSRecord* );
23:         TSUINT32          CRC           ( );
24:
25: protected:
26:
27:         void              InitBody      ( );
28:         void              InitHeader    ( );
29:         TSObjectVector*   MemoBody      ( );
30:         TSObjectVector*   MemoHeader    ( );
31:
32: };
```

At the outset, the class declares (at lines 8–10) housekeeping routines, including class constructors and class destructor. The class also declares methods (at lines 14–16) for getting data fields and methods (at lines 18–20) for setting data fields.

The class also declares (at line 12) a Compare( ) method and (at lines 22–23) a QuickCompare( ) and a CRC( ) method, which are preferably the same as implemented in the type module's generic type interface. The QuickCompare( method can quickly rule out equivalence among records using CRC (Cyclic Redundancy Check)-type codes that have been calculated for particular records, or need to be calculated by calling the CRC( ) method. Only if a quick match is found, is it necessary for the Synchronizer to do a full Compare( ) of particular field values according to the implemented definition of equivalence. Different definitions may be used for different purposes. (For example, for duplicate resolution, an implementation of a "contact" type might define two records having identical "first name," "last name," and "employer" fields ("identifying fields") as equivalent, whereas for determining user changes, the implementation might define two records as equivalent only if they are identical in all user-settable fields.) CRC-type codes are codes in which data of arbitrary length (e.g., a record's identifying fields (or all fields), expressed as a single string) are deterministically mapped into easily-compared values. Modulo 65536 is an example of a CRC-type mapping function. Because CRC-type mappings are generally many-to-one mappings, a full compare is necessary to confirm equivalence.

E. Client Accessors

Each client accessor is a repository for knowledge of the workings and idiosyncracies associated with a particular client. Each client accessor implements a generic client interface for the Engine, by which the Engine is shielded from the detailed knowledge of the particular client. For example, a client accessor addresses issues about whether data can be accessed by the Synchronizer while the client's "owning application" is running; whether the "owning application" saves changes as they are made (or whether it requires confirmation); and whether there are times when synchronization is prohibited; and so forth.

The generic client interface for interacting with a client (e.g., dataset) may be defined as follows (in the C++ programming language). In the preferred embodiment, an instance of the client interface is created for handling a client's records of each data type, or in each mapped record file, that is sought to be synchronized.

```
1:  //*********************************************
2:  //     TSSource class definition
3:  //*********************************************
4:  class DllExport TSSource : public TSObject
5:  {
6:  public:
7:
8:        // Construction / Destruction
9:        TSSource ( TSSourceManager*, TSUINT32 = 0);
10:       virtual ~TSSource ( );
11:
12:       // Open and closing of the source
13:       virtual TSRESULT       Open         ( TSUINT32 );
14:       virtual TSRESULT       Open         ( );
15:       virtual TSRESULT       Close        ( ) = 0;
16:
17:       // Record manipulation support
18:       virtual TSRESULT       Add          ( TSRecord& ) = 0;
19:       virtual TSRESULT       Update       ( TSRecord& ) = 0;
20:       virtual TSRESULT       Delete       ( ) = 0;
21:       virtual TSRESULT       Get          ( TSRecord* ) = 0;
22:       virtual TSUINT32       Count        ( ) = 0;
23:       virtual TSRESULT       DeleteAll    ( );
24:
25:       virtual Tsstring&      ID           ( ) =0;
26:       virtual TSDateTimeStamp&   LastModified   ( ) = 0;
27:       virtual TSUINT32       CRC          ( );
28:
29:       virtual TSUINT32       GeneratecRc
                                 TSUINT32, const void*, TSUINT32 );
30:       virtual TSUINT32       GenerateCRC
                                 TSUINT32, const TSString& );
31:       virtual TSUINT32       GenerateCRC
                                 TSUINT32, const TSDateTimeStamp& );
32:
33:       // Record navigation support
34:       virtual TSRESULT       MoveFirst    ( ) = 0;
35:       virtual TSRESULT       MoveNext     ( ) = 0;
36:       virtual TSRESULT       MoveTo       ( TSCSTR ) = 0;
37:
```

At the outset, the class declares (at lines 8–15) housekeeping routines, including a class constructor (line 9) and class destructor (line 10). As shown, the class includes open( ) methods (lines 13–14) and a close( ) method (line 15). These methods tend to housekeeping chores attendant with opening and closing objects created from the class.

Class methods for manipulating the client's records are declared at lines 17–23. In particular, a Get( ) method exists for reading records. Add( ) and Update( ) methods exist for adding or modifying records. Delete( ) and DeleteAll( )

methods exist for deleting records. A Count( ) method exists for producing a count of records. ID( ), LastModified( ), and CRC( ) methods exist for extracting the identifier (in the client), the last-modified timestamp (if any), and the CRC-type result, respectively, for a record.

Class methods for navigating or "moving" through the client's (ordered) records are declared at lines 34–36. These methods include a MoveFirst( ) method for moving a conceptual "pointer" or "highlight" to the client's first record such that other method calls (for example, Delete( )) will act upon the highlighted first record. A MoveNext( ) and a MoveTo( ) method exists to move the highlight to a next record in the client's ordering or to a particular record in the client's ordering.

The generic client interface definition continues as follows.

nent determines whether synchronization is scheduled or performed only upon demand; whether the user is prompted before the start of synchronization and notified upon completion; and scheduling of automatic synchronizations or back ups.

Transaction Management provides a management component that informs the user via the UI component 914 (of FIG. 9A) of the progress of synchronization. Notification responsibilities include notification of when synchronization activities are completed, current synchronization activity and activity progress, remaining activities. Other responsibilities include logging transactions, including error messages, and informing the user via the UI component 914 how to abort the current transaction.

The UI component 914 (of FIG. 9A) implements the user interface of the Synchronizer, and calls upon the Synchro-

```
38:     // Data filtering (Optional overrides)
39:     virtual TSBOOL      Filter   ( TSRecord* );
40:     virtual TSRESULT    Filter   ( TSSOURCEFILTER,
                                       const TSDateTimeStamp& );
41:
42:     // Automatic field mapping support (Optional override)
43:     virtual TSRESULT    GetField    ( TSUINT32, TSField*
                                          );
44:     virtual TSRESULT    SetField    ( TSUINT32, TSField&
                                          );
45:     virtual TSUINT32    FieldID     ( TSCSTR );
46:
47:     // Get functions
48:     TSConfig*           Config             ( );
49:     TSSourceManager*    SourceManager      ( );
50:     TSLog*              Log                ( );
51:     TSSourceCategory*   SourceCategory     ( );
52:     TSRecordMapItem*    RecordMapItem      ( );
53:
54:     // Set functions
55:     void                Config             ( TSConfig* );
56:     void                SourceManager      ( TSSourceManager* )
57:     void                RecordMapItem      ( TSRecordMapItem* );
58:
59:     TSRESULT            CategoryLastModified ( TSDateTimeStamp* );
60:
           . . .
nn:   };
```

As shown, other methods are declared for, for example, filtering of records (at lines 38–40), mapping of record data fields (at lines 43–45), and for housekeeping and configuration management purposes (at lines 48–59).

F. Synchronization Support Components and the UI

The synchronization support module 916 (of FIG. 9A) provides synchronization support services including Configuration Management, Scheduling Management, Transaction Management, and Application Communication. Each will be described in turn.

Configuration Management provides a management component that records the synchronization configuration. The component tracks datasets (e.g., clients); means of access; owning application; synchronization relationships; security and privileges; data types; registration of new clients and new data types (e.g., via plug-in installation); and synchronization resources (size and location of supplemental datasets, and the like). In the preferred embodiment, the Configuration Management also handles the initialization of the Synchronizer by instantiating program objects (client accessors, type modules, action table, etc.) during run-time, so that the Engine is liberated from such tasks.

Scheduling Management provides a management component that schedules synchronization activity. This componization support module 916 to give effect to the user's choices. The UI of the Synchronizer has been discussed in detail in previous sections.

G. Downloading or Installing Plug-Ins

The Synchronizer is particularly suitable for the downloading or installing of additional client accessors and/or type modules. The Synchronizer, possibly in combination with a browser software program (e.g., Internet Explorer from Microsoft or a generic browser interface built-into the Synchronizer itself), performs some or all of the following actions, if instructed to do so by the user, or upon detection of a new type of device (e.g., via Microsoft's Plug-n-Play service for PC computers running Microsoft Windows software):

(0) detect a new type of device coupled to the user's computer;

(1) obtain an identifier of the new type of device (the "device identifier") (for example, from the operating system of the user's computer);

(3) establish a communication link with an automated Synchronizer software clearinghouse server (for example, use the Internet to connect to a World Wide Web (WWW) server (e.g., to a site hosted on http://www.starfish.com/);

(4) convey the device identifier to the clearinghouse;
(5) compare (e.g., by the clearinghouse) the device identifier to a database of devices supported by the Synchronizer (e.g., for which client accessors or type modules exist);
(6) if the device identifier corresponds to a supported device and the Synchronizer lacks the latest client accessors or type modules for the supported device, download such additional accessors or type modules from the clearinghouse server (but, optionally, first prompt the user for confirmation);
(7) install such accessors or type modules as executable software code;
(8) modify a configuration file of the Synchronizer such that it knows the existence of, and the method of invoking, the downloaded accessors or type modules; and
(9) thereafter, be able to Synchronize a dataset of the device.

VIII. Core of the Synchronizer

As was shown in FIG. 9A, the synchronizer core 908 includes the GUD 928, and the action list 930, in addition to the Engine 926, which has been described above.

A. The Synchronizer Dataset (GUD)

1. Overview

Figure 10A:
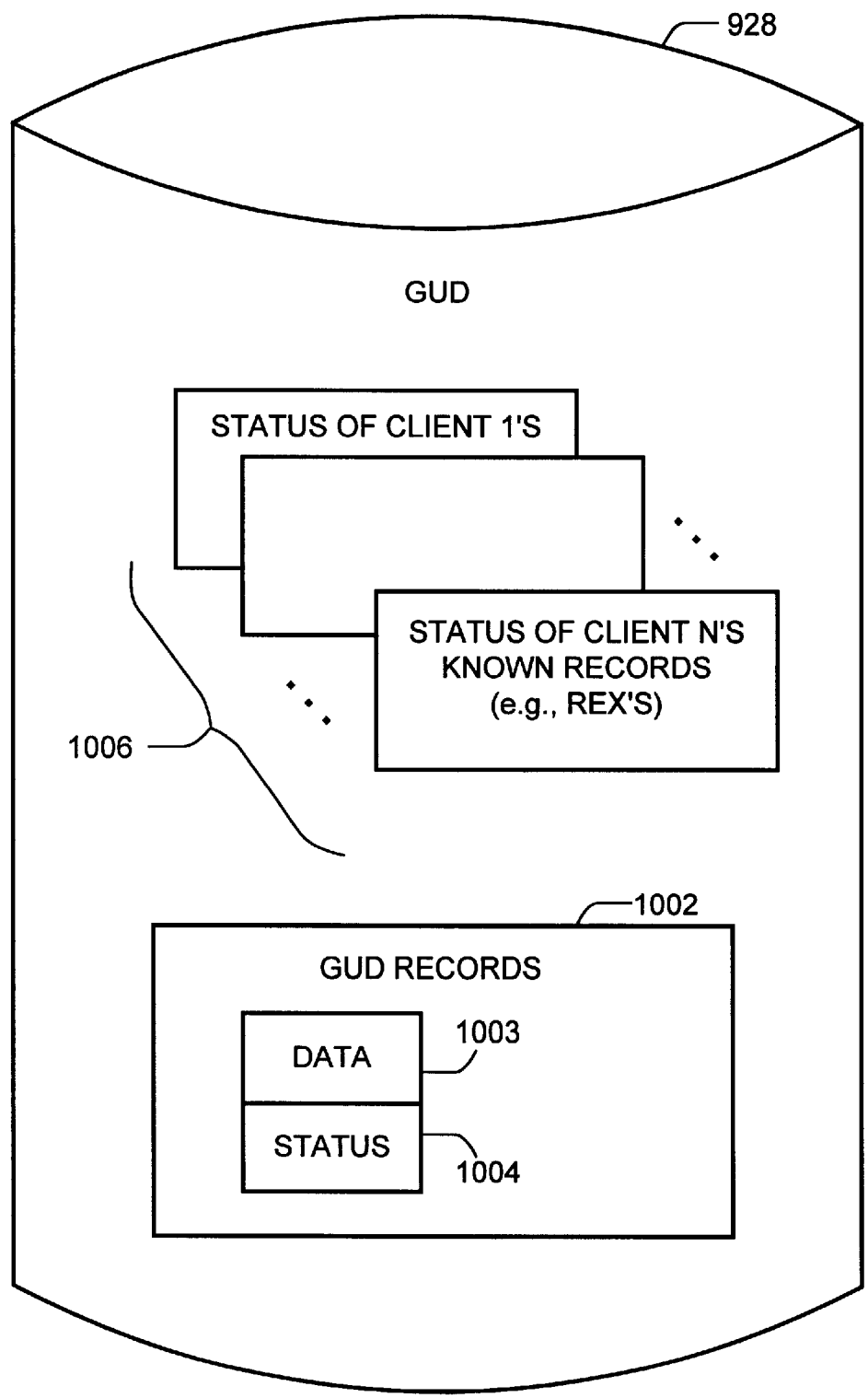
FIG. 10A is a block diagram that shows components of a Synchronizer dataset.

FIG. 10A is a block diagram that shows components of the Synchronizer dataset, or GUD 928. In the preferred embodiment, a separate instance of the GUD as shown in FIG. 10A is created for every data type, or every mapping of record files, for every user. As shown, the GUD includes stored GUD records 1002. These GUD records correspond to the most up-to-date records processed by the Synchronizer during any synchronization since the GUD was created or last reset. The GUD records 1002 include data 1003 corresponding to data in client records and status information 1004 about the GUD records 1002. In addition, the GUD includes status information 1006 about records in the clients. In particular, the client status information 1006 includes information about all records known by the Synchronizer to be in the clients and to correspond to GUD records. Preferably, the client status information 1006 is organized as independent "mapping tables" (for example, a mapping table 1007) that each includes information about all records in a particular client that correspond to, or are mapped to, the GUD records.

2. GUD Records, Including Their Status

Figure 10B:
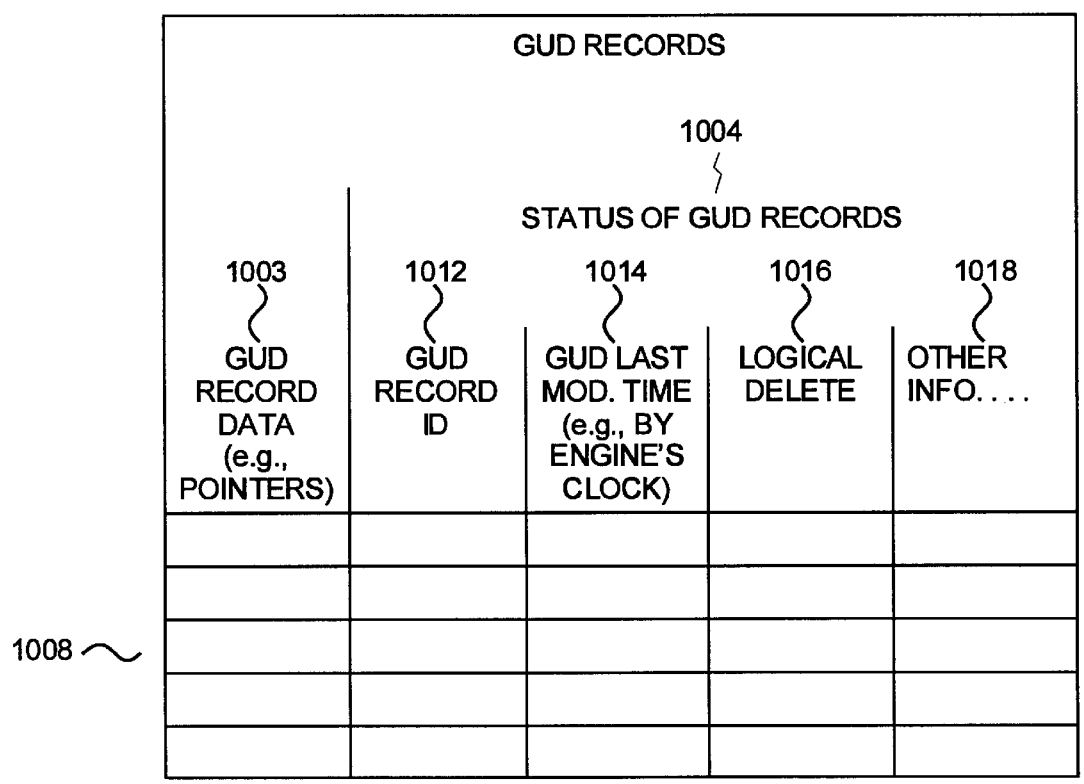
FIG. 10B is a table that shows records of the Synchronizer dataset, including their data and some of their status information.

FIG. 10B is a table that shows the GUD records, including their data 1003 and some of their status information 1004. In FIG. 10B, each row 1008 of the table represents a GUD record. For each GUD record, the status information 1004 includes a unique GUD record identifier 1012 ("GUD ID"), a GUD last-modified timestamp 1014, a logical delete flag 1016, and other information 1018. Several of these recited features will now be discussed in order.

The GUD records' data 1003 are either local data or accessible remote data (e.g., remotely accessible via a wireline or wireless network). The GUD records' data 1003 are viewed by the Engine as mere blobs of undifferentiated data. (Recall that the Engine preferably relies exclusively on a client accessor or a type module to perform actual operations on records, without itself knowing details about particular record structures or meaning.)

Each GUD ID 1012 uniquely identifies a GUD record within the GUD. In the preferred embodiment, each GUD ID is an integer having at least 32 bits.

The GUD last-modified timestamp 1014 is a timestamp according to the Engine's clock that indicates when the GUD record was last modified in the GUD.

The logical delete flag 1016 is used to indicate that a GUD record is to be considered "deleted," as the result of a synchronization. The GUD record itself is not deleted, and thus the "deletion" is only a "logical deletion."

The nature and types of the other status information 1018 depend on the particular synchronization methodology used by the Synchronizer. The other information 1018 may, in particular, include information that might be retained about a GUD record to be used in conflict/duplicate resolution, especially an "original-priority" style of resolution which will be further discussed in later sections.

3. Status of Client's Records (Mapping Table)

Figure 10C:
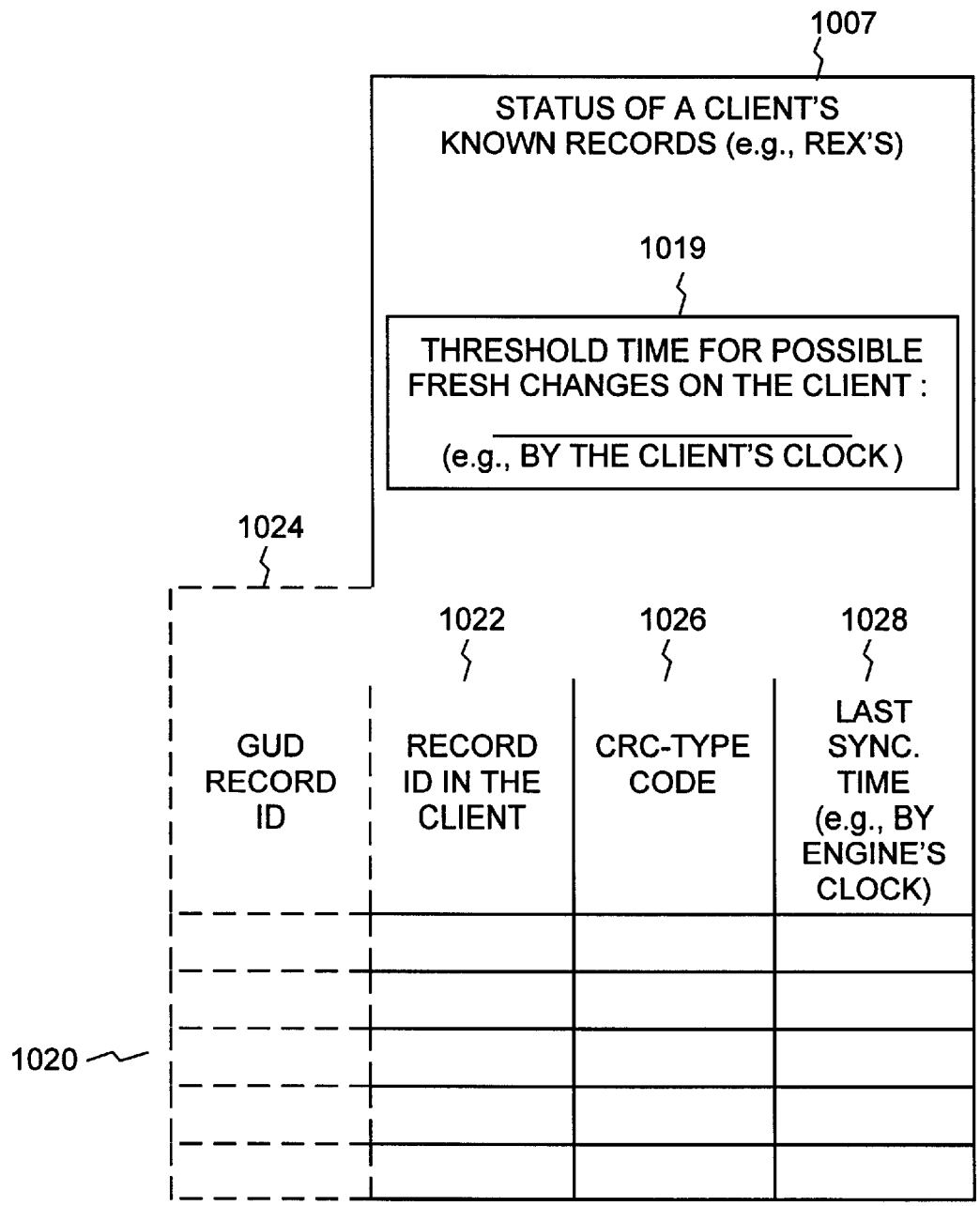
FIG. 10C is a table that shows portions of the mapping table (of FIG. 10A) that describes a particular client's records.

FIG. 10C is a table that shows portions of the mapping table 1007 (of FIG. 10A) that describes a particular client's records. The mapping table 1007 includes a threshold time 1019 (e.g., the "pre-fresh threshold" discussed earlier) after which if changes were made on the client, those changes would be considered fresh changes with respect to the GUD. Again, fresh changes with respect to the GUD refers to changes in the client (for example, additions, modifications, and deletions) that have not been previously seen by the Synchronizer while using the GUD and are therefore fresh with respect to the GUD. (Similarly, fresh changes in the GUD with respect to a client would refer, in later sections, to changes in the GUD (for example, additions, modifications, and deletions) that have not been previously seen by the client during synchronization involving the GUD.) The mapping table 1007 also contains status information about all the records known to the Synchronizer in the client that correspond to GUD records. In FIG. 10C, each row 1020 of the mapping table 1007 corresponds to one particular GUD record. If a GUD record has a corresponding record in the client, then the GUD record's row in the mapping table will include both the GUD record's GUD ID and its client record's client ID, to thereby map the two ID's to each another. (A client ID uniquely identifies a client record within the client.) If no record in the client corresponds to the GUD record, then the GUD record's row in the mapping table will show the GUD record's GUD ID, but will have no corresponding record ID. The mapping table 1007 also includes, for each of the client records, a CRC-type result 1026 and a last-synchronization time 1028. Several of these recited features will now be discussed in order.

The threshold time 1019 is preferably the latest last-modified timestamp seen on any record in the client during the previous synchronization (except timestamps caused by modifications made by the Synchronizer itself, if any), e.g., the "pre-fresh threshold" discussed earlier. If the client is of the type that does not maintain a last-modified timestamp for its records, then the threshold time 1019 is not used to determine fresh changes in the client, as will be further described.

The client record ID 1022 may be an integer or a descriptor (e.g., values of key data field(s)), depending on the particular client. The client record ID uniquely identifies a record within the client.

The CRC-type result 1026 characterizes the value of the client record as of the end of the most recent previous synchronization of the client by the Synchronizer. The CRC-type result 1026 is useful for quickly determining via direct comparison whether the value of the client record has changed on the client since the previous synchronization of the client by the Synchronizer. In particular, the CRC-type result is needed for this purpose if the client is of the type that does not maintain a last-modified timestamp for its records, as will be further discussed in connection with synchronization methodologies. The CRC-type result 1026, in an embodiment, may include a subcomponent (e.g., relating to just a few key record fields) that is used for determining equivalence for duplicate resolution purposes).

The last-synchronization time 1028 is the time of completion of the last action performed by the Synchronizer with respect to synchronizing this client record. (For example, the time that the client record was either written to the client (from the GUD) by the Synchronizer, or the time that the client record was written to the GUD from the client by the Synchronizer.

In the preferred implementation, a mapping table exists for each client. Thus, each GUD record is capable of being mapped to all possible clients that the Synchronizer is capable of synchronizing. In particular, each GUD record may be mapped to records in one, two, or more than two clients (e.g., datasets). Even more particularly, the GUD may include just a single copy of a particular GUD record, and that single copy corresponds to, and may be mapped to a record from each of one, two, or more than two clients. Each mapping table has a unique mapping table ID, which is mapped to its client by the Configuration Management component within the synchronization support module 916 (of FIG. 9A). Because the status information in all mapping tables include information of client records corresponding to GUD records, the status information 1006 may also be considered a part of the GUD records 1002—i.e., each GUD record 1008 (of FIG. 10B) can be considered to include not only the GUD record's data (e.g., a pointer) and its status in the GUD, but also the status (e.g., information of row 1020) of the GUD record's corresponding records in other datasets.

C. The Action List

The action list 930 (shown in FIG. 9A) is a working buffer in which the Engine stores proposed actions during a synchronization as it examines records from every client that may contain changes to be propagated. The proposed actions are not executed until all clients have been examined. By proposing but not immediately executing actions, the Engine preserves an opportunity to re-consider the proposed actions. In particular, if the Engine proposes actions in response to a later-examined client that are conflicting or complementary to actions proposed in response to an earlier-examined client, then the conflicting actions may be modified or cancelled, according to conflict or duplicate resolution.

In the preferred embodiment, each element in the action list includes the following elements.

1. A mapping table item

This element is has the form of a single row in the table of FIG. 10C. In particular, the mapping table item includes a GUD ID, a client record ID, a CRC-type result, a last-synchronized timestamp (preferably, according to the Synchronizer's clock), and optionally, additional information that depends on the particular embodiment of the invention, as described in connection with FIG. 10C and elsewhere.

2. An action indicator

This element indicates one of six possible actions, namely: (1) GUD_Update, (2) GUD_Add, (3) GUD_Delete, (4) Client_Update, (5) Client_Add, and (6) Client_Delete.

3. A record pointer

This element is a pointer or mechanism (e.g., a memory or other type of address) for accessing the record data to be propagated by the action. Preferably, the record data is a copy that the Synchronizer has at some time created on the Synchronizer's local mass storage device, or other storage capable of high speed operation. The pointer or mechanism can be a pointer to, or mechanism for retrieving, a record from a client itself.

4. A client indicator

This element identifies the client, if any, from which the action originated. As will be further discussed, this field is useful for preventing an action that originated from a particular client from being propagated back to that particular client.

5. Other information

This element includes other information that may be useful for the particular synchronization methodology implemented. In particular this element may include values either obtained from, or to go into, a GUD record's "other status information 1018" field (see FIG. 10B).

In the preferred embodiment, as the Synchronizer builds up the action list, the Synchronizer keeps the list's elements sorted according to their GUD ID (if any). In this way, proposed actions in the action-list that involve a same GUD record will be adjacent and therefore easy to find during, for example, conflict resolution.

The actions GUD_Update, GUD_Add, and GUD_Delete propagate changes into the GUD by respectively updating, adding, or deleting a record in the GUD. The actions Client_Update, Client_Add, and Client_Delete propagate changes into a client by respectively updating, adding, or deleting a record in a client.

IX. Synchronization Methods

A. Overview

Figure 11A:
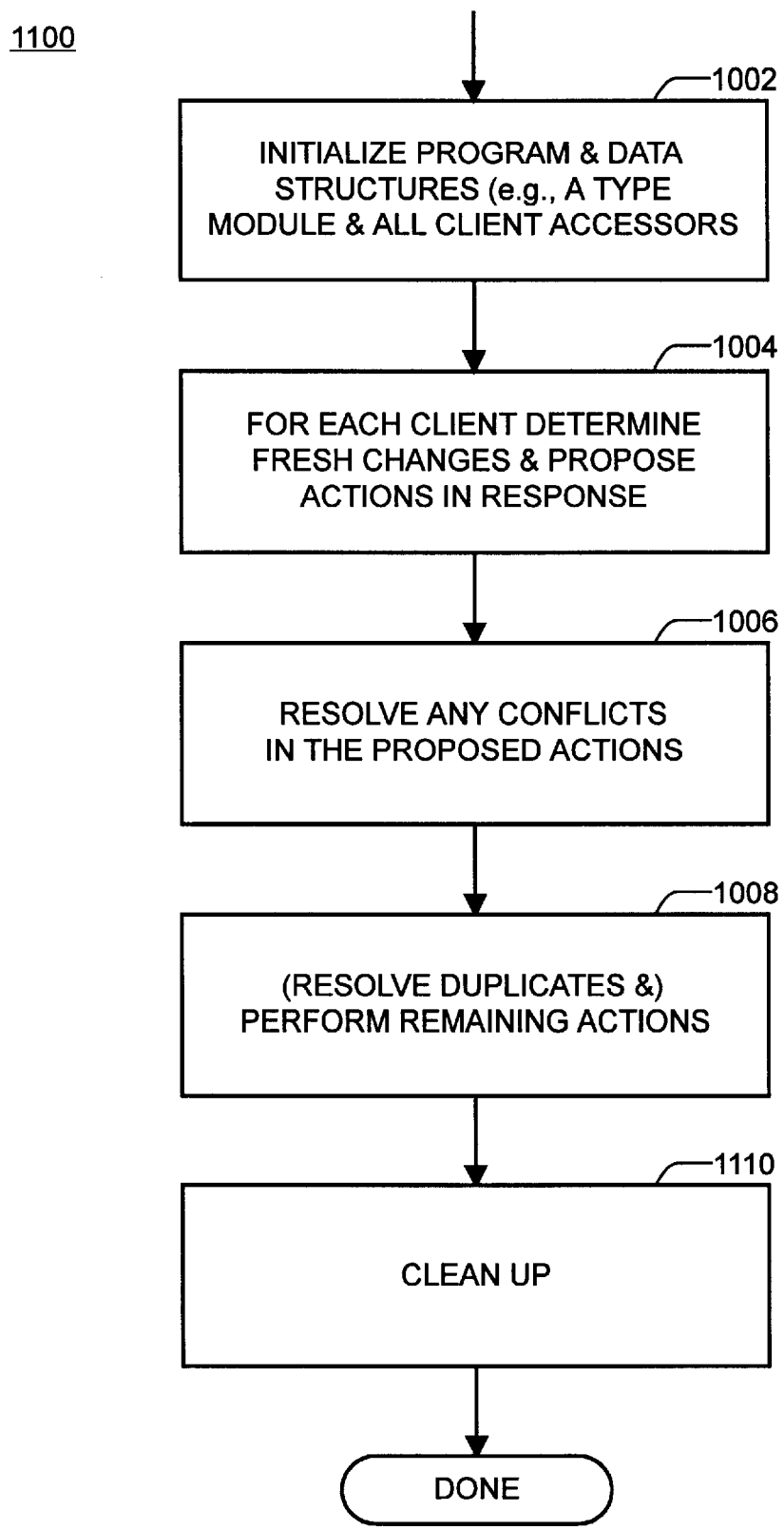
FIG. 11A is a flow chart that illustrates the Synchronizer's methodology for performing a synchronization.

FIG. 11A is a flow chart that illustrates the Synchronizer's methodology 1100 for performing a synchronization. Preferably, the methodology 1100 is performed for each synchronization of similar data (e.g., within a data type or a mapping of record files). As shown, in a step 1102, the Synchronizer initializes program and data structures, such as the action list, a type module, and all client accessors for clients that are participating in the synchronization. In the preferred embodiment, this initialization is performed by the Configuration Management component within the synchronization support module 916 (of FIG. 9A). Next, in a step 1104, the Synchronizer examines each client to identify any changes in the client that the Synchronizer has not seen before, and any changes in the GUD that the client has not seen before, (together referred to as "fresh changes") and based on those fresh changes, determines and proposes actions to be performed. In a subsequent step 1106, after all actions have been proposed for each client, the Synchronizer examines the proposed actions in the action list, finds any conflicts, and alters or prunes the actions in the action list to resolve the conflicts. In a further subsequent step 1108, the Synchronizer performs the conflict-resolved actions to thereby bring all clients into synchronization. Within the step 1108, the Synchronizer may perform further resolution, for example, of duplicate-record conditions. Finally, in a step 1110, the Synchronizer performs housekeeping tasks such as closing run-time program and data structures.

B. Determine Changes and Propose Actions for Propagating Changes

Figure 11B:
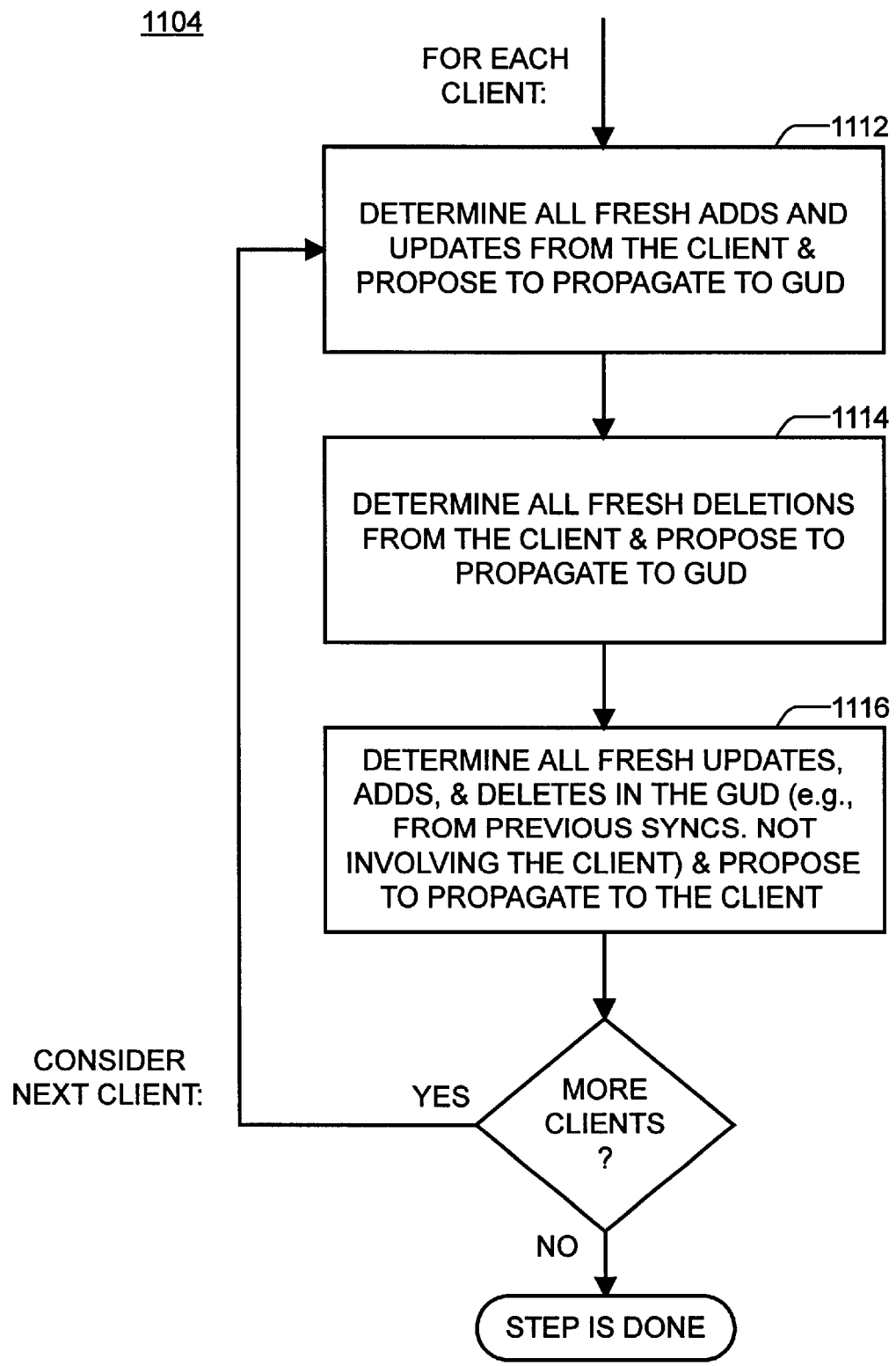
FIG. 11B is a flowchart that shows an expansion of the step (of FIG. 11A) that determines fresh changes and proposes actions in response.

FIG. 11B is a flowchart that shows an expansion of the step 1104 (of FIG. 11A) that determines fresh changes and proposes actions in response. As shown, the step 1104 itself includes steps 1112, 1114, and 1116, which are looped over all clients. Within the loop, i.e., for a particular client, the Synchronizer in the step 1112 determines all records in the client that have been updated or added to the client prior to the current synchronization and are fresh (or, all records updated or added, not by the Synchronizer itself, to the client after the threshold time 1019 of FIG. 10C). For each such fresh updated or added record, the Synchronizer proposes a corresponding GUD_Update or GUD_Add action, respectively, of the record. Next, in the step 1114, the Synchronizer determines all records that have been deleted from the client prior to the current synchronization and are fresh (or, all records deleted, not by the Synchronizer itself, after the threshold time 1019 of FIG. 10C). For each such fresh deleted record, the Synchronizer proposes a GUD_Delete of the deleted record's corresponding GUD record. Next, in the step 1116, the Synchronizer determines all records that have been updated, added, or (logically-) deleted in the GUD prior to the current synchronization and are fresh with respect to the client (e.g., were changed in the GUD during a synchronization in which the client did not participate). Such changes in the GUD may be fresh with respect to the client, for example, because the client did not participate in one or more of the most recent synchronization (s). For each such fresh updated or added GUD record, the Synchronizer proposes a Client_Update or Client_Add action, respectively, of the record to the client. For each such fresh deleted GUD record, the Synchronizer proposes a Client_Delete of the GUD record's corresponding client record. When all clients have been processed by the loop, the step 1104 is ended and the Synchronizer proceeds to the step 1106 (of FIG. 11A).

1. Determine Updates & Adds in the Client & Propose Actions

Figure 11C:
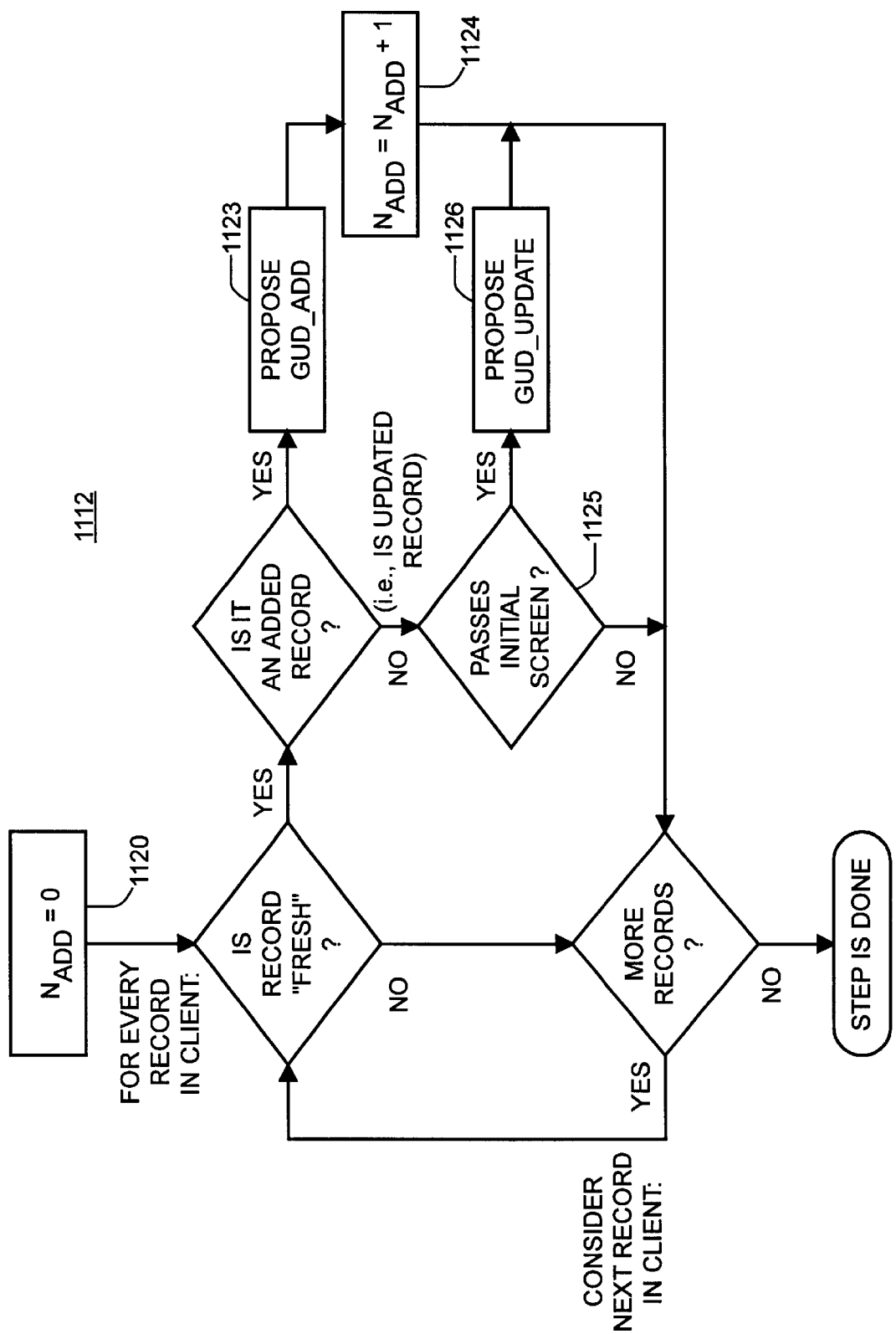
FIG. 11C is a flowchart that shows an expansion of the step (of FIG. 11B) that determines all fresh updates and adds from a particular client and proposes $GUD_{13}$ Updates and GUD__Adds, respectively, in response.

FIG. 11C is a flowchart that shows an expansion of the step 1112 (of FIG. 11B) that determines all fresh updates and adds from a particular client and proposes GUD_Updates and GUD_Adds, respectively, in response. Handling updates and adds in a same step, namely, step 1112, is efficient because updates and adds may both involve client records whose modification timestamps, if any, are later than the pre-fresh threshold of the client. The step 1112 itself includes steps 1120, 1121, 1122, 1123, 1124, 1125 (optional), and 1126. Initially, in the step 1120, the Synchronizer initializes a counter variable, $N_{ADD}$, that will count the number of records that have been added to the client prior to the current synchronization.

Next, the Synchronizer performs a program loop over every record in the client. Within the loop, i.e., for a particular record, the Synchronizer in the step 1121 determines whether the record is fresh with respect to the GUD. If the client is of the type that provides a last-modified timestamp, then the Synchronizer positively determines that the record is fresh if the last-modified timestamp is later than the pre-fresh threshold. If the client does not provide last-modified timestamps, then the Synchronizer will:

(1) determine that the client record is fresh (and is an added record), if the client record has no known corresponding GUD record (i.e., the client record's client ID does not appear in the mapping table); and (2) if otherwise, determine that the client record is fresh (and is an updated record) if the client record differs in value from its value at the end of the previous synchronization involving the client.

The above step (2) may be implemented by comparing the client record's current CRC-type result with the CRC-type result stored in the mapping table for the client at the end of the previous synchronization involving the client. If the CRC-type results do not match, then the client record is fresh (and is an updated record). If the CRC-type results do match, the Synchronizer may (with only a slight degree of danger, if the CRC-type function is any good) simply assume that the client record is not fresh (i.e., has not changed since the previous synchronization involving the client). For better rigor, if the CRC-type results do match, the Synchronizer may:

(a) Make a further comparison between the client record and its corresponding GUD record (e.g., after first transforming the client record into its GUD-representation).

(b) If the client and GUD records match, then safely treat the client record as not fresh and ignore the client record.

(c) If the client and GUD records do not match, and the GUD record has not changed since the most recent previous synchronization involving the client, then safely assume the client record is fresh (and an updated record).

(d) If the client and GUD records do not match, and the GUD record has changed since the most recent previous synchronization involving the client, then revert back to the (only slightly dangerous) assumption that the client record is not fresh (i.e., is not a fresh add or update).

More generally, the above-described comparison of CRC-type results and the above-described steps (a), (b), and (c) include a comparison by the Synchronizer between the client record and the value of the client record at the end of the previous synchronization involving the client. However, in the above-described step (d), the GUD record generally no longer reflects the value of the client record at the end of the previous synchronization involving the client because the GUD record has changed since that previous synchronization, and thus comparison with the GUD record in step (a) would not be fruitful. Therefore, for improved rigor, an implementation of the Synchronizer specifically guarantees, for comparison with the client record in the steps (a)–(d), availability of an a record (either a GUD record, as in steps (a)–(c), or an archive record) that does reflect the value of the client record at the end of the previous synchronization for comparison with the client. The Synchronizer fulfills its guarantee by storing an archive copy of of a GUD record just prior to changing the GUD record during a particular synchronization, if there are clients (known to the Synchronizer from earlier synchronizations) that are not participating in the particular synchronization.

Next, after the step 1121, the Synchronizer in the step 1122 determines (if it hasn't already done so in the steps (1) and (2) above) whether the fresh record is an added record. (Again, if the client record's client ID does not appear in the mapping table, then it is an added record.) If the fresh record is an added record, the Synchronizer, in the step 1123, proposes a GUD_Add to add the record to the GUD and, in the step 1124, increments the count $N_{ADD}$ by one. If the fresh record is not an added record, then it must be an updated record (since it is fresh). In general, for a fresh updated record, the Synchronizer in the step 1126 proposes a GUD_Update to modify the client record's corresponding GUD record using the values in the client record. However, particular implementations of the Synchronizer may include an optional step 1125, in which the Synchronizer can choose to ignore the fresh updated record if it fails to meets certain initial-screening criteria. The optional step 1125 and possible screening criteria are discussed further in a later section, in context with conflict resolution involving priority time. In summary of FIG. 11C, a proposed GUD_Add of a record indicates that the record has been added to the client and is fresh with respect to the GUD, and a proposed GUD_Update using a record indicates that the record has been updated and is fresh with respect to the GUD. The logic of FIG. 11C may be implemented in various ways. For example, the Synchronizer engine may simply ask its client accessor module to return just the fresh records, and then the Synchronizer engine may loop over the fresh records and within each loop begin with the step 1122.

2. Mechanics of Proposing an Action

The Synchronizer proposes an action by creating and appropriately filling in an action-list entry. In general, the Synchronizer fills the action-list entry, including its mapping-table item, with information from the record whose change is to be propagated (for example, client's information for GUD_* actions or GUD's information for Client_* actions).

For example, to propose a GUD_Add, the Synchronizer:
(1) creates an action-list entry and fills the entry's mapping-table item with the client record's client ID and the client record's CRC-type code, and leaves the item's GUD ID and last-synchronization time empty;
(2) copies the client record's data into a local run-time buffer (converting first into GUD-format, by calling the client accessor which knows the client's data formats and, for example, calls the type module to receive descriptor information regarding the GUD-format);
(3) places a pointer to the local copy of the client record's data in the action-list entry's record pointer;
(4) places an indicator of the GUD_Add action into the action-list entry's action indicator;
(5) places an indicator of the particular client into the action list entry's client indicator;
(6) places information into the action-list entry's "other information" element, as appropriate for the particular synchronization methodology. For example, if using an "original-priority" style of conflict/duplicate resolution to be discussed, this information would include the client record's modification timestamp from the client.

3. Determine Deletions from the Client & Propose Actions

Figure 11D:
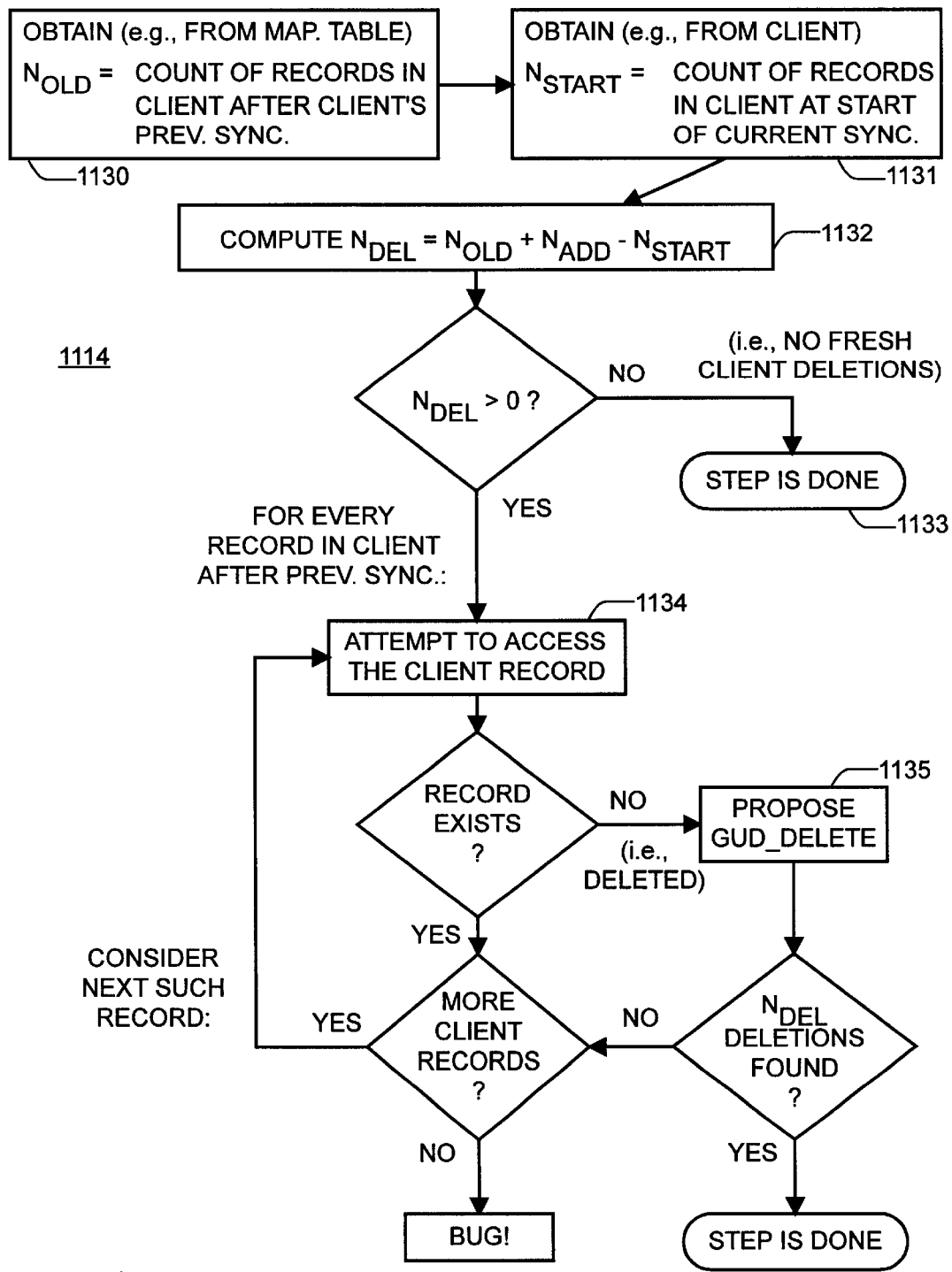
FIG. 11D is a flowchart that shows an expansion of the step (of FIG. 11B) that determines all fresh deletions from a particular client and proposes a GUD__Delete in response.

FIG. 11D is a flowchart that shows an expansion of the step 1114 (of FIG. 11B) that determines all fresh deletions from a particular client and proposes a GUD_Delete in response. As shown, the step 1114 itself includes steps 1130, 1131, 1132, 1133, 1134, and 1135. The Synchronizer in steps 1130, 1131, 1132, and 1133 together look for and identify the situation that no fresh deletions have been made on the client. If that situation is found, the Synchronizer skips the remaining steps in FIG. 11D (see node 1133 of FIG. 11D). Skipping the remaining steps, when possible, may save significant time.

In the step 1130, the Synchronizer obtains a count $N_{OLD}$ of the number of records in the client at the end of the previous synchronization in which the client participated (from now on, referred to as "the previous synchronization"). (This count may be obtained, for example, by counting the number of client ID's in the mapping table.) In the step 1131, the Synchronizer obtains a count $N_{START}$ of the number of records in the client at the start of the current synchronization. (This count may be obtained, for example, from the client accessor.) In the step 1132, the Synchronizer computes $N_{DEL}$, which is the computed number of fresh deletions from the client:

$$N_{DEL} = N_{OLD} + N_{ADD} - N_{START}$$

where $N_{ADD}$ was previously established by the step 1112 (see FIG. 11C). If $N_{DEL}$ is zero, then the remaining steps are skipped.

If $N_{DEL}$ exceeds zero (and it cannot be below zero), then the Synchronizer will identify the GUD records that correspond to the records that have been deleted in the client. Some clients may be capable of providing information about the identities of deleted client records. If so, a client accessor for such a client can easily provide the client IDs of the deleted records to the Engine. In general, though, a client may not keep any information about its deleted records. For such a client, the Synchronizer, in the step 1134, queries its client accessor for the client about the existence of every record that the Synchronizer knew was in the client at the end of the previous synchronization. This is accomplished by executing a program loop over every client ID in the mapping table. Within the loop (i.e., for a particular existing client record formerly known to exist), the Synchronizer attempts in the step 1134 to gain access to (or otherwise queries the existence of) the client record. If the Synchronizer cannot gain access to the client record, the client record must have been deleted, and the Synchronizer, in the step 1135, proposes a GUD_Delete action to delete the client record's corresponding GUD record. The loop may be terminated when the number of found deleted client records reaches $N_{DEL}$. In summary of FIG. 11D, a proposed GUD_Delete indicates that a record that was present at the end of a previous synchronization involving the client has since been deleted in the client, and the deletion is fresh with respect to the GUD.

4. Determine Changes in the GUD & Propose Actions

Figure 11E:
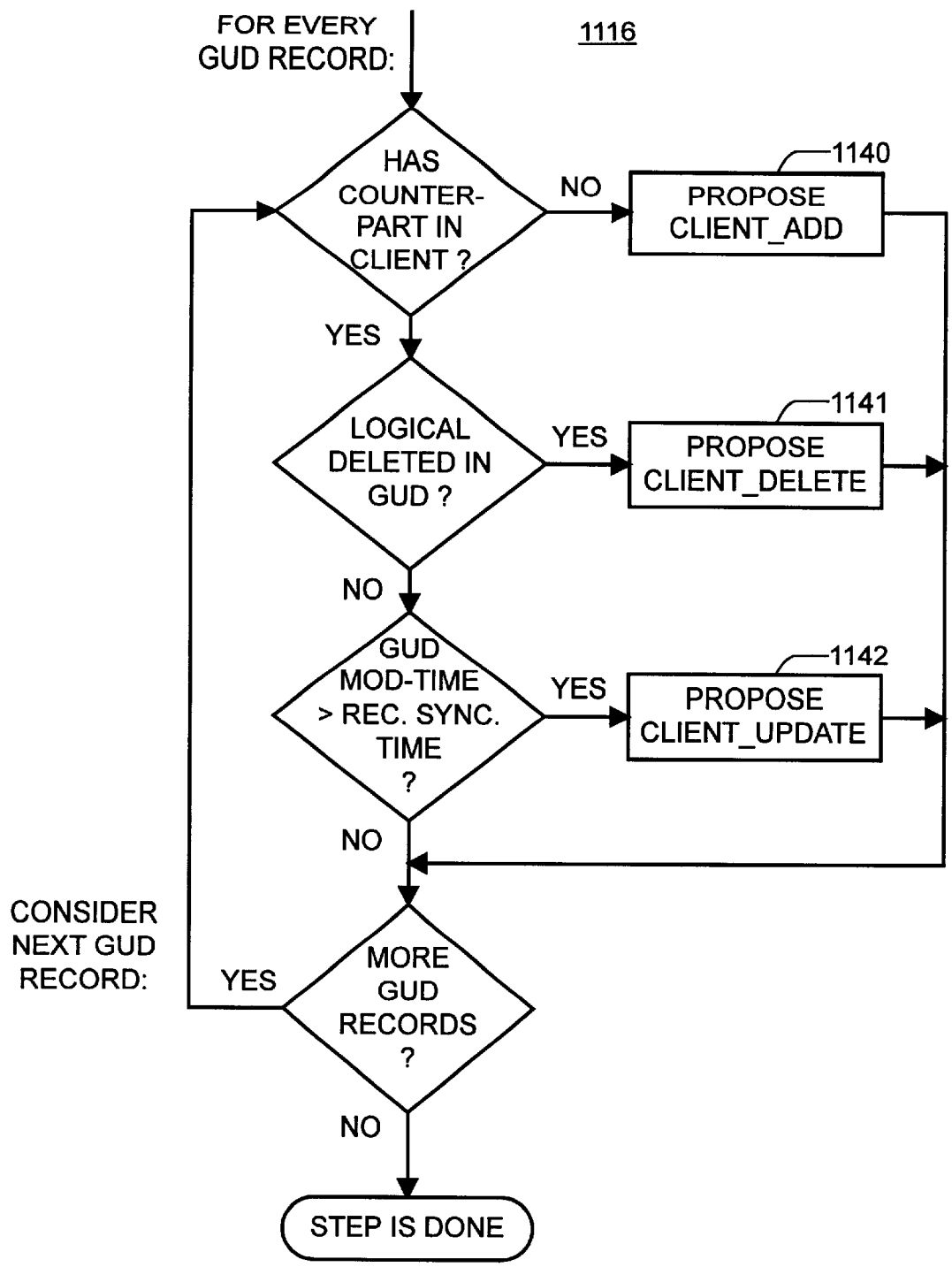
FIG. 11E is a flowchart that shows an expansion of the step (of FIG. 11B) that determines all fresh changes in the GUD with respect to the client and proposes to propagate the changes in response.

FIG. 11E is a flowchart that shows an expansion of the step 1116 (of FIG. 11B) that determines all fresh changes in the GUD with respect to the client and proposes to propagate the changes in response. As shown, the step 1116 itself includes steps 1140, 1141, and 1142 which are all inside an outer program loop over all GUD records. Within the loop, i.e., for a GUD record, the Synchronizer, in the step 1140, proposes a Client_Add for the record if the GUD record does not have a known corresponding record in the client (e.g., the mapping table does not yet have a Client ID mapped to the GUD record). The Synchronizer, in the step 1141, proposes a Client_Delete if the GUD record has been logically deleted. The Synchronizer, in the step 1142, proposes a Client_Update if and only if the last-modification time of the GUD record in the GUD is later than the last-synchronization time for the client record as shown in its mapping table. The "only if" pre-condition for performing the step 1142 is significant because if a synchronization is interrupted mid-way (e.g., by the user) and resumed, then the Client_* actions that have already been performed will not have to be re-performed. This is one advantage of the Synchronizer's keeping a last-synchronization time for each record in the mapping table. In summary of FIG. 11E, a proposed Client_Add of a record indicates that the record has been added to the GUD and is fresh with respect to the client; a proposed Client_Update using a record indicates that the record has been updated in the GUD and is fresh with respect to the client; and a proposed Client_Delete of a record indicates that the record's corresponding GUD record has been deleted from the GUD, which deletion is fresh with respect to the client.

C. Resolve Conflicts in the Proposed Actions

As was shown in FIG. 11A, after the action list has been built, the Synchronizer resolves conflicts, if any. For example, if the action list contains multiple proposed actions with the same GUD ID, then those proposed actions will be modified to remove any conflict between them. For example, all but one of the conflicting proposed actions may be deleted. As previously described, because the proposed actions are sorted by GUD ID, potential conflicts can be identified quickly.

1. Conflicts

Table 1 lists combinations of proposed actions for a given GUD ID that constitute potential conflicts which may need to be resolved. In Table 1, the asterisk in "_*" represents a "wildcard," or "any action".

TABLE 1

| Conflict Type | Conflicting Combination of Proposed Actions for Same GUD ID |
| --- | --- |
| Type 1 | GUD_Update vs. GUD_Update |
| Type 2 | GUD_Update vs. GUD_Delete |
| Type 3 | GUD_Update vs. GUD_Delete |
| Type 4 | GUD_(Update or Delete) from a client vs. Client_* to a different client |
| Type 5.1 | GUD_Update from a client vs. Client_Update to the same client |
| Type 5.2 | GUD_Update from a client vs. Client_Delete to the same client |
| Type 5.3 | GUD_Update from a client vs. Client_Update to the same client |
| Type 5.4 | GUD_Update from a client vs. Client_Delete to the same client |

As can be seen, Table 1 does not list any potential conflict between only Client_* actions. This is because all Client_* actions originate from GUD records, and the Synchronizer prevents conflicts from existing from GUD records in the first place. Thus, Client_* actions that coexist for a single GUD ID (e.g., to different clients) are not in conflict.

2. Deferred-Conflicts, or Duplicates

Note that Table 1 does not list any potential conflict that includes a GUD_Add. This is because a GUD_Add has no associated GUD ID in the action list at all, and thus the GUD_Add cannot share a GUD ID with any other action in the first place. Similarly, Table 1 also does not include any potential conflict between a GUD_* action from a client and a Client_Add to the same client. This is because a Client_Add to a client, using a given GUD ID, implies that the client did not previously have a corresponding record to the GUD ID, and thus the client cannot have generated any GUD_* action using the GUD ID.

However, that is not to say that GUD_Adds or Client_Adds cannot cause problematic situations. For example, a user can add a new record in a client (and cause a GUD_Add) such that the new record is equivalent to an existing record, for example because certain key fields (e.g., name and company for a particular definition of a contact type) are identical. In short, the user can create duplicate records. In a particular implementation of the preferred embodiment, duplicate record situations are resolved separately from the conflict situations of Table 1, as will be further described, and thus duplicate resolution may be thought of as a kind of deferred conflict resolution. However, a person of ordinary skill in the art will appreciate that the duplicate resolution methodologies to be described can also be integrated into the action list-pruning, conflict-resolution stage of the overall synchronization methodology.

3. Resolution by Merging Versus Wholly Discarding Records

In general, when two actions are in conflict, their associated records typically differ from each other in the values of certain mapped fields. In resolving the conflict, one record is declared to be the "winner." For a conflict between two update actions (e.g., Type 1 or Type 5.1 conflicts), there is a choice of what to do with the associated records' values in resolving the conflict. The preferred choice is to merge the records into one record, but to discard particular field values from the loser record if the field values conflict with the winner's values. Another possible choice is to wholly discard all record values from the loser record. Preferably, this choice between merging records versus wholly discarding the loser record is a user-settable system setting.

4. Manual Resolution

In resolving conflicts, the Synchronizer, if using manual resolution, will display the two or more conflicting records to the user and query the user to select a winner, or to select a rule to use to choose the winner. The Synchronizer optionally makes a recommendation based on its default rule(s) and may allow the user to choose a rule and display to the user the "what-if" result of the rule, while allowing the user to select the "what-if" winner or to select another winner or rule.

5. Rule-Based Resolution

In resolving conflicts between any pair of proposed actions, the Synchronizer may apply selected ones of the following exemplary rules. The default rules used by the preferred embodiment are highlighted by asterisks ("**"), and are preferably applied in the order listed, unless otherwise stated or context demands otherwise.

a. Generic Rules

Rule 0a: Choose the proposed action that originated from a higher-precedence client as the winner.

Rule 0b: Choose the proposed action having a latest timestamp as the winner.

The above Rule 0b is a desirable rule, but may not be sufficient, by itself, for all resolution situations, because not all clients provide timestamps for all actions. In particular, at least a few clients do not provide timestamps for any actions, and many clients do not provide timestamps for deletions of records. More detailed rules, for specific situations, are discussed below in the following sections. In general, if a rule requires a timestamp from a proposed action, and that proposed action does not have such a timestamp (e.g., due to limitations of a client), a fall-back preference may be used. Such fall back preferences would be chosen based on designer preference. Examples of fall-back preferences include: revert to manual resolution, prefer an update over a deletion; prefer the proposed action with the missing timestamp or, alternatively, prefer the proposed action not missing a timestamp; use the precedence hierarchy of clients; and so forth.)

b. Situational Rules

Type 1: GUD_Update vs. GUD_Update

**Rule 1: Choose the record having the latest last-modification time as the winner, merge the records into the winner's run-time storage (of course, giving precedence to the winner's values), and discard the GUD_Update of the other record.

Type 2: GUD_Update vs. GUD_Delete

**Rule 2a: Choose GUD_Update as the winner, and discard the GUD_Delete. (This rule expresses a design preference for possibly-obsolete data over possibly-lost data); or Rule 2b: Choose GUD_Delete as the winner, and discard the GUD_Update; or Rule 2c: Compare the modification time of the GUD_Update's record and the deletion time of the GUD_Delete's deleted record, and choose the proposed action having the later time as the winner, and discard the other proposed action. In a particular embodiment, if this Rule 2c cannot be applied due to a missing timestamp, Rule 2a is applied as a fall-back.

Type 3: GUD_Delete vs. GUD_Delete

**Rule 3: Choose one of the GUD_Deletes as the winner, and discard the other GUD_Delete. Preferably, choose the GUD_Delete that has a later deletion time as the winner, especially if the embodiment of the synchronizer is of the type that retains priority information (e.g., "original-priority" information, which is further described in other sections). Also, make a note that, when a GUD_Delete is executed for this GUD ID in this synchronization, it is not necessary to delete the (already deleted) corresponding record in the client from which the discarded GUD_Delete proposed action came.

Type 4: GUD_* from a Client vs. Client_* to a Different Client

**Rule 4: Choose the GUD_* as the winner, and discard the Client_*.

Type 5: GUD_* from a Client vs. Client_* to the Same Client

**Rule 5a: Choose the GUD_* as the winner, and discard the Client_*. (This rule has an advantage of simplicity versus the more elaborate rules below.)

Type 5.1: GUD_Update from a client vs. Client_Update to the same client

Rule 5.1 a: Compare the last-modification time of the GUD_Update's record with a "priority time" stored within the GUD for the Client Update's GUD Record. If the GUD_Update's time is later, choose the GUD_Update as the winner. Otherwise, choose the Client_Update as the winner. Merge the records into the winner's run-time storage (of course, giving precedence to the winner's values). Discard the loser. According to one embodiment, the GUD record's priority time may be simply the GUD record's modification time. Preferably, however, the GUD Record's priority time is its "original priority" time, as further described in its own, later section. (In a particular implementation, this rule is implemented in the form of a peculiar "conflict" resolution between any GUD_Update and <no action>, in combination with Rules 4 and 5a. In the peculiar "conflict" resolution, the Synchronizer compares the modification time of the GUD_Update's record and the priority time stored within the GUD for the corresponding GUD record. If the GUD_Update's time is earlier, the Synchronizer discards the GUD_Update. As a shortcut, the comparison of priority times for the peculiar "conflict" resolution may be made in the optional step 1125 of FIG. 11C so that a GUD_Update that would lose the peculiar "conflict" resolution, especially under a "wholly-discard-loser" scheme, is never proposed in the first place).

Type 5.2: GUD_Update from a client vs. Client_Delete to the same client

Rule 5.2a: Choose Client_Delete as the winner, and discard the GUD_Update. (This rule has an advantage of simplicity, and is analogous to Rule 2b.)

Rule 5.2b: Or, effectively choose GUD_Update as the winner by ensuring the result that its record from the client be propagated to the GUD. The preferred way to implement this result, which basically requires an "undelete" of the GUD_Record, is to leave the Client_Delete undisturbed, and convert the GUD_Update to a special type of GUD_Add that will get propagated back to its initiating client. (This rule expresses a design preference for possibly-obsolete data over possibly-lost data, and is analogous to Rule 2a.)

Rule 5.2c: Or, compare the modification time of the GUD_Update's record and the priority time stored within the GUD for the deleted GUD record. If the GUD_Update's time is later, "effectively" choose the GUD_Update as the winner as described in Rule 5.2b. Otherwise, choose the Client_Delete as the winner, and discard the GUD_Update, as described in Rule 5.2a. (This rule is analogous to Rule 2c.)

Type 5.3: GUD_Delete from a client vs. Client_Update to the same client

Rule 5.3a: Choose GUD_Delete as the winner, and discard the Client_Update. (This rule has an advantage of simplicity, and is analogous to Rule 2b.)

Rule 5.3b: Or, effectively choose Client_Update as the winner by ensuring the result that its record from the GUD be propagated to the Client. The preferred way to implement this result is to convert the Client_Update into a Client_Add. (This rule expresses a design preference for possibly-obsolete data over possibly-lost data, and is analogous to Rule 2a.)

Rule 5.3c: Or, compare the deletion time of the GUD_Delete and the priority time stored within the GUD for the Client_Update's GUD record. If the GUD_Delete's time is later, choose the GUD_Delete as the winner, and discard the Client_Update, as described in Rule 5.3a. Otherwise, "effectively" choose the Client_Update as the winner as described in Rule 5.3b. (This rule is analogous to Rule 2c.)

Type 5.4: GUD_Delete from a client vs. Client_Delete to the same client

Rule 5.4a: Discard both proposed actions. Preferably, if the embodiment of the Synchronizer is of the type that records priority (e.g., "original-priority") information, then if the GUD_Delete has a later deletion time than the priority time stored in the GUD for the deleted GUD record, ensure that the priority information of the GUD_Delete be stored into the GUD as the GUD record's priority time.

An alternative embodiment uses the same rules as the preferred embodiment, except that Rules 2a and 5a are replaced with Rules 2c, 5.1a, 5.2c, 5.3c, and 5.4a. Another alternative embodiment uses the same rules as the preferred embodiment, except that Rule 5a is replaced with Rules 5.1a, 5.2b, 5.3b, and 5.4a. Yet another alternative embodiment uses the same rules as the preferred embodiment, except that Rules 2a and 5a are replaced with Rules 2b, 5.1a, 5.2a, 5.3a, and 5.4a.

6. Original-Priority Resolution

As mentioned earlier, an embodiment of the Synchronizer records a "priority time" within the GUD for each GUD record. The Synchronizer records this priority time whenever a GUD_Add, GUD_Update, or GUD_Delete is performed on a GUD record. The Synchronizer maintains this priority time in the GUD for every GUD record, for example, under "other information" 1018, as shown in FIG. 10B. This priority time may be the GUD modification time for the GUD record. Preferably, though, the priority time is the "original priority" of the record. The original priority of any record is the client timestamp on a client record that caused the most recent GUD_Add or GUD_Update or GUD_Delete which put the current values or status of the GUD record into the GUD in the first place. (As usual, client timestamps may optionally be stored in translated form, such as in the Synchronizer's time, or GMT, etc. This original priority is useful especially if all clients do not all synchronize every time. For example, with the proper conflict resolution rules (e.g., Rule 5.1a), the original priority keeps a little-used client that has been changed since it was last synchronized, but that has missed one or more recent synchronizations, from wiping out new data with its old changes. For clients that cause a GUD_Add or GUD_Update and do not give last-modification or deletion timestamps to their records, a default value or quantity may be assigned to the GUD record's original priority after the GUD_Add or GUD_Update or GUD_Delete is performed.

Examples of possible default values or quantities include: the synchronization time, the synchronization time of the most recent previous synchronization involving the client, or minus-infinity.

C. Perform the Actions

Actions are simply performed, and relevant data and status are updated into the client records, the GUD records, and the mapping tables. Any GUD_Add is prefaced by duplicate resolution. Optionally, any GUD_Update which changes a uniqueness-giving "key field" of a record is also prefaced by duplicate resolution. In general, any GUD_* action is expanded also into corresponding Client_* actions to all other currently participating clients. (However, the conflict resolution rules may have created special GUD_* actions that may be expanded in different ways, to account for special situations, as described earlier.) All actions for a single GUD record's GUD ID are performed together. After an action is performed, the last-synchronization time is set in the relevant mapping table, and the appropriate priority time for the GUD record is recorded in the GUD if the action was a GUD_* action.

E. Duplicate Resolution

Duplicate resolution is straightforward. For any particular record (e.g., any record from a GUD_Add or GUD_Update) that may be a duplicate, simply compare the record with the GUD records and look for any duplicate record among the GUD records, according to some definition of equivalence for the data type. If found, resolve any two duplicate records first by choosing a single winning record either by manual or rule-based selection. Next, the losing record is effectively discarded. Alternatively, the winning and losing records are be merged into a single record (the winning record) and the losing record is effectively discarded. In merging two records, conflicting field values are chosen either by the user in manual resolution or by giving precedence to the winning record. To effectively discard a record from a GUD_Add from a client, the Synchronizer converts the GUD_Add into a Client_Delete to the client. To effectively discard a record from a GUD_Update from a client, the Synchronizer converts the GUD_Update into a Client_Delete to the client. To effectively discard a GUD record, the Synchronizer simply performs a GUD_Delete for the record.

X. Additional Embodiment(s)

To save space, especially if the Synchronizer is implemented on a same device as the particular client, and especially if the client is itself an organizer-type device, such as a REXTM-type device or a Win CE-type device, the GUD can be implemented on a client. The client needs to have logical delete. If client doesn't support it, the accessor can fake it by creating the equivalent of "trash bin" folder(s) in the client. Preferably, the user will cooperate with the fakery by refraining from using the client's native delete functions in favor of moving records to be deleted into the "trash bin" folders.

While the invention is described in some detail with specific reference to a single preferred embodiment and certain alternatives, there is no intent to limit the invention to that particular embodiment or those specific alternatives.

What is claimed is:

1. In an information processing system, a method for synchronizing an arbitrary number of multiple datasets residing on different devices, the method comprising:

accepting a designation of an arbitrary number of multiple datasets comprising more than two datasets from different devices to be synchronized, wherein at least one of the designated datasets includes one record to be synchronized with all others of the designated datasets;

in response to said designation, creating a reference dataset that is used to store a super-set of most-recent data from all of the designated datasets, said reference dataset having records that are uniquely identified in a manner that is independent of how records are identified in any given one of the designated datasets, thereby providing a repository of information that is available independent of unavailability of one of said devices at a given point in time; and in response to the designation and based on the information stored by said reference dataset, synchronizing all of the designated datasets without requiring further designating of datasets to be synchronized, wherein, after the step of synchronizing, each of the designated datasets includes a record that corresponds to, and is in a synchronized state with, the one record.

2. The method of claim 1 wherein the number of designated datasets is N, and the step of synchronizing the N designated datasets comprises performing a sequence of binary reconciliations, each involving at least one of the N designated datasets, to obtain at least one dataset that is globally-synchronized, wherein any globally-synchronized dataset includes propagated changes, if any exist and were not discarded due to conflict resolution, from each of the N designated datasets, and any dataset by definition includes changes, if any, propagated from itself.

3. The method of claim 2 wherein the step of synchronizing the N designated datasets further comprises, after the step of performing the sequence of binary reconciliations, synchronizing each dataset, of the N designated datasets, that is not yet globally-synchronized with another dataset that is already globally-synchronized.

4. The method of claim 3 wherein a reference dataset is involved in each of at least N−1 binary reconciliations in the sequence of binary reconciliations.

5. The method of claim 3 wherein the sequence of binary reconciliations comprises at most N binary reconciliations, wherein at least (N−1) of the at most N binary reconciliations each involves at least one of the N designated datasets.

6. The method of claim 3 wherein:

the sequence of binary reconciliations includes a first binary reconciliation involving a first dataset and a second, later binary reconciliation;

the first dataset includes a record that has a modification time; and the step of performing the sequence of binary reconciliations comprises causing, during the first binary reconciliation, a recording of the modification time such that the modification time is available for use after start of the second binary reconciliation.

7. The method of claim 6 wherein:

the second binary reconciliation involves a second and a third dataset, each of which is not the first dataset; and the step of performing the sequence of binary reconciliations further comprises comparing the recorded modification time to another time in resolving a conflict between a record from the second dataset and a record that is already in a synchronized state with regard to the first record.

8. The method of claim 1 wherein the step of synchronizing the more than two designated datasets comprises:

providing a synchronizer dataset that contains records, wherein the synchronizer dataset reflects a result of an earlier synchronization;

comparing each of the more than two designated datasets to the synchronizer dataset to identify an addition, update, or deletion of a record in the each designated dataset;

changing at least two of the designated datasets based on the identified addition, update, or deletion of a record; and changing the synchronizer dataset based on the identified addition, update, or deletion of a record.

9. An information processing system for synchronizing an arbitrary number of multiple datasets from different devices, the system comprising:

means for accepting a designation of an arbitrary number of datasets comprising more than two datasets from different devices to be synchronized, wherein at least one of the designated datasets includes one record to be synchronized with all others of the designated datasets;

means, responsive to said designation, for creating a reference dataset that is used to store a super-set of most-recent data from all of the designated datasets, said data comprising records uniquely identified within the reference dataset in a manner that is independent of how data is identified within the designated datasets, for providing a repository of information that is available independent of unavailability of one of said devices at a given point in time; and means for synchronizing, in response to the designation and based on the information stored by said reference dataset, the more than two designated datasets without requiring further designating of datasets to be synchronized, wherein, after the step of synchronizing, each of the more than two designated datasets includes a record that corresponds to, and is in a synchronized state with, the one record.

10. A computer program product for use with a computer system comprising:

a computer-readable storage medium;

computer code on the storage medium for instructing the computer system to accept a designation of an arbitrary number of datasets comprising more than two datasets from different devices to be synchronized, wherein at least one of the designated datasets includes one record to be synchronized with all others of the designated datasets;

computer code on the storage medium, responsive to said designation, for creating a reference dataset that is used to store a super-set of most-recent data from all of the designated datasets, said data comprising records uniquely identified within the reference dataset in a manner that is independent of how data is identified within the designated datasets, for providing a repository of information that is available independent of unavailability of one of said devices at a given point in time; and computer code on the storage medium for instructing the computer system to synchronize, in response to the designation and based on the information stored by said reference dataset, the more than two designated datasets without requiring further designating of datasets to be synchronized, wherein, after the step of synchronizing, each of the more than two designated datasets includes a record that corresponds to, and is in a synchronized state with, the one record.

11. A method capable of synchronizing more than two designated datasets, the method comprising:

providing a synchronizer dataset that contains records, wherein the synchronizer dataset reflects a result of an earlier synchronization of the designated datasets, and wherein each record in the synchronizer dataset is identified by a globally-unique record identifier that is independent of how any corresponding records from the designated datasets are identified;

creating a table that associates each globally-unique record identifier to any corresponding records residing on the designated datasets;

using said synchronizer dataset and said table, comparing values derived from each of the more than two designated datasets to values derived from the synchronizer dataset to identify a change of a record in the each designated dataset since an earlier synchronization involving the each designated dataset; and changing at least two of the designated datasets based on the identified change of a record.

12. The method of claim 11 wherein the step of comparing each of the designated datasets to the synchronizer dataset comprises, for each of the designated datasets, comparing values derived from records from the each designated dataset to values derived from the synchronizer dataset to determine whether any records of the each designated dataset are updates or additions, or whether any record of the each designated dataset has been deleted, since a prior synchronization involving the each designated dataset.

13. The method of claim 12 wherein the step of comparing values derived from records comprises determining a particular record in the each designated dataset to be an update, if the particular record possesses a modification time that is later than a particular time.

14. The method of claim 13 wherein the particular time is a priority time associated with the corresponding record in the synchronizer dataset.

15. The method of claim 14 wherein the priority time is indicative of a modification time, herein referred to as the original priority time, of a record in a particular dataset, wherein values derived from the record in the particular dataset were used to change the corresponding record in the synchronizer dataset due to an earlier synchronization.

16. The method of claim 13 wherein the particular time is a time established based on a most recent earlier synchronization that involved the each designated dataset.

17. The method of claim 18 wherein the particular time is indicative of a time no earlier than a latest modification time, from any record of the each designated dataset, that existed prior to and was seen during the most recent earlier synchronization that involved the each designated dataset.

18. The method of claim 12 further comprising resolving conflicts among at least determined updates or deletions corresponding to a single record of the synchronizer dataset.

19. The method of claim 18 wherein:

the step of providing a synchronizer dataset comprises providing status information regarding contents of at least a particular dataset, of the designated datasets, according to an earlier synchronization involving the particular dataset; and the step of comparing values derived from records further comprises:

determining a particular record in the each designated dataset to be an addition, if the particular record has no corresponding record in the synchronizer dataset; and determining that the particular dataset includes a deletion, if the particular dataset no longer includes a valid record that corresponds to a particular record in the synchronizer dataset, wherein the particular dataset did have such a valid record at the end of an earlier synchronization, according to the status information.

20. The method of claim 19 wherein the step of comparing values derived from records further comprises:

comparing a CRC-type result derived from the particular record in the each designated dataset with a CRC-type result derived from the particular record during the earlier synchronization involving the each designated dataset; and determining the particular record in the each designated dataset to be an update, if the CRC-type results differ.

21. The method of claim 19 wherein the step of comparing values derived from records comprises determining the particular record in the each designated dataset to be an update only if the particular record in the each designated dataset possesses a modification time that is later than a particular time.

22. The method of claim 19 further comprising:

comparing at least one value derived from a determined addition of a record with values derived from at least one other record to determine whether the determined addition represents a duplication of records.

23. The method of claim 22 further comprising:

comparing at least one value derived from a determined update of a record with values derived from at least one other record to determine whether the determined update represents a duplication of records; and resolving any determined duplication of records.

24. The method of claim 19 further comprising, for at least one of the designated datasets:

identifying a change of a record in the synchronizer dataset since an earlier synchronization involving the at least one designated dataset; and changing the at least one designated dataset based on the identified change in the synchronizer dataset.

25. The method of claim 24 wherein the step of resolving conflicts comprises resolving conflicts among a plurality of determined updates or deletions corresponding to the single record of the synchronizer dataset, wherein the plurality of determined updates or deletions includes an update or deletion identified in the synchronizer dataset and an update or deletion identified in one of the designated datasets.

26. The method of claim 24 wherein the step of resolving conflicts comprises resolving conflicts among more than two updates or deletions that correspond to the single record of the synchronizer dataset by giving precedence to one of the more than two updates or deletions over others of the more than two updates or deletions.

27. The method of claim 11 wherein at least one of the designated datasets is a non-participant in the earlier synchronization the result of which is reflected in the provided synchronizer dataset.

28. The method of claim 11 wherein all of the designated datasets are non-participants in the earlier synchronization the result of which is reflected in the provided synchronizer dataset.

29. The method of claim 28 further comprising, in the earlier synchronization, changing a first record in the synchronizer dataset; and after the earlier synchronization, in synchronizing the designated datasets:

identifying the changed first record in the synchronizer dataset to be an addition, update, or deletion; and changing the designated datasets based on the first record in the synchronizer dataset.

30. A system for synchronizing more than two designated datasets, the system comprising:

means for providing a synchronizer dataset that contains records, wherein the synchronizer dataset reflects a result of an earlier synchronization and wherein each record in the synchronizer dataset is identified by a globally-unique record indentifier that is independent of how any corresponding records form the designated datasets are identified;

means for creating a table that associates each globally-unique record identifier to any corresponding records residing on the designated datasets;

using said synchronizer dataset and said table, comparing values derived from means, responsive to said synchronizer dataset and said table, for comparing each of the more than two designated datasets to the synchronizer dataset to idenifty an addition, update, or deletion of a record in the each designated dataset since an earlier synchronization involving the each designated dataset;

means for updating at least two of the designated datasets based on the identified addition, update, or deletion of a record; and means for updating the synchronizer dataset based on the identified addition, update, or deletion of a record.

* * * * *